(12) United States Patent
Allen et al.

(10) Patent No.: US 9,399,701 B2
(45) Date of Patent: Jul. 26, 2016

(54) POLYMER COMPOSITIONS AND METHODS

(75) Inventors: Scott D. Allen, Ithaca, NY (US); Jay J. Farmer, Ithaca, NY (US); Peter Kopf, Ithaca, NY (US); David Hurwitz, Ithaca, NY (US); Thomas R. Welter, Ithaca, NY (US)

(73) Assignee: Novomer, Inc., Ithaca, NY (US)

( * ) Notice: Subject to any disclaimer, the term of this patent is extended or adjusted under 35 U.S.C. 154(b) by 420 days.

(21) Appl. No.: 13/819,224

(22) PCT Filed: Aug. 26, 2011

(86) PCT No.: PCT/US2011/049460
§ 371 (c)(1),
(2), (4) Date: Feb. 26, 2013

(87) PCT Pub. No.: WO2012/027725
PCT Pub. Date: Mar. 1, 2012

(65) Prior Publication Data
US 2013/0172482 A1 Jul. 4, 2013

Related U.S. Application Data

(60) Provisional application No. 61/377,524, filed on Aug. 27, 2010, provisional application No. 61/474,207, filed on Apr. 11, 2011.

(51) Int. Cl.
*C08G 64/42* (2006.01)
*C08G 64/02* (2006.01)
*C08L 69/00* (2006.01)
*C09D 169/00* (2006.01)

(52) U.S. Cl.
CPC ............ *C08G 64/42* (2013.01); *C08G 64/0291* (2013.01); *C08L 69/00* (2013.01); *C09D 169/00* (2013.01)

(58) Field of Classification Search
CPC ..... C08G 64/42; C08G 64/0291; C08L 69/00
USPC .......................................... 528/196; 524/537
See application file for complete search history.

(56) References Cited

U.S. PATENT DOCUMENTS

| | | | |
|---|---|---|---|
| 3,716,571 A * | 2/1973 | Berlin et al. .................. | 558/267 |
| 4,783,544 A | 11/1988 | Yokoshima et al. | |
| 4,851,507 A | 7/1989 | Kesling, Jr. et al. | |
| 4,959,411 A | 9/1990 | Gambale et al. | |
| 5,143,997 A | 9/1992 | Endo et al. | |
| 5,342,554 A | 8/1994 | McBain et al. | |
| 5,698,661 A | 12/1997 | Ferruti et al. | |
| 5,733,860 A | 3/1998 | Durbut et al. | |
| 6,043,334 A | 3/2000 | Kanamaru et al. | |
| 8,247,520 B2 | 8/2012 | Allen et al. | |
| 8,470,956 B2 | 6/2013 | Allen et al. | |
| 8,557,921 B2 * | 10/2013 | Arriola et al. ................. | 525/195 |
| 8,575,245 B2 | 11/2013 | Lapointe et al. | |
| 8,580,911 B2 | 11/2013 | Allen et al. | |
| 8,604,155 B2 | 12/2013 | Allen et al. | |
| 8,748,555 B2 | 6/2014 | Allen | |
| 8,785,591 B2 | 7/2014 | Allen et al. | |
| 8,921,508 B2 | 12/2014 | Allen et al. | |
| 8,952,104 B2 | 2/2015 | Allen | |
| 9,029,498 B2 | 5/2015 | Allen et al. | |
| 9,102,800 B2 | 8/2015 | Allen et al. | |
| 2006/0226401 A1 | 10/2006 | Xiao et al. | |
| 2009/0105443 A1 | 4/2009 | Brack et al. | |
| 2010/0120993 A1 | 5/2010 | Chatterjee et al. | |
| 2010/0230650 A1 | 9/2010 | Nagoh et al. | |
| 2011/0218127 A1 | 9/2011 | Allen et al. | |
| 2011/0230580 A1 | 9/2011 | Allen et al. | |
| 2011/0257296 A1 | 10/2011 | Lapointe et al. | |
| 2012/0156410 A1 | 6/2012 | Allen | |
| 2013/0066044 A1 | 3/2013 | Allen et al. | |
| 2013/0244864 A1 | 9/2013 | Allen et al. | |
| 2013/0281633 A1 | 10/2013 | Allen | |
| 2013/0303724 A1 | 11/2013 | Allen et al. | |
| 2014/0031453 A1 | 1/2014 | Allen et al. | |
| 2014/0046008 A1 | 2/2014 | Allen et al. | |
| 2014/0072806 A1 | 3/2014 | Allen et al. | |
| 2015/0166734 A1 | 6/2015 | Allen et al. | |
| 2015/0299386 A1 | 10/2015 | Allen et al. | |
| 2015/0307660 A1 | 10/2015 | Allen et al. | |

FOREIGN PATENT DOCUMENTS

| | | |
|---|---|---|
| CA | 2742119 A1 | 6/2010 |
| CN | 101805507 A | 8/2010 |
| EP | 1026767 A1 | 8/2000 |
| JP | S61-291611 A | 12/1986 |
| JP | H01-163213 A | 6/1989 |
| JP | H03-181517 A | 8/1991 |
| JP | H03-220233 A | 9/1991 |
| JP | H05-70584 B2 | 10/1993 |
| JP | H07-62216 B2 | 7/1995 |
| JP | H09-319102 A | 12/1997 |

(Continued)

OTHER PUBLICATIONS

Chen et al., Synthesis, Characterization, and Epoxidation of an Aliphatic Polycarbonate from 2,2-(2-Pentene-1,5-diyl) trimethylene Carbonate (cHTC) Ring-Opening Polymerization, Macromolecules, vol. 30 (12), pp. 3470-3476 (1997).

(Continued)

*Primary Examiner* — Tae H Yoon
(74) *Attorney, Agent, or Firm* — Choate, Hall & Stewart LLP; John P. Rearick; Nicholas J. Pace

(57) ABSTRACT

The present invention encompasses polymer compositions comprising aliphatic polycarbonate chains containing sites of olefinic unsaturation. In certain embodiments the aliphatic polycarbonate chains comprise sites of olefinic unsaturation capable of participating in radical-promoted olefin polymerizations. In certain embodiments, the invention encompasses composites formed by the polymerization or cross-linking of a combination of olefinic monomers and aliphatic polycarbonate chains containing sites of olefinic unsaturation.

22 Claims, 8 Drawing Sheets

(56) References Cited

FOREIGN PATENT DOCUMENTS

| | | |
|---|---|---|
| JP | H10-282668 A | 10/1998 |
| JP | 2000-302861 A | 10/2000 |
| JP | 2000-319381 A | 11/2000 |
| JP | 2007-262244 A | 10/2007 |
| JP | 2008-101191 A | 5/2008 |
| JP | 2012-502143 A | 1/2012 |
| WO | WO-2010/028362 A1 | 3/2010 |
| WO | WO-2010/033703 A1 | 3/2010 |
| WO | WO-2010/033705 A1 | 3/2010 |
| WO | WO-2010/062703 A1 | 6/2010 |
| WO | WO-2010/075232 A1 | 6/2010 |
| WO | WO-2011/005664 A2 | 1/2011 |
| WO | WO-2011/163133 A1 | 12/2011 |
| WO | WO-2012/071505 A1 | 5/2012 |
| WO | WO-2012/094619 A1 | 7/2012 |
| WO | WO-2012/154849 A1 | 11/2012 |

OTHER PUBLICATIONS

International Search Report for PCT/US2011/49460 mailed Jan. 27, 2012.

International Search Report of PCT/US12/20523, 2 pages (May 10, 2012).

Ramakrishna, S., et al., Biomedical applications of polymer-composite materials: a review, Composites Science and Technology, 61: 1189-1224 (2001).

Composites Science and Technology, 61:1189-1224 (2001).

* cited by examiner

Electrospray Mass Spectral Analysis:

| | Mn | Mw | Mz | PD | DPn | DPw | DPz | Pct Series |
|---|---|---|---|---|---|---|---|---|
| Total/Average | 2275.52 | 2338.50 | 2396.36 | 1.03 | 21.64 | 22.26 | 22.83 | 100.00 |
| Bis MA +1 Charge | 1793.18 | 1903.72 | 1999.51 | 1.06 | 16.91 | 18.00 | 18.94 | 17.92 |
| Bis MA +2 Charge | 2380.82 | 2433.42 | 2482.99 | 1.02 | 22.68 | 23.19 | 23.68 | 82.08 |

Mono ester is not observed

|  | Sample | | | | | | | | |
|---|---|---|---|---|---|---|---|---|---|
|  | A | B | C | D | E | F | G | H | I |
| Sample preparation | Fibre Glast [a] | Fibre Glast [a] | Fibre Glast [a] | Fibre Glast [a] | Example 1 | Example 1 | Example 1 | Example 1 | Example 1 |
| Resin Molecular Weight |  |  |  |  | 1000 | 1000 | 2000 | 2000 | 3000 |
| Reactive Diluent | Styrene | Styrene | Styrene | Styrene | Styrene | Styrene | Styrene | Styrene | Styrene |
| Reactive Diluent % | ~40% | ~40% | ~40% | ~40% | 25% | 40% | 25% | 40% | 25% |
| Divinyl benzene amount % | 0% | 0% | 0% | 0% | 0% | 0% | 0% | 0% | 0% |
| Tensile Strength at Yield, psi | 12,000 |  |  |  |  |  |  |  |  |
| Tensile Strength at Break, psi |  | 7,600 | 6,500 | 9,141 | 6,650 | 7,710 | 7,860 | 6,300 | 5,054 |
| Tensile Elongation at Yield, % | 4.6 |  |  |  |  |  |  |  |  |
| Tensile Elongation at Break, % | 7.9 | 2 | 2 | 2.9 | 3.4 | 2.6 | 2.5 | 2 | 2 |
| Tensile Modulus, psi | 540,000 | 350,000 | 340,000 | 334,000 | 289,000 | 324,000 | 369,000 | 323,000 | 286,000 |
| Flexural Strength at Yield, psi | 19,000 | 8,700 | 10,700 | 11,600 | 7,430 | 9,400 | 10,100 | 9,400 | 6,000 |
| Modulus of Elasticity, psi | 500,000 | 315,000 | 290,000 | 325,000 | 140,000 | 244,000 | 230,000 | 253,000 | 92,000 |
| Heat Distortion Temperature, °C | 98 | 104 | 103 | 103 | 39 | 50 | 41 | 43 | 39 |
| 1st heat exotherm? |  | Yes |  |  | No | No | Yes | No | Yes |
| W·C/g |  | 0.5 |  |  | n/a | n/a | 0.28 | n/a | 0.3 |
| Tg (onset) - 2nd heat |  |  |  |  | 31 | 45 | 31 | 32 | 29 |
| Tg (onset) - 3rd heat |  |  |  |  | 32 | 46 | 34 | 32 | 28 |

[a] See Example 20

Figure 6a

| | Sample | | | | | | | | | |
|---|---|---|---|---|---|---|---|---|---|---|
| | J | K | L | M | N | O | P | Q | R | |
| Process | Example 1 | Example 1 | Example 1 | Example 10 | Example 10 | Example 10 | Example 11 | Example 11 | Example 10 | |
| Resin Molecular Weight | 3000 | 1000 | 1000 | 1000 | 1000 | 1000 | 1000 | 3000 | 1000 | |
| Reactive Diluent | Styrene | Styrene | Styrene | Vinyl toluene | Vinyl toluene | MMA | Styrene | Styrene | Styrene | |
| Reactive Diluent % | 40% | 40% | 40% | 40% | 40% | 40% | 40% | 40% | 38% | |
| Divinyl benzene amount % | 0% | 0% | 0% | 0% | 0% | 0% | 0% | 0% | 2% | |
| Tensile Strength at Yield, psi | | | | | | | | | | |
| Tensile Strength at Break, psi | 6,900 | 8,244 | 8,157 | 8,200 | 8,200 | 6,499 | 7,560 | 9,400 | | |
| Tensile Elongation at Yield, % | | | | | | | | | | |
| Tensile Elongation at Break, % | 2.6 | 2.4 | 2.7 | 3.1 | 3.1 | 3.4 | 2.15 | 2.6 | | |
| Tensile Modulus, psi | 329,000 | 367,000 | 339,000 | 312,000 | 312,000 | 229,000 | 382,000 | 468,000 | | |
| Flexural Strength at Yield, psi | 8,200 | 9,450 | 9,000 | 10,800 | 3,460 | 2,000 | 10,700 | 12,000 | | |
| Modulus of Elasticity, psi | 286,000 | 280,000 | 236,000 | 289,000 | 234,000 | 109,000 | 290,000 | 344,000 | | |
| Heat Distortion Temperature, °C | 42 | 52 | 46 | 45 | 45 | 48 | 54 | 48 | 48 | |
| 1st heat exotherm? | No | No | No | No | No | No | No | No | No | |
| W·C/g | n/a | n/a | n/a | n/a | n/a | n/a | n/a | n/a | n/a | |
| Tg (onset) - 2nd heat | 31 | 41 | 34 | 32 | 32 | 31 | 48 | 36 | 49 | |
| Tg (onset) - 3rd heat | 31 | 39 | 32 | 32 | 32 | 33 | 45 | 42 | 50 | |

Figure 6b

| | Sample | | | | | | |
|---|---|---|---|---|---|---|---|
| | S | T | U | V | W | X | Y |
| Process | Example 10 | Example 10 | Example 10 | Example 10 | Example 11 | Example 11 | Example 11 |
| Resin Molecular Weight | 1000 | 1000 | 1000 | 1000 | 1000 | 1000 | 1000 |
| Reactive Diluent | Styrene | Styrene | Styrene | Styrene | Styrene | Styrene | Styrene |
| Reactive Diluent % | 40% | 34% | 32% | 30% | 34% | 30% | 26% |
| Divinyl benzene amount % | 0% | 6% | 8% | 10% | 6% | 10% | 14% |
| Tensile Strength at Yield, psi | | | | | | | |
| Tensile Strength at Break, psi | | | | | | | |
| Tensile Elongation at Yield, % | | | | | | | |
| Tensile Elongation at Break, % | | | | | | | |
| Tensile Modulus, psi | | | | | | | |
| Flexural Strength at Yield, psi | | | | | | | |
| Modulus of Elasticity, psi | | | | | | | |
| Heat Distortion Temperature, °C | 49 | 53 | 54 | 55 | 59 | 63 | 70 |
| 1st heat exotherm? | No | No | No | No | | | |
| W·C/g | n/a | n/a | n/a | n/a | | | |
| Tg (onset) - 2nd heat | 39 | 46 | 47 | 43 | | | |
| Tg (onset) - 3rd heat | 40 | 50 | 49 | 43 | | | |

Figure 6c

POLYMER COMPOSITIONS AND METHODS

CROSS REFERENCE TO RELATED APPLICATIONS

The present application is a national phase application under 35 U.S.C. 371 of PCT International Application No. PCT/US11/49460, filed Aug. 26, 2011, which claims priority to U.S. provisional patent application Ser. No. 61/377,524, filed Aug. 27, 2010, and U.S. provisional patent application Ser. No. 61/474,207, filed Apr. 11, 2011, the entire contents of each of which are hereby incorporated herein by reference.

FIELD OF THE INVENTION

This invention pertains to the field of polymers. More particularly, the invention pertains to aliphatic polycarbonate compositions having olefinic functionality that allows cross-linking via radical promoted olefin polymerization.

SUMMARY OF THE INVENTION

In one aspect, the present invention encompasses polymer compositions comprising aliphatic polycarbonate chains containing sites of olefinic unsaturation. In certain embodiments the aliphatic polycarbonate chains comprise sites of olefinic unsaturation capable of participating in radical-promoted olefin polymerizations.

In certain embodiments, the aliphatic polycarbonate chains contain a primary repeating unit having a structure:

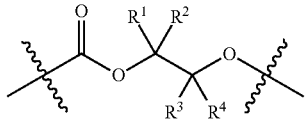

where $R^1$, $R^2$, $R^3$, and $R^4$ are, at each occurrence in the polymer chain, independently selected from the group consisting of —H, fluorine, an optionally substituted $C_{1-40}$ aliphatic group, an optionally substituted $C_{1-20}$ heteroaliphatic group, and an optionally substituted aryl group, where any two or more of $R^1$, $R^2$, $R^3$, and $R^4$ may optionally be taken together with intervening atoms to form one or more optionally substituted rings optionally containing one or more heteroatoms.

In certain embodiments, such aliphatic polycarbonate chains are derived from the copolymerization of carbon dioxide with one or more epoxide substrates. Such copolymerizations are exemplified in published PCT application PCT/US09/056,220 the entirety of which is incorporated herein by reference. In some embodiments, the aliphatic polycarbonate chains are derived from ethylene oxide, propylene oxide, or optionally substituted $C_{4-30}$ aliphatic epoxides, or mixtures of two or more of these. In some embodiments, the aliphatic polycarbonate chains have a number average molecular weight (Mn) less than about 20,000 g/mol.

The sites of olefinic unsaturation in the aliphatic polycarbonate chains may be present in one or more of several locations. The sites of olefinic unsaturation may be present on the ends of the chains, on substituents present on repeating units within the chains or on polyfunctional initiator moieties embedded within the polycarbonate chains. In some cases the aliphatic polycarbonate chains may include two or more of these features either in single chains or the aliphatic polycarbonate may comprise mixtures of chains having different arrangements of olefinic groups. In certain embodiments, on average in the polymer compositions, the aliphatic polycarbonate chains each contain at least two sites of olefinic unsaturation.

In certain embodiments, the sites of olefinic unsaturation in the aliphatic polycarbonate chains are present at the chain ends. Such olefinic groups may be introduced in a post-polymerization step such as by alkylating, esterifying, or carbamoylating the hydroxyl end groups of the aliphatic polycarbonate chains. In other embodiments, such groups may be introduced by performing a copolymerization of carbon dioxide with one or more epoxides in the presence of chain transfer agents and/or polymerization initiators where the initiators and/or chain transfer agents contain sites of olefinic unsaturation along with one or more functional groups capable of initiating the copolymerization of epoxides and carbon dioxide. In some embodiments, such olefinic groups comprise radically-polymerizable olefins such as acrylates, propiolates, acroleins, styrenes, vinyl ethers or vinyl esters.

In certain embodiments, the sites of olefinic unsaturation in the polycarbonate chains are present in a multifunctional initiator embedded within the aliphatic polycarbonate chains. Such groups may be introduced by using chain transfer agents and/or polymerization initiators that contain one or more sites capable of initiating the copolymerization of epoxides and carbon dioxide and also contain one or more sites of olefinic unsaturation. In some embodiments, such olefinic groups comprise radically-polymerizable olefins such as acrylates, propiolates, acroleins, styrenes, vinyl ethers or vinyl esters. In certain embodiments, the sites capable of initiating the copolymerization of epoxides and carbon dioxide on such chain transfer agents or initiators are hydroxyl groups or carboxyl groups.

In certain embodiments, the olefinic unsaturation in the aliphatic polycarbonate chains is present on a sidechain of one or more the repeating units of the polymer chains. In some embodiments such groups may be introduced by conducting a copolymerization of carbon dioxide and a mixture of epoxide monomers where some of the epoxide monomers have sidechains containing olefinic unsaturation. In certain embodiments the epoxides bearing sidechains containing olefinic unsaturation are glycidyl esters or glycidyl ethers. Preferably, the olefinic groups on these glycidyl esters or ethers comprise radically-polymerizable olefins such as acrylates, styrenes, vinyl ethers, or vinyl esters.

In another aspect, the present invention encompasses methods of producing aliphatic polycarbonates containing radically polymerizable olefinic groups. In certain embodiments these methods include the step of modifying hydroxyl groups at the ends of the aliphatic polycarbonate chains. In other embodiments, these methods include the step of copolymerizing carbon dioxide, one or more $C_{2-40}$ epoxides and a glicydyl ether or glycidyl ester wherein the glycidyl compounds contain one or more sites of olefinic unsaturation. In certain embodiments, the methods include copolymerizing carbon dioxide and one or more $C_{2-30}$ epoxides in the presence of initiators and/or chain transfer agents wherein the initiator or chain transfer agents contain one or more sites of olefinic unsaturation. In some embodiments, the methods include combinations of two or more of these steps.

In another aspect, the present invention includes compositions formed by cross-linking or chain-extending aliphatic polycarbonate chains containing olefinic unsaturation by contacting the chains with compounds such as acrylates, styrenes, vinyl ethers, or vinyl esters under conditions for radical olefin polymerization. In certain embodiments, the present invention also encompasses methods for performing such copolymerizations and cross-linking reactions.

In another aspect, the present invention comprises composites derived from radical polymerizations of compositions containing aliphatic polycarbonate chains having sites of olefinic unsaturation. In certain embodiments, the present invention encompasses articles made from such composites.

DEFINITIONS

Definitions of specific functional groups and chemical terms are described in more detail below. For purposes of this invention, the chemical elements are identified in accordance with the Periodic Table of the Elements, CAS version, Handbook of Chemistry and Physics, 75$^{th}$ Ed., inside cover, and specific functional groups are generally defined as described therein. Additionally, general principles of organic chemistry, as well as specific functional moieties and reactivity, are described in *Organic Chemistry*, Thomas Sorrell, University Science Books, Sausalito, 1999; Smith and March *March's Advanced Organic Chemistry*, 5$^{th}$ Edition, John Wiley & Sons, Inc., New York, 2001; Larock, *Comprehensive Organic Transformations*, VCH Publishers, Inc., New York, 1989; Carruthers, *Some Modern Methods of Organic Synthesis*, 3$^{rd}$ Edition, Cambridge University Press, Cambridge, 1987; the entire contents of each of which are incorporated herein by reference.

Certain compounds of the present invention can comprise one or more asymmetric centers, and thus can exist in various stereoisomeric forms, e.g., enantiomers and/or diastereomers. Thus, inventive compounds and compositions thereof may be in the form of an individual enantiomer, diastereomer or geometric isomer, or may be in the form of a mixture of stereoisomers. In certain embodiments, the compounds of the invention are enantiopure compounds. In certain embodiments, mixtures of enantiomers or diastereomers are provided.

Furthermore, certain compounds, as described herein may have one or more double bonds that can exist as either the Z or E isomer, unless otherwise indicated. The invention additionally encompasses the compounds as individual isomers substantially free of other isomers and alternatively, as mixtures of various isomers, e.g., racemic mixtures of enantiomers. In addition to the above-mentioned compounds per se, this invention also encompasses compositions comprising one or more compounds.

As used herein, the term "isomers" includes any and all geometric isomers and stereoisomers. For example, "isomers" include cis- and trans-isomers, E- and Z-isomers, R- and S-enantiomers, diastereomers, (D)-isomers, (L)-isomers, racemic mixtures thereof, and other mixtures thereof, as falling within the scope of the invention. For instance, a stereoisomer may, in some embodiments, be provided substantially free of one or more corresponding stereoisomers, and may also be referred to as "stereochemically enriched."

Where a particular enantiomer is preferred, it may, in some embodiments be provided substantially free of the opposite enantiomer, and may also be referred to as "optically enriched." "Optically enriched," as used herein, means that the compound or polymer is made up of a significantly greater proportion of one enantiomer. In certain embodiments the compound is made up of at least about 90% by weight of a preferred enantiomer. In other embodiments the compound is made up of at least about 95%, 98%, or 99% by weight of a preferred enantiomer. Preferred enantiomers may be isolated from racemic mixtures by any method known to those skilled in the art, including chiral high pressure liquid chromatography (HPLC) and the formation and crystallization of chiral salts or prepared by asymmetric syntheses. See, for example, Jacques, et al., *Enantiomers, Racemates and Resolutions* (Wiley Interscience, New York, 1981); Wilen, S. H., et al., *Tetrahedron* 33:2725 (1977); Eliel, E. L. *Stereochemistry of Carbon Compounds* (McGraw-Hill, NY, 1962); Wilen, S. H. *Tables of Resolving Agents and Optical Resolutions* p. 268 (E. L. Eliel, Ed., Univ. of Notre Dame Press, Notre Dame, Ind. 1972).

The term "epoxide", as used herein, refers to a substituted or unsubstituted oxirane. Such substituted oxiranes include monosubstituted oxiranes, disubstituted oxiranes, trisubstituted oxiranes, and tetrasubstituted oxiranes. Such epoxides may be further optionally substituted as defined herein. In certain embodiments, epoxides comprise a single oxirane moiety. In certain embodiments, epoxides comprise two or more oxirane moieties.

The term "polymer", as used herein, refers to a molecule of high relative molecular mass, the structure of which comprises the multiple repetition of units derived, actually or conceptually, from molecules of low relative molecular mass. In certain embodiments, a polymer is comprised of substantially alternating units derived from $CO_2$ and an epoxide (e.g., poly(ethylene carbonate). In certain embodiments, a polymer of the present invention is a copolymer, terpolymer, heteropolymer, block copolymer, or tapered heteropolymer incorporating two or more different epoxide monomers. With respect to the structural depiction of such higher polymers, the convention of showing enchainment of different monomer units separated by a slash may be used herein

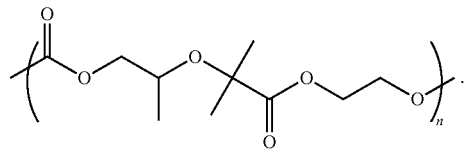

These structures are to be interpreted to encompass copolymers incorporating any ratio of the different monomer units depicted unless otherwise specified. This depiction is also meant to represent random, tapered, block co-polymers, and combinations of any two or more of these and all of these are implied unless otherwise specified.

The terms "halo" and "halogen" as used herein refer to an atom selected from fluorine (fluoro, —F), chlorine (chloro, —Cl), bromine (bromo, —Br), and iodine (iodo, —I).

The term "aliphatic" or "aliphatic group", as used herein, denotes a hydrocarbon moiety that may be straight-chain (i.e., unbranched), branched, or cyclic (including fused, bridging, and spiro-fused polycyclic) and may be completely saturated or may contain one or more units of unsaturation, but which is not aromatic. Unless otherwise specified, aliphatic groups contain 1-40 carbon atoms. In certain embodiments, aliphatic groups contain 1-20 carbon atoms. In certain embodiments, aliphatic groups contain 3-20 carbon atoms. In certain embodiments, aliphatic groups contain 1-12 carbon atoms. In certain embodiments, aliphatic groups contain 1-8 carbon atoms. In certain embodiments, aliphatic groups contain 1-6 carbon atoms. In some embodiments, aliphatic groups contain 1-5 carbon atoms, in some embodiments, aliphatic groups contain 1-4 carbon atoms, in some embodiments aliphatic groups contain 1-3 carbon atoms, and in some embodiments aliphatic groups contain 1 or 2 carbon atoms. Suitable aliphatic groups include, but are not limited to, linear or branched, alkyl, alkenyl, and alkynyl groups, and hybrids thereof such as (cycloalkyl)alkyl, (cycloalkenyl)alkyl or (cycloalkyl)alkenyl.

The term "heteroaliphatic," as used herein, refers to aliphatic groups wherein one or more carbon atoms are independently replaced by one or more atoms selected from the group consisting of oxygen, sulfur, nitrogen, or phosphorus. In certain embodiments, one to six carbon atoms are independently replaced by one or more of oxygen, sulfur, nitrogen, or phosphorus. Heteroaliphatic groups may be substituted or unsubstituted, branched or unbranched, cyclic or acyclic, and include saturated, unsaturated or partially unsaturated groups.

As used herein, the term "bivalent $C_{1-8}$ (or $C_{1-3}$) saturated or unsaturated, straight or branched, hydrocarbon chain", refers to bivalent alkyl, alkenyl, and alkynyl, chains that are straight or branched as defined herein.

The term "unsaturated", as used herein, means that a moiety has one or more double or triple bonds.

The terms "cycloaliphatic", "carbocycle", or "carbocyclic", used alone or as part of a larger moiety, refer to a saturated or partially unsaturated cyclic aliphatic monocyclic or polycyclic ring systems, as described herein, having from 3 to 12 members, wherein the aliphatic ring system is optionally substituted as defined above and described herein. Cycloaliphatic groups include, without limitation, cyclopropyl, cyclobutyl, cyclopentyl, cyclopentenyl, cyclohexyl, cyclohexenyl, cycloheptyl, cycloheptenyl, cyclooctyl, cyclooctenyl, norbornyl, adamantyl, and cyclooctadienyl. In some embodiments, the cycloalkyl has 3-6 carbons. The terms "cycloaliphatic", "carbocycle" or "carbocyclic" also include aliphatic rings that are fused to one or more aromatic or nonaromatic rings, such as decahydronaphthyl or tetrahydronaphthyl, where the radical or point of attachment is on the aliphatic ring. In certain embodiments, the term "3- to 7-membered carbocycle" refers to a 3- to 7-membered saturated or partially unsaturated monocyclic carbocyclic ring. In certain embodiments, the term "3- to 8-membered carbocycle" refers to a 3- to 8-membered saturated or partially unsaturated monocyclic carbocyclic ring. In certain embodiments, the terms "3- to 14-membered carbocycle" and "$C_{3-14}$ carbocycle" refer to a 3- to 8-membered saturated or partially unsaturated monocyclic carbocyclic ring, or a 7- to 14-membered saturated or partially unsaturated polycyclic carbocyclic ring.

The term "alkyl," as used herein, refers to saturated, straight- or branched-chain hydrocarbon radicals derived from an aliphatic moiety containing between one and six carbon atoms by removal of a single hydrogen atom. Unless otherwise specified, alkyl groups contain 1-12 carbon atoms. In certain embodiments, alkyl groups contain 1-8 carbon atoms. In certain embodiments, alkyl groups contain 1-6 carbon atoms. In some embodiments, alkyl groups contain 1-5 carbon atoms, in some embodiments, alkyl groups contain 1-4 carbon atoms, in some embodiments alkyl groups contain 1-3 carbon atoms, and in some embodiments alkyl groups contain 1-2 carbon atoms. Examples of alkyl radicals include, but are not limited to, methyl, ethyl, n-propyl, isopropyl, n-butyl, iso-butyl, sec-butyl, sec-pentyl, iso-pentyl, tert-butyl, n-pentyl, neopentyl, n-hexyl, sec-hexyl, n-heptyl, n-octyl, n-decyl, n-undecyl, dodecyl, and the like.

The term "alkenyl," as used herein, denotes a monovalent group derived from a straight- or branched-chain aliphatic moiety having at least one carbon-carbon double bond by the removal of a single hydrogen atom. Unless otherwise specified, alkenyl groups contain 2-12 carbon atoms. In certain embodiments, alkenyl groups contain 2-8 carbon atoms. In certain embodiments, alkenyl groups contain 2-6 carbon atoms. In some embodiments, alkenyl groups contain 2-5 carbon atoms, in some embodiments, alkenyl groups contain 2-4 carbon atoms, in some embodiments alkenyl groups contain 2-3 carbon atoms, and in some embodiments alkenyl groups contain 2 carbon atoms. Alkenyl groups include, for example, ethenyl, propenyl, butenyl, 1-methyl-2-buten-1-yl, and the like.

The term "alkynyl," as used herein, refers to a monovalent group derived from a straight- or branched-chain aliphatic moiety having at least one carbon-carbon triple bond by the removal of a single hydrogen atom. Unless otherwise specified, alkynyl groups contain 2-12 carbon atoms. In certain embodiments, alkynyl groups contain 2-8 carbon atoms. In certain embodiments, alkynyl groups contain 2-6 carbon atoms. In some embodiments, alkynyl groups contain 2-5 carbon atoms, in some embodiments, alkynyl groups contain 2-4 carbon atoms, in some embodiments alkynyl groups contain 2-3 carbon atoms, and in some embodiments alkynyl groups contain 2 carbon atoms. Representative alkynyl groups include, but are not limited to, ethynyl, 2-propynyl (propargyl), 1-propynyl, and the like.

The term "alkoxy", as used herein refers to an alkyl group, as previously defined, attached to the parent molecule through an oxygen atom. Examples of alkoxy, include but are not limited to, methoxy, ethoxy, propoxy, isopropoxy, n-butoxy, tert-butoxy, neopentoxy, and n-hexoxy.

The term "acyl", as used herein, refers to a carbonyl-containing functionality, e.g., —C(=O)R', wherein R' is hydrogen or an optionally substituted aliphatic, heteroaliphatic, heterocyclic, aryl, heteroaryl group, or is a substituted (e.g., with hydrogen or aliphatic, heteroaliphatic, aryl, or heteroaryl moieties) oxygen or nitrogen containing functionality (e.g., forming a carboxylic acid, ester, or amide functionality). The term "acyloxy", as used here, refers to an acyl group attached to the parent molecule through an oxygen atom.

The term "aryl" used alone or as part of a larger moiety as in "aralkyl", "aralkoxy", or "aryloxyalkyl", refers to monocyclic and polycyclic ring systems having a total of five to 20 ring members, wherein at least one ring in the system is aromatic and wherein each ring in the system contains three to twelve ring members. The term "aryl" may be used interchangeably with the term "aryl ring". In certain embodiments of the present invention, "aryl" refers to an aromatic ring system which includes, but is not limited to, phenyl, biphenyl, naphthyl, anthracyl and the like, which may bear one or more substituents. Also included within the scope of the term "aryl", as it is used herein, is a group in which an aromatic ring is fused to one or more additional rings, such as benzofuranyl, indanyl, phthalimidyl, naphthimidyl, phenantriidinyl, or tetrahydronaphthyl, and the like. In certain embodiments, the terms "6- to 10-membered aryl" and "$C_{6-10}$ aryl" refer to a phenyl or an 8- to 10-membered polycyclic aryl ring.

The terms "heteroaryl" and "heteroar-", used alone or as part of a larger moiety, e.g., "heteroaralkyl", or "heteroaralkoxy", refer to groups having 5 to 14 ring atoms, preferably 5, 6, or 9 ring atoms; having 6, 10, or 14 π electrons shared in a cyclic array; and having, in addition to carbon atoms, from one to five heteroatoms. The term "heteroatom" refers to nitrogen, oxygen, or sulfur, and includes any oxidized form of nitrogen or sulfur, and any quaternized form of a basic nitrogen. Heteroaryl groups include, without limitation, thienyl, furanyl, pyrrolyl, imidazolyl, pyrazolyl, triazolyl, tetrazolyl, oxazolyl, isoxazolyl, oxadiazolyl, thiazolyl, isothiazolyl, thiadiazolyl, pyridyl, pyridazinyl, pyrimidinyl, pyrazinyl, indolizinyl, purinyl, naphthyridinyl, benzofuranyl and pteridinyl. The terms "heteroaryl" and "heteroar-", as used herein, also include groups in which a heteroaromatic ring is fused to one or more aryl, cycloaliphatic, or heterocyclyl rings, where the radical or point of attachment is on the heteroaromatic ring. Nonlimiting examples include indolyl, isoindolyl, benzothienyl, benzofuranyl, dibenzofuranyl, indazolyl, benzimidazolyl, benzthiazolyl, quinolyl, isoquinolyl, cinnolinyl, phthalazinyl, quinazolinyl, quinoxalinyl, 4H-quinolizinyl, carbazolyl, acridinyl, phenazinyl, phenothiazinyl, phenoxazinyl, tetrahydroquinolinyl, tetrahydroisoquinolinyl, and pyrido[2,3-b]-1,4-oxazin-3(4H)-one. A heteroaryl group may be mono- or bicyclic. The term "heteroaryl" may be used interchangeably with the terms "heteroaryl ring", "heteroaryl group", or "heteroaromatic", any of which terms include rings that are optionally substituted. The term "heteroaralkyl" refers to an alkyl group substituted by a heteroaryl, wherein the alkyl and heteroaryl portions independently are optionally substituted. In certain embodiments, the term "5- to 10-membered heteroaryl" refers to a 5- to 6-membered heteroaryl ring having 1 to 3 heteroatoms independently selected from nitrogen, oxygen, or sulfur, or an 8- to 10-membered bicyclic heteroaryl ring having 1 to 4 heteroatoms independently selected from nitrogen, oxygen, or sulfur. In certain embodiments, the term "5- to 12-membered heteroaryl" refers to a 5- to 6-membered heteroaryl ring having 1 to 3 heteroatoms independently selected from nitrogen, oxygen, or sulfur, or an 8- to 12-membered bicyclic heteroaryl ring having 1 to 4 heteroatoms independently selected from nitrogen, oxygen, or sulfur.

As used herein, the terms "heterocycle", "heterocyclyl", "heterocyclic radical", and "heterocyclic ring" are used interchangeably and refer to a stable 5- to 7-membered monocyclic or 7-14-membered polycyclic heterocyclic moiety that is either saturated or partially unsaturated, and having, in addition to carbon atoms, one or more, preferably one to four, heteroatoms, as defined above. When used in reference to a ring atom of a heterocycle, the term "nitrogen" includes a substituted nitrogen. As an example, in a saturated or partially unsaturated ring having 0-3 heteroatoms selected from oxygen, sulfur or nitrogen, the nitrogen may be N (as in 3,4-dihydro-2H-pyrrolyl), NH (as in pyrrolidinyl), or $^+$NR (as in N-substituted pyrrolidinyl). In some embodiments, the term "3- to 7-membered heterocyclic" refers to a 3- to 7-membered saturated or partially unsaturated monocyclic heterocyclic ring having 1 to 2 heteroatoms independently selected from nitrogen, oxygen, or sulfur. In some embodiments, the term "3- to 12-membered heterocyclic" refers to a 3- to 8-membered saturated or partially unsaturated monocyclic heterocyclic ring having 1 to 2 heteroatoms independently selected from nitrogen, oxygen, or sulfur, or a 7- to 12-membered saturated or partially unsaturated polycyclic heterocyclic ring having 1-3 heteroatoms independently selected from nitrogen, oxygen, or sulfur.

A heterocyclic ring can be attached to its pendant group at any heteroatom or carbon atom that results in a stable structure and any of the ring atoms can be optionally substituted. Examples of such saturated or partially unsaturated heterocyclic radicals include, without limitation, tetrahydrofuranyl, tetrahydrothienyl, pyrrolidinyl, pyrrolidonyl, piperidinyl, pyrrolinyl, tetrahydroquinolinyl, tetrahydroisoquinolinyl, decahydroquinolinyl, oxazolidinyl, piperazinyl, dioxanyl, dioxolanyl, diazepinyl, oxazepinyl, thiazepinyl, morpholinyl, and quinuclidinyl. The terms "heterocycle", "heterocyclyl", "heterocyclyl ring", "heterocyclic group", "heterocyclic moiety", and "heterocyclic radical", are used interchangeably herein, and also include groups in which a heterocyclyl ring is fused to one or more aryl, heteroaryl, or cycloaliphatic rings, such as indolinyl, 3H-indolyl, chromanyl, phenanthridinyl, or tetrahydroquinolinyl, where the radical or point of attachment is on the heterocyclyl ring. A heterocyclyl group may be mono- or bicyclic. The term "heterocyclylalkyl" refers to an alkyl group substituted by a heterocyclyl, wherein the alkyl and heterocyclyl portions independently are optionally substituted.

As used herein, the term "partially unsaturated" refers to a ring moiety that includes at least one double or triple bond. The term "partially unsaturated" is intended to encompass rings having multiple sites of unsaturation, but is not intended to include aryl or heteroaryl moieties, as herein defined.

As described herein, compounds of the invention may contain "optionally substituted" moieties. In general, the term "substituted", whether preceded by the term "optionally" or not, means that one or more hydrogens of the designated moiety are replaced with a suitable substituent. Unless otherwise indicated, an "optionally substituted" group may have a suitable substituent at each substitutable position of the group, and when more than one position in any given structure may be substituted with more than one substituent selected from a specified group, the substituent may be either the same or different at every position. Combinations of substituents envisioned by this invention are preferably those that result in the formation of stable or chemically feasible compounds. The term "stable", as used herein, refers to compounds that are not substantially altered when subjected to conditions to allow for their production, detection, and, in certain embodiments, their recovery, purification, and use for one or more of the purposes disclosed herein.

Suitable monovalent substituents on a substitutable carbon atom of an "optionally substituted" group are independently halogen; —$(CH_2)_{0-4}R^{\circ}$; —$(CH_2)_{0-4}OR^{\circ}$; —O—$(CH_2)_{0-4}C(O)OR^{\circ}$; —$(CH_2)_{0-4}CH(OR^{\circ})_2$; —$(CH_2)_{0-4}SR^{\circ}$; —$(CH_2)_{0-4}$-Ph, which may be substituted with $R^{\circ}$; —$(CH_2)_{0-4}O(CH_2)_{0-1}$Ph which may be substituted with $R^{\circ}$; —CH=CHPh, which may be substituted with $R^{\circ}$; —$NO_2$; —CN; —$N_3$; —$(CH_2)_{0-4}N(R^{\circ})_2$; —$(CH_2)_{0-4}N(R^{\circ})C(O)R^{\circ}$; —$N(R^{\circ})C(S)R^{\circ}$; —$(CH_2)_{0-4}N(R^{\circ})C(O)NR^{\circ}_2$; —$N(R^{\circ})C(S)NR^{\circ}_2$; —$(CH_2)_{0-4}N(R^{\circ})C(O)OR^{\circ}$; —$N(R^{\circ})N(R^{\circ})C(O)R^{\circ}$; —$N(R^{\circ})N(R^{\circ})C(O)NR^{\circ}_2$; —$N(R^{\circ})N(R^{\circ})C(O)OR^{\circ}$; —$(CH_2)_{0-4}C(O)R^{\circ}$; —$C(S)R^{\circ}$; —$(CH_2)_{0-4}C(O)OR^{\circ}$; —$(CH_2)_{0-4}C(O)N(R^{\circ})_2$; —$(CH_2)_{0-4}C(O)SR^{\circ}$; —$(CH_2)_{0-4}C(O)OSiR^{\circ}_3$; —$(CH_2)_{0-4}OC(O)R$; —OC(O)$(CH_2)_{0-4}$—SR—, SC(S)SR$^{\circ}$; —$(CH_2)_{0-4}SC(O)R^{\circ}$; —$(CH_2)_{0-4}C(O)NR^{\circ}_2$; —$C(S)NR^{\circ}_2$; —$C(S)SR^{\circ}$; —SC(S)SRO, —$(CH_2)_{0-4}$—OC(O)NR$^{\circ}_2$; —C(O)N(OR$^{\circ}$)R$^{\circ}$; —C(O)C(O)R$^{\circ}$; —C(O)CH$_2$C(O)R$^{\circ}$; —C(NOR$^{\circ}$)R$^{\circ}$; —$(CH_2)_{0-4}SSR^{\circ}$; —$(CH_2)_{0-4}S(O)_2R^{\circ}$; —$(CH_2)_{0-4}S(O)_2OR^{\circ}$; —$(CH_2)_{0-4}OS(O)_2R^{\circ}$; —$S(O)_2NR^{\circ}_2$; —$(CH_2)_{0-4}S(O)R^{\circ}$; —$N(R^{\circ})S(O)_2NR^{\circ}_2$; —$N(R^{\circ})S(O)_2R^{\circ}$; —N(OR$^{\circ}$)R$^{\circ}$; —C(NH)NR$^{\circ}_2$; —$P(O)_2R^{\circ}$; —$P(O)R^{\circ}_2$; —$OP(O)R^{\circ}_2$; —OP(O)(OR$^{\circ}$)$_2$; SiR$^{\circ}_3$; —$(C_{1-4}$ straight or branched alkylene)O—N(R$^{\circ}$)$_2$; or —$(C_{1-4}$ straight or branched alkylene)C(O)O—N(R$^{\circ}$)$_2$, wherein each R$^{\circ}$ may be substituted as defined below and is independently hydrogen, $C_{1-8}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur, or, notwithstanding the definition above, two independent occurrences of R$^{\circ}$, taken together with their intervening atom(s), form a 3-12-membered saturated, partially unsaturated, or aryl mono- or polycyclic ring having 0-4 heteroatoms independently selected from nitrogen, oxygen, or sulfur, which may be substituted as defined below.

Suitable monovalent substituents on R$^{\circ}$ (or the ring formed by taking two independent occurrences of R$^{\circ}$ together with their intervening atoms), are independently halogen, —(CH$_2$)$_{0-2}$R$^●$, -(haloR$^●$), —(CH$_2$)$_{0-2}$OH, —(CH$_2$)$_{0-2}$OR$^●$, —(CH$_2$)$_{0-2}$CH(OR$^●$)$_2$; —O(haloR$^●$), —CN, —N$_3$, —(CH$_2$)$_{0-2}$C(O)R$^●$, —(CH$_2$)$_{0-2}$C(O)OH, —(CH$_2$)$_{0-2}$C(O)OR$^●$, —(CH$_2$)$_{0-4}$C(O)N(R$^○$)$_2$; —(CH$_2$)$_{0-2}$SR$^●$, —(CH$_2$)$_{0-2}$SH, —(CH$_2$)$_{0-2}$NH$_2$, —(CH$_2$)$_{0-2}$NHR$^●$, —(CH$_2$)$_{0-2}$NR$^●_2$, —NO$_2$, —SiR$^●_3$, —OSiR$^●_3$, —C(O)SR$^●$, —(C$_{1-4}$ straight or branched alkylene)C(O)OR$^●$, or —SSR$^●$ wherein each R$^●$ is unsubstituted or where preceded by "halo" is substituted only with one or more halogens, and is independently selected from C$_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur. Suitable divalent substituents on a saturated carbon atom of R$^○$ include =O and =S.

Suitable divalent substituents on a saturated carbon atom of an "optionally substituted" group include the following: =O, =S, =NNR*$_2$, =NNHC(O)R*, =NNHC(O)OR*, =NNHS(O)$_2$R*, =NR*, =NOR*, —O(C(R*$_2$))$_{2-3}$O—, or —S(C(R*$_2$))$_{2-3}$S—, wherein each independent occurrence of R* is selected from hydrogen, C$_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur. Suitable divalent substituents that are bound to vicinal substitutable carbons of an "optionally substituted" group include: —O(CR*$_2$)$_{2-3}$O—, wherein each independent occurrence of R* is selected from hydrogen, C$_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur.

Suitable substituents on the aliphatic group of R* include halogen, —R$^●$, -(haloR$^●$), —OH, —OR$^●$, —O(haloR$^●$), —CN, —C(O)OH, —C(O)OR$^●$, —NH$_2$, —NHR$^●$, —NR$^●_2$, or —NO$_2$, wherein each R$^●$ is unsubstituted or where preceded by "halo" is substituted only with one or more halogens, and is independently C$_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur.

Suitable substituents on a substitutable nitrogen of an "optionally substituted" group include —R$^†$, —NR$^†_2$, —C(O)R$^†$, —C(O)OR$^†$, —C(O)C(O)R$^†$, —C(O)CH$_2$C(O)R$^†$, —S(O)$_2$R$^†$, —S(O)$_2$NR$^†_2$, —C(S)NR$^†_2$, —C(NH)NR$^†_2$, or —N(R$^†$)S(O)$_2$R$^†$; wherein each R$^†$ is independently hydrogen, C$_{1-6}$ aliphatic which may be substituted as defined below, unsubstituted —OPh, or an unsubstituted 5-6-membered saturated, partially unsaturated, or aryl ring having 0-4 heteroatoms independently selected from nitrogen, oxygen, or sulfur, or, notwithstanding the definition above, two independent occurrences of R$^†$, taken together with their intervening atom(s) form an unsubstituted 3-12-membered saturated, partially unsaturated, or aryl mono- or bicyclic ring having 0-4 heteroatoms independently selected from nitrogen, oxygen, or sulfur.

Suitable substituents on the aliphatic group of R$^†$ are independently halogen, —R$^●$, -(haloR$^●$), —OH, —OR', —O(haloR$^●$), —CN, —C(O)OH, —C(O)OR$^●$, —NH$_2$, —NHR$^●$, —NR$^●_2$, or —NO$_2$, wherein each R$^●$ is unsubstituted or where preceded by "halo" is substituted only with one or more halogens, and is independently C$_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur.

When substituents are described herein, the term "radical" or "optionally substituted radical" is sometimes used. In this context, "radical" means a moiety or functional group having an available position for attachment to the structure on which the substituent is bound. In general the point of attachment would bear a hydrogen atom if the substituent were an independent neutral molecule rather than a substituent. The terms "radical" or "optionally-substituted radical" in this context are thus interchangeable with "group" or "optionally-substituted group".

As used herein, the "term head-to-tail" or "HT", refers to the regiochemistry of adjacent repeating units in a polymer chain. For example, in the context of poly(propylene carbonate) (PPC), the term head-to-tail based on the three regiochemical possibilities depicted below:

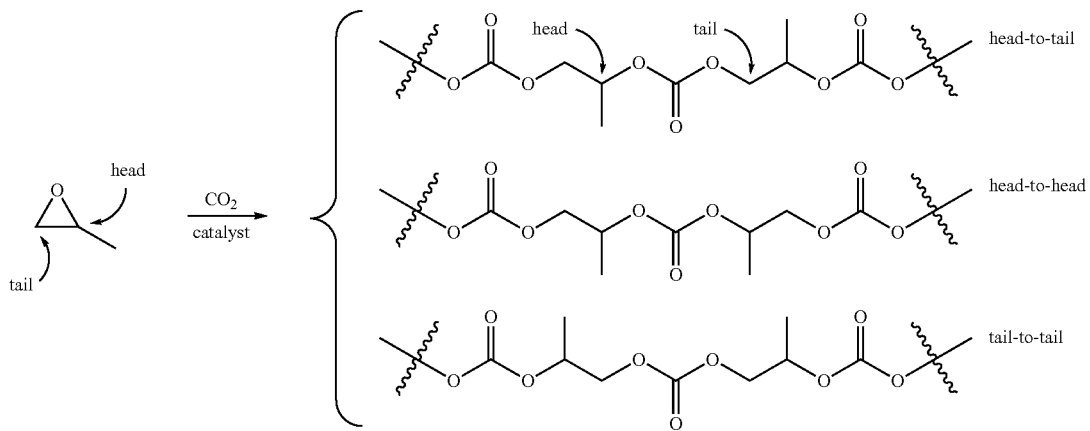

The term head-to-tail ratio (H:T) refers to the proportion of head-to-tail linkages to the sum of all other regiochemical possibilities. With respect to the depiction of polymer structures, while a specific regiochemical orientation of monomer units may be shown in the representations of polymer structures herein, this is not intended to limit the polymer structures to the regiochemical arrangement shown but is to be interpreted to encompass all regiochemical arrangements including that depicted, the opposite regiochemistry, random mixtures, isotactic materials, syndiotactic materials, racemic materials, and/or enantioenriched materials and combinations of any of these unless otherwise specified.

As used herein the term "alkoxylated" means that one or more functional groups on a molecule (usually the functional group is an alcohol, amine, or carboxylic acid, but is not strictly limited to these) has appended to it a hydroxy-terminated alkyl chain. Alkoxylated compounds may comprise a single alkyl group or they may be oligomeric moieties such as hydroxyl-terminated polyethers. Alkoxylated materials can be derived from the parent compounds by treatment of the functional groups with epoxides.

BRIEF DESCRIPTION OF THE DRAWINGS

FIG. 6a-c is a table of mechanical and thermal data for Samples A through Y.

DETAILED DESCRIPTION OF CERTAIN EMBODIMENTS

Figure 1:
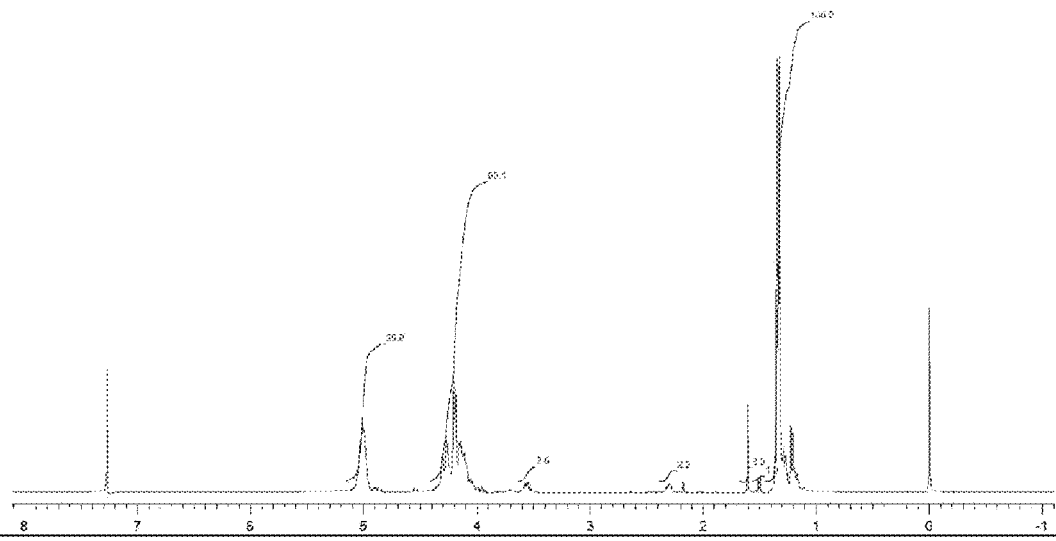
FIG. 1 shows proton NMR spectra of poly(propylene carbonate) compositions.
Figure 1:
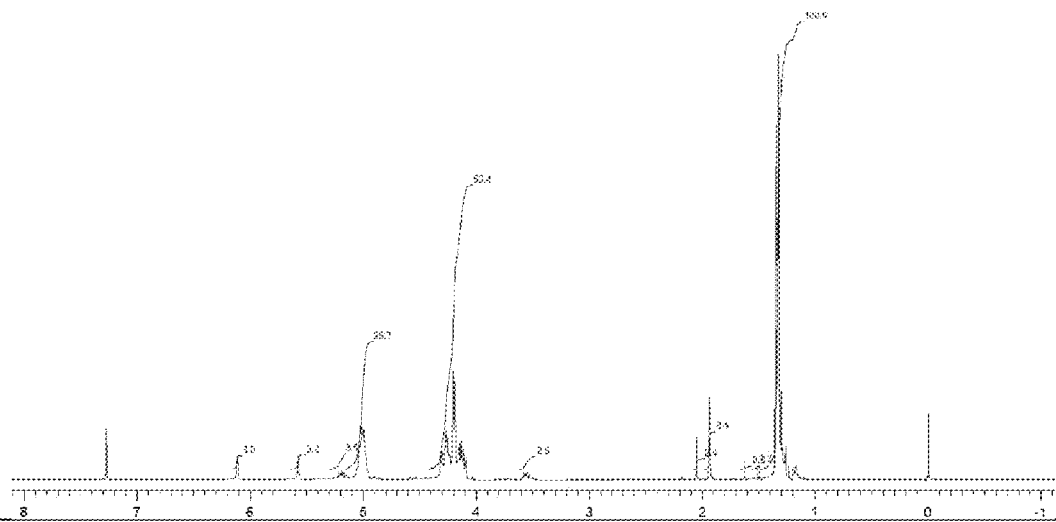

The present invention encompasses polymer compositions comprising aliphatic polycarbonate chains containing sites of olefinic unsaturation. In certain embodiments the aliphatic polycarbonate chains comprise sites of olefinic unsaturation capable of participating in radical-promoted olefin polymerizations.

In certain embodiments, the present invention encompasses polymer compositions containing aliphatic polycarbonate polymers comprising olefinic groups at one or more chain ends. In certain embodiments, olefinic groups are introduced by modifying hydroxyl end-groups on aliphatic polycarbonate chains in a post-polymerization step. In some embodiments, olefinic end-groups are introduced during polymerization by initiating aliphatic polycarbonate chains with reagents containing one or more olefinic groups and a functional group that can initiate copolymerization of carbon dioxide and epoxides. In some embodiments, aliphatic polycarbonate chains may be derived by a combination of both of these approaches.

I) Aliphatic Polycarbonates with Olefinic End-Groups.

In certain embodiments, the present invention encompasses polymer compositions containing aliphatic polycarbonate polymers comprising olefinic groups at one or more chain ends. In certain embodiments, olefinic groups are introduced by modifying hydroxyl end-groups on aliphatic polycarbonate chains in a post-polymerization step. In some embodiments, olefinic end-groups are introduced during polymerization by initiating aliphatic polycarbonate chains with reagents containing one or more olefinic groups and a functional group that can initiate copolymerization of carbon dioxide and epoxides. In some embodiments, aliphatic polycarbonate chains are derived by a combination of both of these approaches.

Turning first to compounds derived from post-polymerization modification, in certain embodiments, aliphatic polycarbonate chains containing at least one hydroxyl end-group are chemically modified in a post-polymerization reaction to introduce sites of olefinic unsaturation:

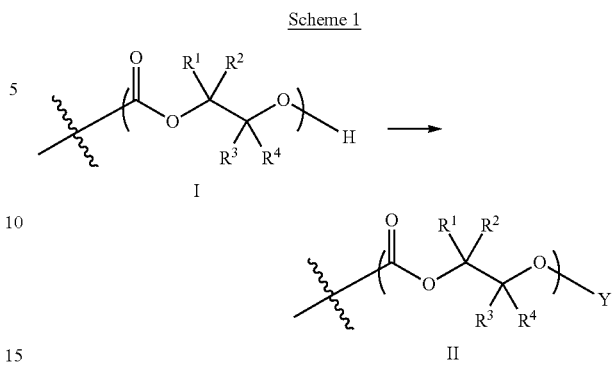

Scheme 1

As depicted in Scheme 1, structure I represents a portion of an aliphatic polycarbonate chain (each chain may have more than one such end) and structure II represents a modified analog of I with an olefinic end group Y, wherein:

$R^1$, $R^2$, $R^3$, and $R^4$ are, at each occurrence in the polymer chain, independently selected from the group consisting of —H, fluorine, an optionally substituted $C_{1-30}$ aliphatic group, and an optionally substituted $C_{1-20}$ heteroaliphatic group, and an optionally substituted $C_{6-10}$ aryl group, where any two or more of $R^1$, $R^2$, $R^3$, and $R^4$ may optionally be taken together with intervening atoms to form one or more optionally substituted rings optionally containing one or more heteroatoms; and each Y is independently a functional group containing olefinic unsaturation.

In certain embodiments, the sites of olefinic unsaturation in Y comprise radically-polymerizable olefins such as acrylates, styrenes, vinyl ethers or vinyl esters.

In certain embodiments, Y in structure II represents an acrylate ester. In certain embodiments, such an acrylate ester has a formula IIa:

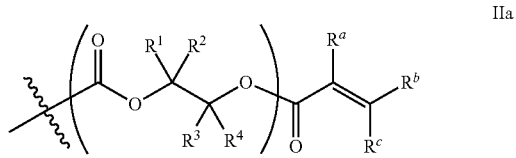

wherein each of $R^1$, $R^2$, $R^3$, and $R^4$ is as defined above and described in classes and subclasses herein; and $R^a$, $R^b$, and $R^c$ are, at each occurrence, independently selected from the group consisting of —H, an optionally substituted $C_{1-20}$ aliphatic group, an optionally substituted $C_{1-20}$ heteroaliphatic group, an optionally substituted acyloxy group, an optionally substituted acyl group, an optionally substituted alkoxy group, an optionally substituted 3- to 14-membered carbocyclic group, and an optionally substituted 3- to 12-membered heterocyclic group, where any two or more of $R^a$, $R^b$, and $R^c$ may optionally be taken together with intervening atoms to form one or more optionally substituted rings optionally containing one or more heteroatoms.

In certain embodiments, acrylate esters of formula IIa are selected from the group consisting of:

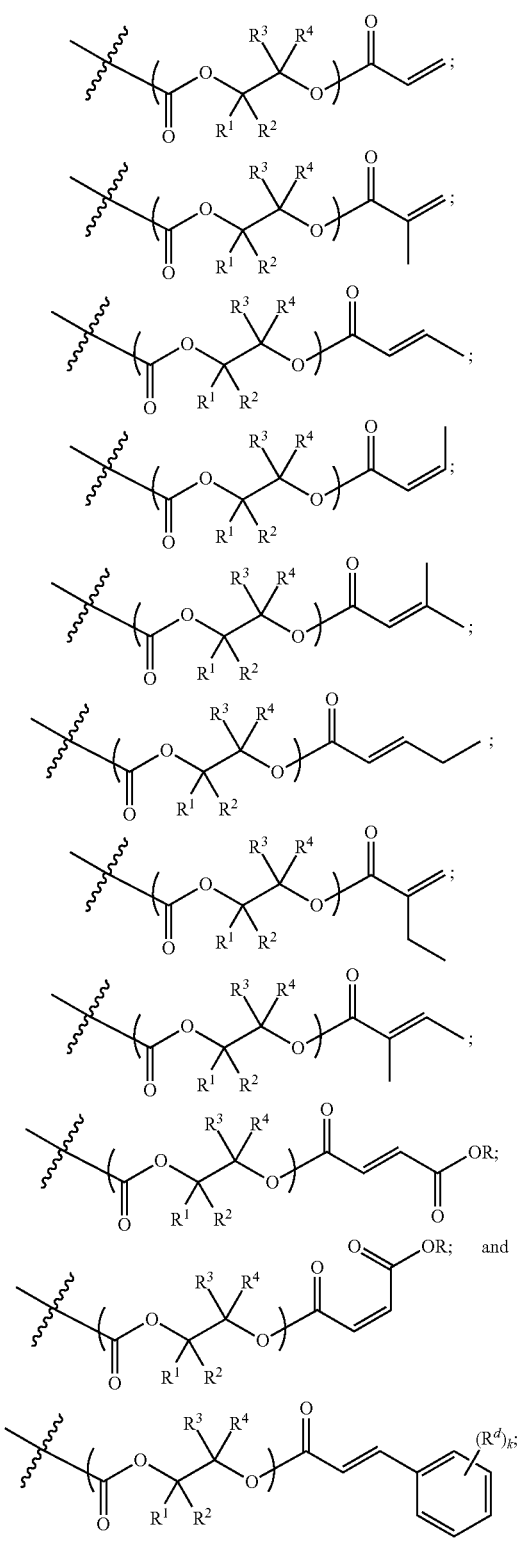

wherein each of k, R, $R^1$, $R^2$, $R^3$, and $R^4$ is as defined above and described in classes and subclasses herein;

$R^d$ is, at each occurrence, independently selected from the group consisting of: halogen, —$NO_2$, —CN, —SR, —S(O)R, —$S(O)_2$R, —NRC(O)R, —OC(O)R, —$CO_2$R, —NCO, —$N_3$, —OR, —OC(O)N(R)$_2$, —N(R)$_2$, —NRC(O)R, —NRC(O)OR; or an optionally substituted radical selected from the group consisting of $C_{1-20}$ aliphatic, $C_{1-20}$ heteroaliphatic, a 3- to 14-membered carbocycle, a 3- to 12-membered heterocycle, a 5- to 12-membered heteroaryl, and 6- to 10-membered aryl; where two or more adjacent $R^d$ groups can be taken together to form an optionally substituted saturated, partially unsaturated, or aromatic 5- to 12-membered ring containing 0 to 4 heteroatoms;

k is from 0 to 5; and each occurrence of R is independently —H, or an optionally substituted moiety selected from the group consisting of $C_{1-6}$ aliphatic, $C_{1-6}$ heteroaliphatic, 3- to 7-membered heterocyclic, 3- to 7-membered carbocyclic 6- to 10-membered aryl, and 5- to 10-membered heteroaryl.

In some embodiments, each Y is independently selected from the group consisting of:

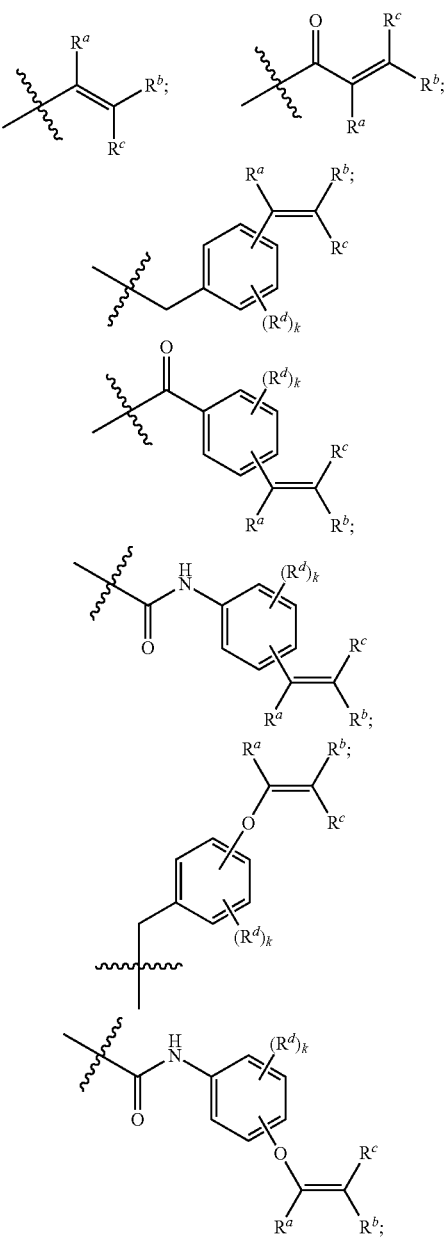

-continued

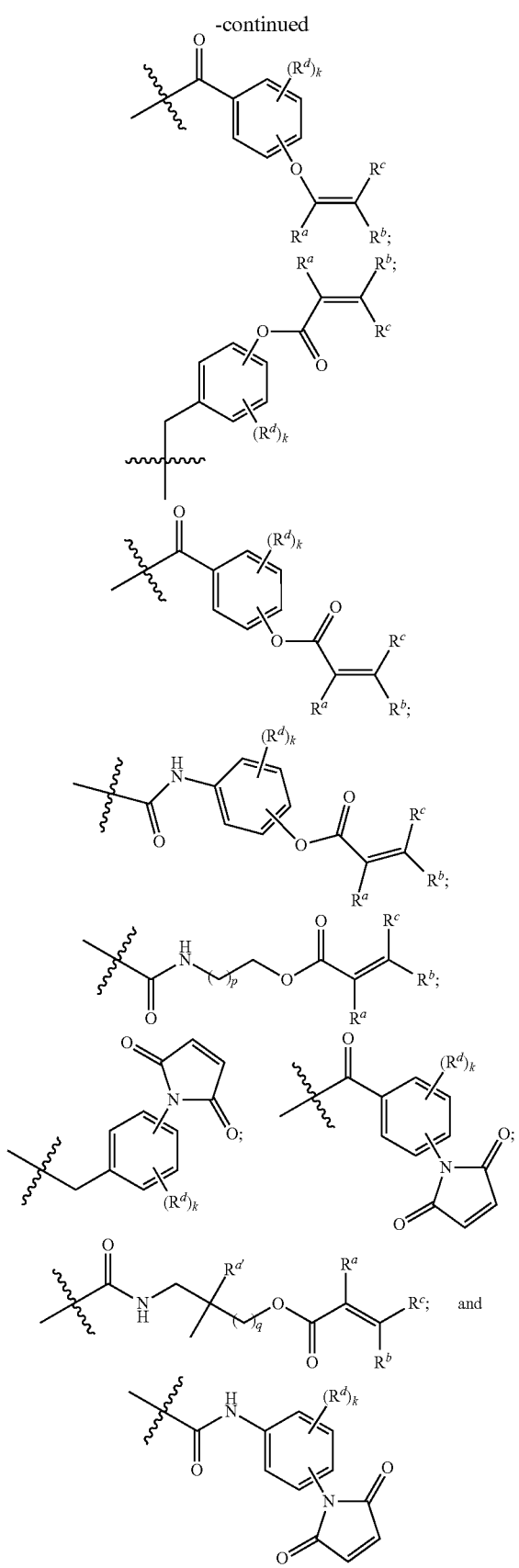

wherein each of R, $R^a$, $R^b$, $R^c$, and $R^d$ is as defined above and described in classes and subclasses herein, p is from 1 to 6, k is from 0 to 4, q is from 1 to 6, and $R^{a'}$ is at each occurrence independently selected from the group consisting of: halogen, optionally substituted $C_{1-20}$ aliphatic, and optionally substituted $C_{1-20}$ heteroaliphatic.

In some embodiments, each Y is independently selected from the group consisting of:

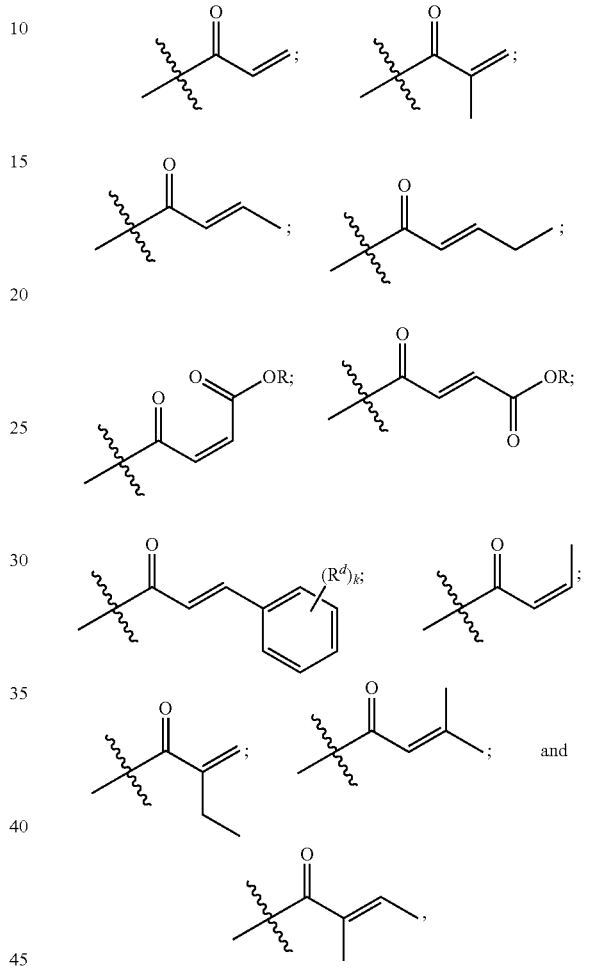

wherein each of k, R, and $R^d$ is as defined above and described in classes and subclasses herein.

In certain embodiments, polymer compositions of the present invention comprise aliphatic polycarbonate chains containing one or more moieties IIa-1:

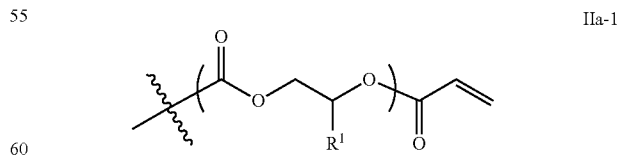

IIa-1 wherein $R^1$ is as defined above and described in classes and subclasses herein.

In certain embodiments, polymer compositions of the present invention comprise aliphatic polycarbonate chains containing one or more moieties IIa-2:

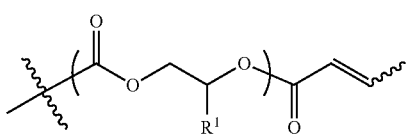

IIa-2 wherein $R^1$ is as defined above and described in classes and subclasses herein.

In certain embodiments, polymer compositions of the present invention comprise aliphatic polycarbonate chains containing one or more moieties IIa-3:

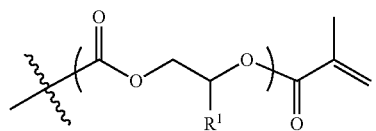

IIa-3 wherein $R^1$ is as defined above and described in classes and subclasses herein.

In certain embodiments, polymer compositions of the present invention comprise aliphatic polycarbonate chains containing one or more moieties IIa-4:

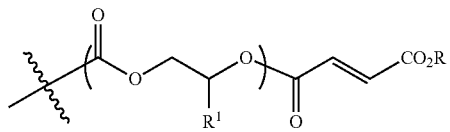

IIa-4 wherein each of $R^1$ and R is as defined above and described in classes and subclasses herein.

In certain embodiments, polymer compositions of the present invention comprise aliphatic polycarbonate chains containing one or more moieties IIa-5:

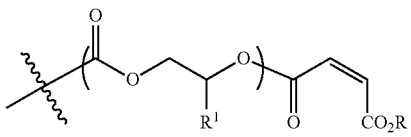

IIa-5 wherein each of $R^1$ and R is as defined above and described in classes and subclasses herein.

In certain embodiments where polymers contain moieties of structures IIa-4 and/or IIa-5, R is selected from the group consisting of: —H, methyl, ethyl, n-propyl, isopropyl, n-butyl, sec-butyl, tert-butyl, and optionally substituted phenyl. In certain embodiments R is —H. In certain embodiments R is methyl or ethyl. In certain embodiments, R is methyl. In certain embodiments, R is —H.

In certain embodiments, a Y group in formula II comprises a carbamate group. In certain embodiments, such carbamates have a formula IIb:

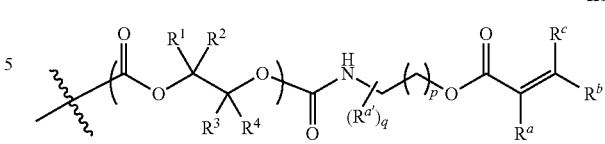

IIb where $R^1$, $R^2$, $R^3$, $R^4$, $R^a$, $R^b$, and $R^c$ are as defined above;

p is from 1 to 12;

q is from 0 to 6; and each $R^{a\prime}$ is independently selected from the group consisting of halogen, an optionally substituted $C_{1-20}$ aliphatic group, an optionally substituted $C_{1-20}$ heteroaliphatic group, an optionally substituted 3- to 14-membered carbocycle, and an optionally substituted 3- to 12-membered heterocyclic group, where when more than one $R^{a\prime}$ group is present, two or more of them may optionally be taken together with intervening atoms to form one or more optionally substituted rings optionally containing one or more heteroatoms.

In certain embodiments, carbamate derivatives of formula IIb are selected from the group consisting of:

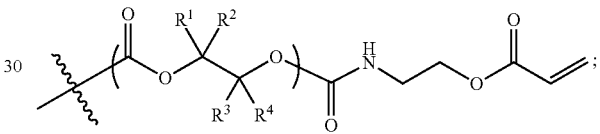

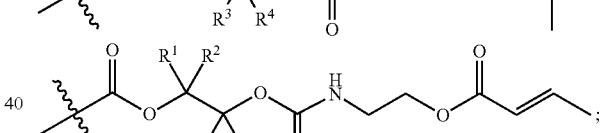

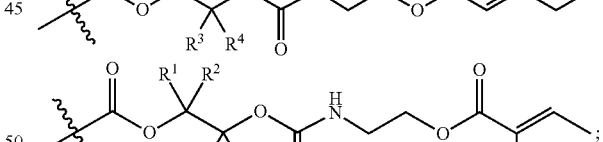

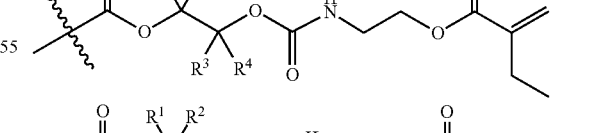

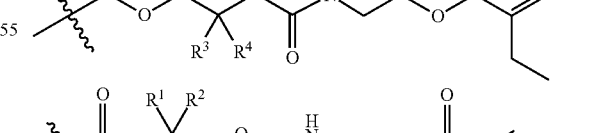

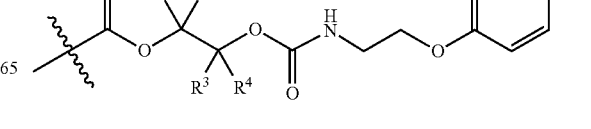

-continued

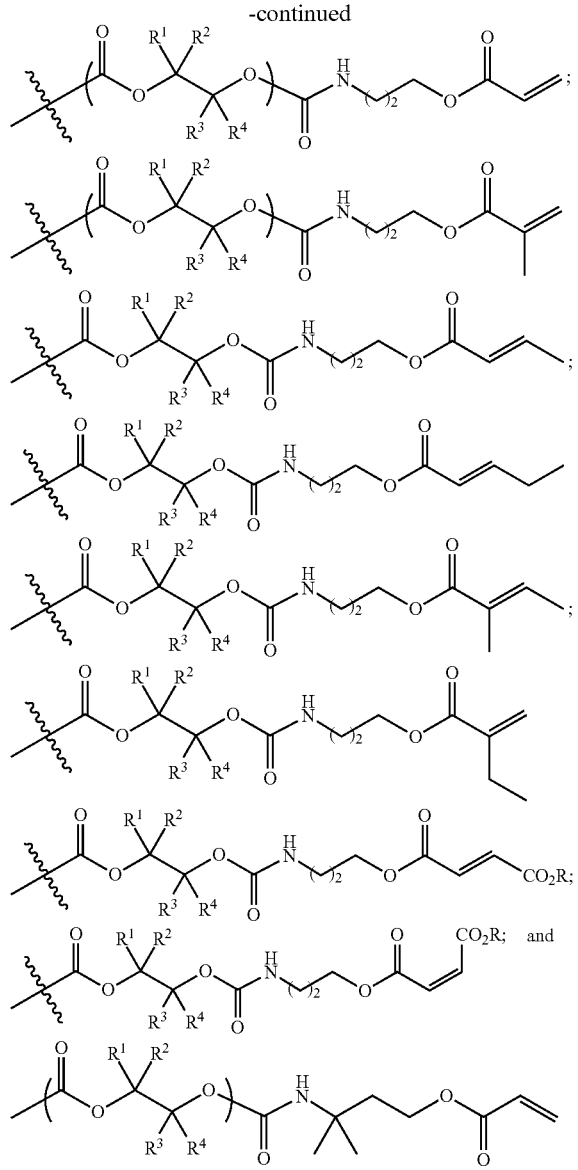

wherein each of $R^1$, $R^2$, $R^3$, $R^4$, and R is as defined above and described in classes and subclasses herein.

In certain embodiments, polymer compositions of the present invention comprise aliphatic polycarbonate chains containing one or more moieties IIb-1:

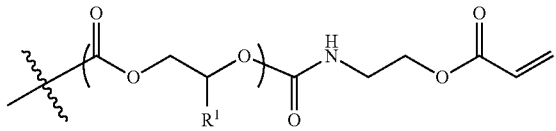

IIb-1 where $R^1$ is as defined above and described in classes and subclasses herein.

In certain embodiments, polymer compositions of the present invention comprise aliphatic polycarbonate chains containing one or more moieties IIb-2:

IIb-2

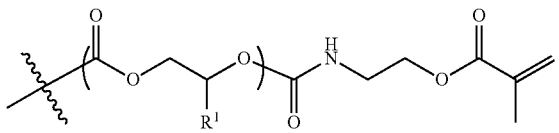

wherein $R^1$ is as defined above and described in classes and subclasses herein.

In certain embodiments, polymer compositions of the present invention comprise aliphatic polycarbonate chains containing one or more moieties IIb-3:

IIb-3

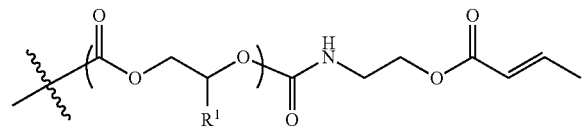

wherein $R^1$ is as defined above and described in classes and subclasses herein.

In certain embodiments, polymer compositions of the present invention comprise aliphatic polycarbonate chains containing one or more moieties IIb-4:

IIb-4

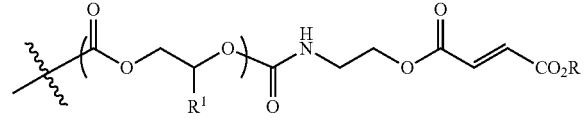

wherein each of $R^1$ and R is as defined above and described in classes and subclasses herein.

In certain embodiments, polymer compositions of the present invention comprise aliphatic polycarbonate chains containing one or more moieties IIb-5:

IIb-5

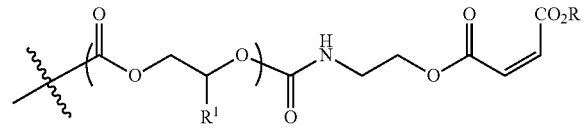

wherein each of $R^1$ and R is as defined above and described in classes and subclasses herein.

In certain embodiments, polymer compositions of the present invention comprise aliphatic polycarbonate chains containing one or more moieties IIb-6:

IIb-6

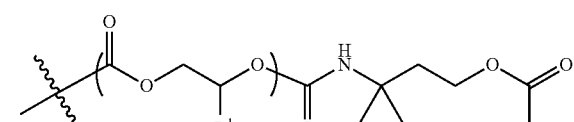

wherein $R^1$ is as defined above and described in classes and subclasses herein.

In certain embodiments, a Y group in formula II comprises a cinnamate ester. In certain embodiments, such cinnamate esters have a formula IIc:

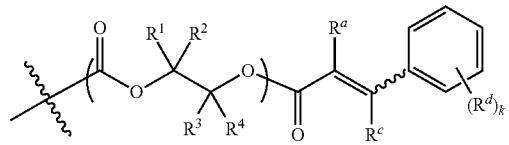

wherein each of k, $R^1$, $R^2$, $R^3$, $R^4$, $R^a$, $R^c$, and $R^d$ is as defined above and described in classes and subclasses herein.

In certain embodiments, where aliphatic polycarbonate chains contain one or more fragments of formula II, each polymer chain contains, on average, at least two such fragments. In certain embodiments, such polymers have a structure P1:

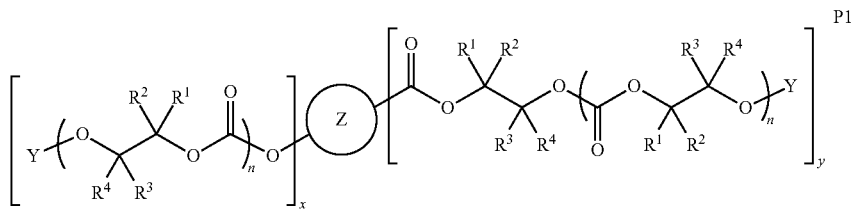

wherein each of $R^1$, $R^2$, $R^3$, $R^4$, and Y is as defined above and described in classes and subclasses herein;
n is an integer from about 4 to about 1,000;

is a multivalent moiety; and
x and y are each independently from 0 to 6, where the sum of x and y is between 2 and 6.

In certain embodiments, such polycarbonate chains have two ends each terminated with a —Y group as defined hereinabove. In certain embodiments, —Y groups are the same at each occurrence and are derived by post-polymerization reactions on the hydroxy end groups of a polycarbonate chain. In other embodiments, one or more —Y groups are different from other —Y groups.

In certain embodiments, a multivalent moiety

embedded within the aliphatic polycarbonate chain is derived from a polyfunctional chain transfer agent having two or more sites from which epoxide/$CO_2$ copolymerization can occur. In certain embodiments, such copolymerizations are performed in the presence of polyfunctional chain transfer agents as exemplified in published PCT application PCT/US09/056220 the entirety of which is incorporated herein by reference.

In certain embodiments, a polyfunctional chain transfer agent has a formula:

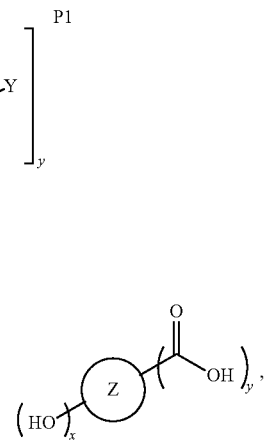

wherein each of

x, and y is as defined above and described in classes and subclasses herein.

In certain embodiments, aliphatic polycarbonate chains in the inventive polymer compositions are derived from the copolymerization of one or more epoxides with carbon dioxide in the presence of such polyfunctional chain transfer agents as shown in Scheme 2:

Scheme 2

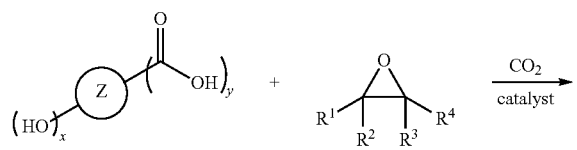

-continued

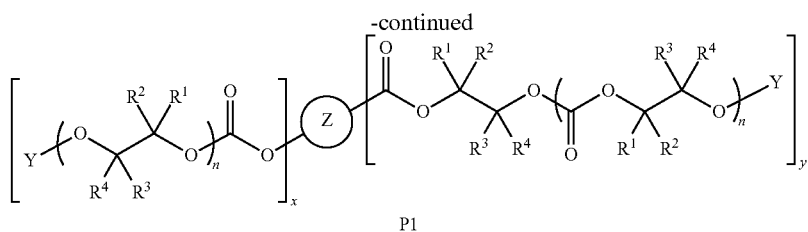

P1

In certain embodiments, aliphatic polycarbonate chains in polymer compositions of the present invention comprise chains with the structure P2:

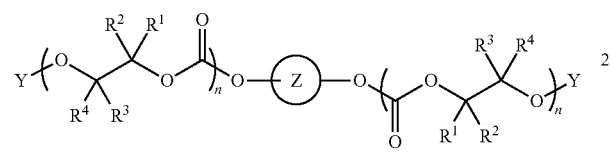

P2 wherein each of $R^1$, $R^2$, $R^3$, $R^4$, Y,

Ⓩ and n is as defined above and described in classes and subclasses herein.

In certain embodiments where aliphatic polycarbonate chains have a structure P2,

Ⓩ is derived from a dihydric alcohol. In such instances

Ⓩ represents the carbon-containing backbone of the dihydric alcohol, while the two oxygen atoms adjacent to

Ⓩ are derived from the —OH groups of the diol. For example, if the dihydric alcohol were derived from ethylene glycol, then

Ⓩ would be —$CH_2CH_2$— and P2 would have the following structure:

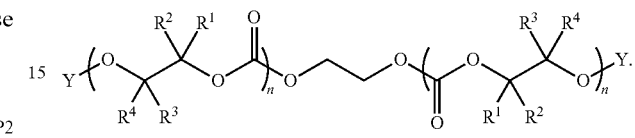

In certain embodiments, where

Ⓩ is derived from a dihydric alcohol, the dihydric alcohol comprises a $C_{2-40}$ diol. In certain embodiments, the dihydric alcohol is selected from the group consisting of: 1,2-ethanediol, 1,2-propanediol, 1,3-propanediol, 1,2-butanediol, 1,3-butanediol, 1,4-butanediol, 1,5-pentanediol, 2,2-dimethylpropane-1,3-diol, 2-butyl-2-ethylpropane-1,3-diol, 2-methyl-2,4-pentane diol, 2-ethyl-1,3-hexane diol, 2-methyl-1,3-propane diol, 1,5-hexanediol, 1,6-hexanediol, 1,8-octanediol, 1,10-decanediol, 1,12-dodecanediol, 2,2,4,4-tetramethylcyclobutane-1,3-diol, 1,3-cyclopentanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 1,4-cyclohexanediethanol, isosorbide, glycerol monoesters, glycerol monoethers, trimethylolpropane monoesters, trimethylolpropane monoethers, pentaerythritol diesters, pentaerythritol diethers, and alkoxylated derivatives of any of these.

In certain embodiments, where

Ⓩ is derived from a dihydric alcohol, the dihydric alcohol is selected from the group consisting of: diethylene glycol, triethylene glycol, tetraethylene glycol, higher poly(ethylene glycol), such as those having number average molecular weights of from 220 to about 2000 g/mol, dipropylene glycol, tripropylene glycol, and higher poly(propylene glycols) such as those having number average molecular weights of from 234 to about 2000 g/mol.

In certain embodiments, where

Ⓩ is derived from a dihydric alcohol, the dihydric alcohol comprises an alkoxylated derivative of a compound selected from the group consisting of: a diacid, a diol, or a hydroxy acid. In certain embodiments, the alkoxylated derivatives comprise ethoxylated or propoxylated compounds.

In certain embodiments, where $$\boxed{Z}$$

is derived from a dihydric alcohol, the dihydric alcohol comprises a polymeric diol. In certain embodiments, a polymeric diol is selected from the group consisting of polyethers, polyesters, hydroxy-terminated polyolefins, polyether-copolyesters, polyether polycarbonates, polycarbonate-copolyesters, and alkoxylated analogs of any of these. In certain embodiments, the polymeric diol has an average molecular weight less than about 2000 g/mol.

In certain embodiments, $$\boxed{Z}$$

is derived from a polyhydric alcohol with more than two hydroxy groups. In certain embodiments, the aliphatic polycarbonate chains in polymer compositions of the present invention comprise aliphatic polycarbonate chains where the moiety $$\boxed{Z}$$

is derived from a triol. In certain embodiments, such aliphatic polycarbonate chains have the structure P3:

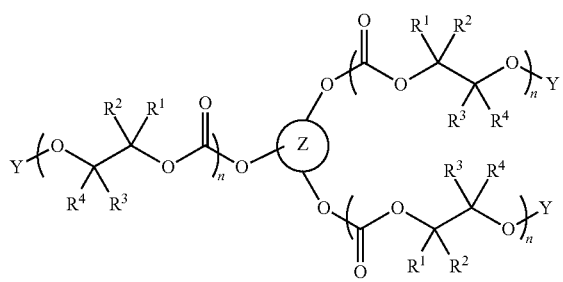

P3 wherein each of $R^1$, $R^2$, $R^3$, $R^4$, Y, $$\boxed{Z}$$

and n is as defined above and described in classes and subclasses herein.

In certain embodiments, where $$\boxed{Z}$$

is derived from a triol, the triol is selected from the group consisting of: glycerol, 1,2,4-butanetriol, 2-(hydroxymethyl)-1,3-propanediol; hexane triols, trimethylol propane, trimethylol ethane, trimethylolhexane, 1,4-cyclohexanetrimethanol, pentaerythritol mono esters, pentaerythritol mono ethers, and alkoxylated analogs of any of these. In certain embodiments, alkoxylated derivatives comprise ethoxylated or propoxylated compounds.

In certain embodiments, $$\boxed{Z}$$

is derived from an alkoxylated derivative of a trifunctional carboxylic acid or trifunctional hydroxy acid. In certain embodiments, alkoxylated polymeric derivatives comprise ethoxylated or propoxylated compounds.

In certain embodiments, where $$\boxed{Z}$$

is derived from a polymeric triol, the polymeric triol is selected from the group consisting of polyethers, polyesters, hydroxy-terminated polyolefins, polyether-copolyesters, polyether polycarbonates, polycarbonate-copolyesters, and alkoxylated analogs of any of these. In certain embodiments, the alkoxylated polymeric triols comprise ethoxylated or propoxylated compounds.

In certain embodiments, $$\boxed{Z}$$

is derived from a polyhydric alcohol with four hydroxy groups. In certain embodiments, aliphatic polycarbonate chains in polymer compositions of the present invention comprise aliphatic polycarbonate chains where the moiety $$\boxed{Z}$$

is derived from a tetraol. In certain embodiments, aliphatic polycarbonate chains in polymer compositions of the present invention comprise chains with the structure P4:

P4

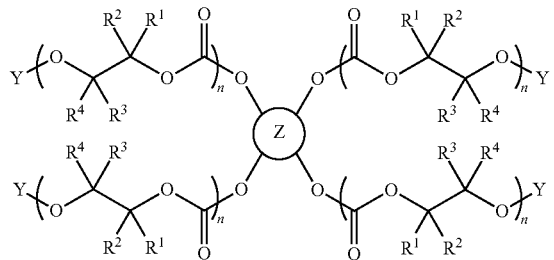

wherein each of $R^1$, $R^2$, $R^3$, $R^4$, Y,

and n is as defined above and described in classes and subclasses herein.

In certain embodiments,

is derived from a polyhydric alcohol with more than four hydroxy groups. In certain embodiments,

is derived from a polyhydric alcohol with six hydroxy groups. In certain embodiments, a polyhydric alcohol is dipentaerithrotol or an alkoxylated analog thereof. In certain embodiments, a polyhydric alcohol is sorbitol or an alkoxylated analog thereof. In certain embodiments, aliphatic polycarbonate chains in polymer compositions of the present invention comprise chains with the structure P5:

P5

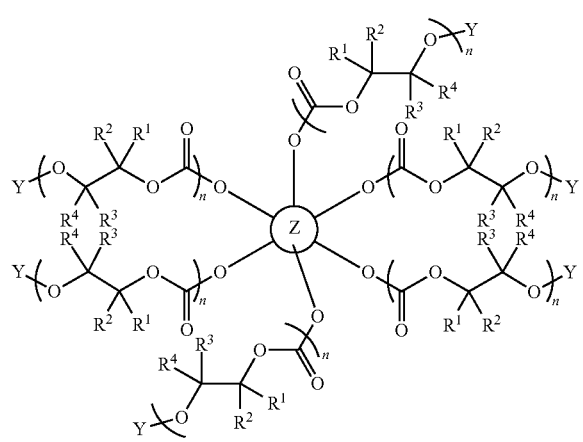

wherein each of $R^1$, $R^2$, $R^3$, $R^4$, Y,

and n is as defined above and described in classes and subclasses herein.

In certain embodiments, aliphatic polycarbonates of the present invention comprise a combination of bifunctional chains (e.g. polycarbonates of formula P2) in combination with higher functional chains (e.g. one or more polycarbonates of formulae P3 to P5).

In certain embodiments,

is derived from a hydroxy acid. In certain embodiments, aliphatic polycarbonate chains in polymer compositions of the present invention comprise chains with the structure P6:

P6

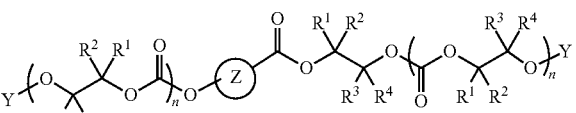

wherein each of $R^1$, $R^2$, $R^3$, $R^4$, Y,

and n is as defined above and described in classes and subclasses herein. In such instances,

represents the carbon-containing backbone of the hydroxy acid, while ester and carbonate linkages adjacent to

are derived from the —$CO_2H$ group and the hydroxy group of the hydroxy acid. For example, if

were derived from 3-hydroxy propanoic acid, then

would be —$CH_2CH_2$— and P6 would have the following structure:

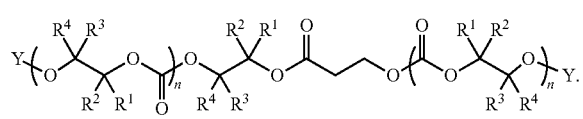

In certain embodiments,

is derived from an optionally substituted $C_{2-40}$ hydroxy acid. In certain embodiments,

is derived from a polyester. In certain embodiments, such polyesters have a molecular weight less than about 2000 g/mol.

In certain embodiments, a hydroxy acid is an alpha-hydroxy acid. In certain embodiments, a hydroxy acid is selected from the group consisting of: glycolic acid, DL-lactic acid, D-lactic acid, L-lactic, citric acid, and mandelic acid.

In certain embodiments, a hydroxy acid is a beta-hydroxy acid. In certain embodiments, a hydroxy acid is selected from the group consisting of: 3-hydroxypropionic acid, DL 3-hydroxybutryic acid, D-3 hydroxybutryic acid, L-3-hydroxybutyric acid, DL-3-hydroxy valeric acid, D-3-hydroxy valeric acid, L-3-hydroxy valeric acid, salicylic acid, and derivatives of salicylic acid.

In certain embodiments, a hydroxy acid is a α-ω hydroxy acid. In certain embodiments, a hydroxy acid is selected from the group consisting of: of optionally substituted $C_{3-20}$ aliphatic α-ω hydroxy acids and oligomeric esters.

In certain embodiments, a hydroxy acid is selected from the group consisting of:

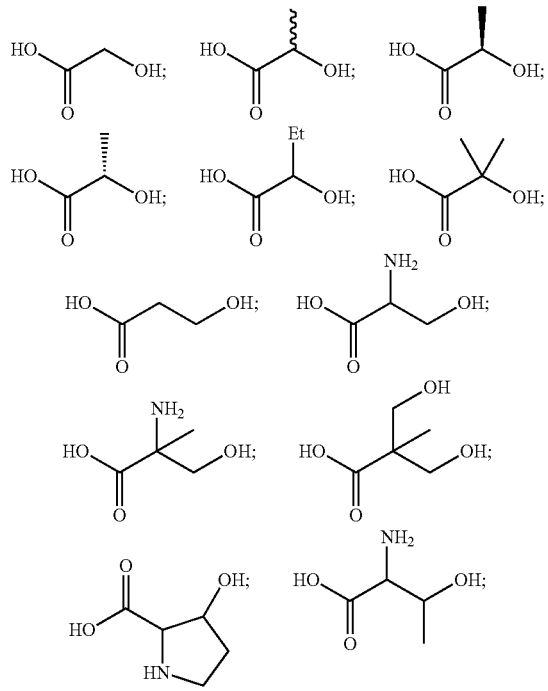

In certain embodiments,

is derived from a polycarboxylic acid. In certain embodiments, aliphatic polycarbonate chains in polymer compositions of the present invention comprise chains with the structure P7:

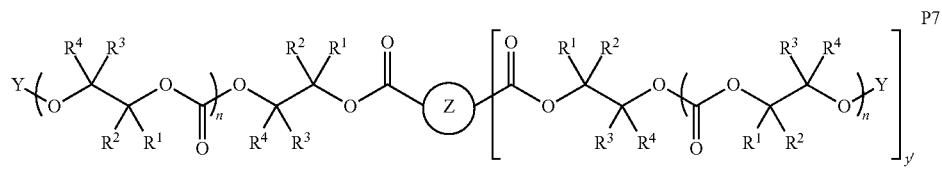

wherein each of $R^1$, $R^2$, $R^3$, $R^4$, Y, $\text{Z}$ and n is as defined above and described in classes and subclasses herein, and y' is from 1 to 5.

In embodiments where the aliphatic polycarbonate chains have a structure P7, $\text{Z}$ represents the carbon-containing backbone (or a bond in the case of oxalic acid) of a polycarboxylic acid, while ester groups adjacent to $\text{Z}$ are derived from —$CO_2H$ groups of a polycarboxylic acid. For example, if $\text{Z}$ were derived from succinic acid ($HO_2CCH_2CH_2CO_2H$), then $\text{Z}$ would be —$CH_2CH_2$— and P7 would have the following structure:

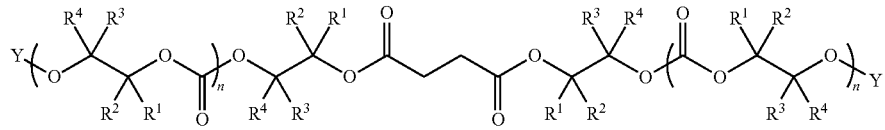

wherein each of $R^1$, $R^2$, $R^3$, $R^4$, Y, and n is as defined above and described in classes and subclasses herein.

In certain embodiments, $\text{Z}$ is derived from a dicarboxylic acid. In certain embodiments, aliphatic polycarbonate chains in polymer compositions of the present invention comprise chains with the structure P8:

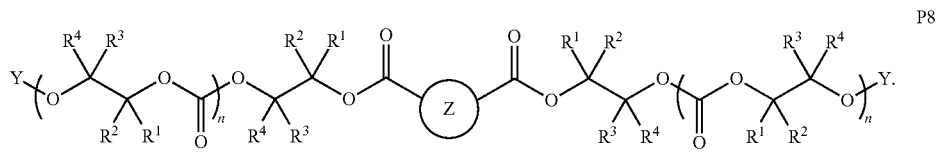

In certain embodiments,

is selected from the group consisting of: phthalic acid, isophthalic acid, terephthalic acid, maleic acid, succinic acid, malonic acid, glutaric acid, adipic acid, pimelic acid, suberic acid, and azelaic acid.

In certain embodiments,

is selected from the group consisting of:

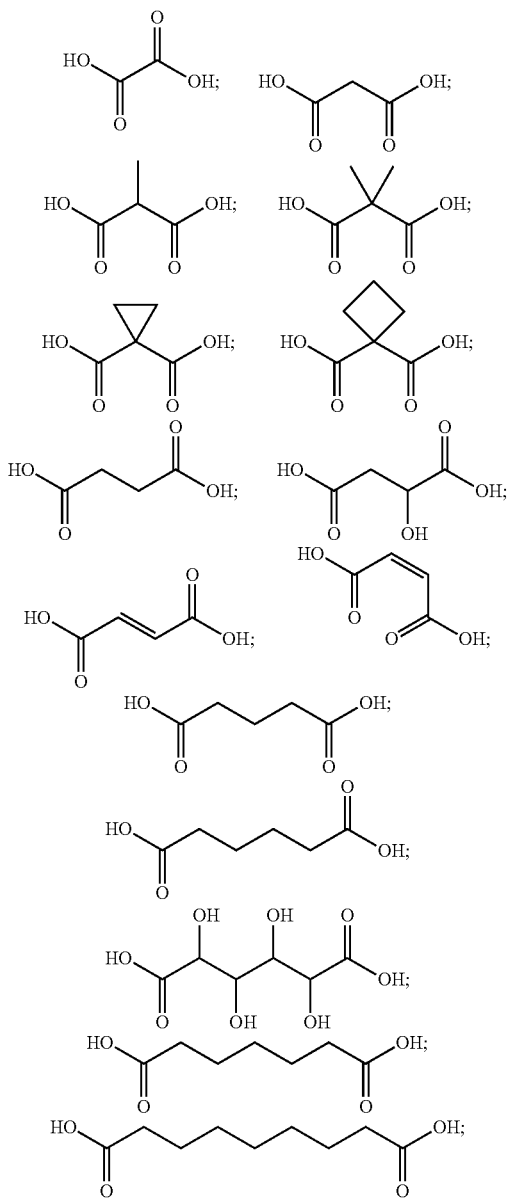

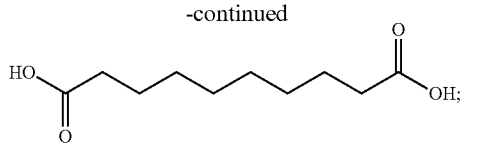

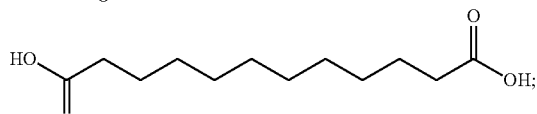

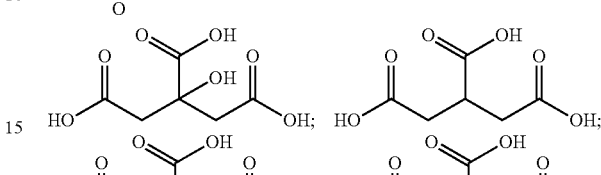

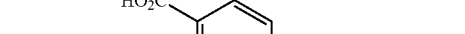

In certain embodiments, polymer compositions of the present invention containing aliphatic polycarbonate chains of any of formulae P1 through P8 are characterized by a majority of the polymer chain ends comprising —Y groups. In certain embodiments, polymer compositions of the present invention containing aliphatic polycarbonate chains of any of formulae P1 through P8 are characterized by a majority of the polymer chain ends comprising —Y groups capable of participating in radical-promoted olefin polymerizations. In certain embodiments, at least 75% of the polymer chain ends comprise —Y groups capable of participating in radical-promoted olefin polymerizations. In certain embodiments, at least 80% of the polymer chain ends comprise —Y groups capable of participating in radical-promoted olefin polymerizations. In certain embodiments, at least 85% of the polymer chain ends comprise —Y groups capable of participating in radical-promoted olefin polymerizations. In certain embodiments, at least 90% of the polymer chain ends comprise —Y groups capable of participating in radical-promoted olefin polymerizations. In certain embodiments, at least 95% of the polymer chain ends comprise —Y groups capable of participating in radical-promoted olefin polymerizations.

In certain embodiments, polymer compositions of the present invention comprise aliphatic polycarbonate chains of formula Q1:

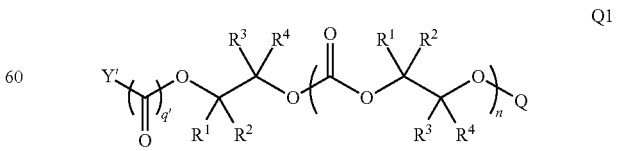

wherein each of $R^1$, $R^2$, $R^3$, $R^4$, and n is as defined above and described in classes and subclasses herein;

Y' is selected from the group consisting of an optionally substituted $C_{2-20}$ aliphatic group, an optionally substituted $C_{2-20}$ heteroaliphatic group, an optionally substituted 3- to 14-membered carbocyclic group, a 6- to 10-membered aryl group, a 5- to 10-membered heteroaryl group, and an optionally substituted 3- to 12-membered heterocyclic group;

-Q is —H, or —Y (where Y is as defined hereinabove); and q' is 0 or 1.

In certain embodiments, Y' contains one or more sites of olefinic unsaturation. In certain embodiments, at least one olefinic group in Y' comprises a radically-polymerizable olefin such as an acrylate, styrene, vinyl ether or vinyl ester. In certain embodiments, Q is Y and Y' and Y are the same on a given polymer chain. In certain embodiments, Y' and Y are different on a given polymer chain.

In certain embodiments, compounds of formula Q1 are formed by copolymerizing carbon dioxide and one or more optionally substituted $C_{2-40}$ epoxide monomers in the presence of a polymerization initiator having the formula Y'—$(CO)_{q'}$—OH, where Y' and q' are as defined above. In certain embodiments, such aliphatic polycarbonate chains are further functionalized after polymerization to introduce the —Y group as described above (i.e. -Q is converted from —H to a —Y group).

In certain embodiments, aliphatic polycarbonate chains in provided polymer compositions are derived from the copolymerization of one or more epoxides with carbon dioxide in the presence of an initiator Y'—$(CO)_{q'}$—OH.

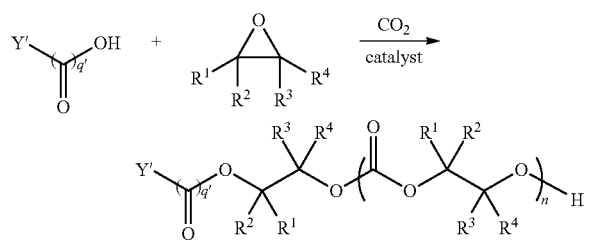

In certain embodiments, such aliphatic polycarbonate chains are further functionalized after polymerization to introduce the —Y group as described above:

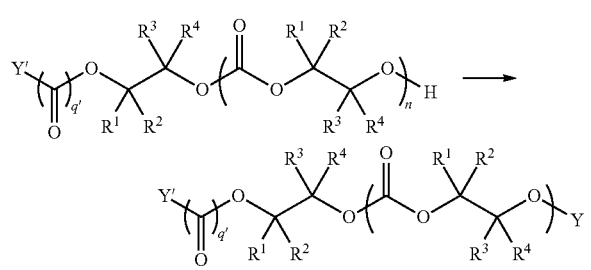

In certain embodiments, Y'—$(CO)_{q'}$—OH is an acrylic acid derivative having the formula:

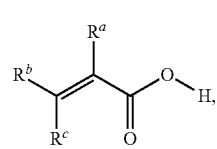

wherein each of $R^a$, $R^b$, and $R^c$ is as defined above and described in classes and subclasses herein.

In certain embodiments, polymer compositions of the present invention comprise aliphatic polycarbonate chains having a formula Q2:

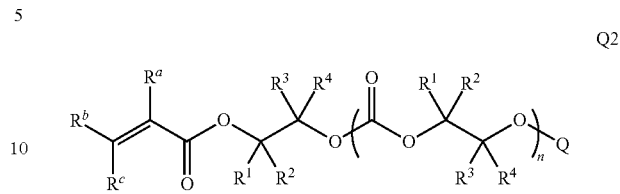

wherein each of $R^a$, $R^b$, $R^c$, $R^1$, $R^2$, $R^3$, $R^4$, n, and Q is as defined above and described in classes and subclasses herein.

In certain embodiments, acrylate esters of formula Q2 are selected from the group consisting of:

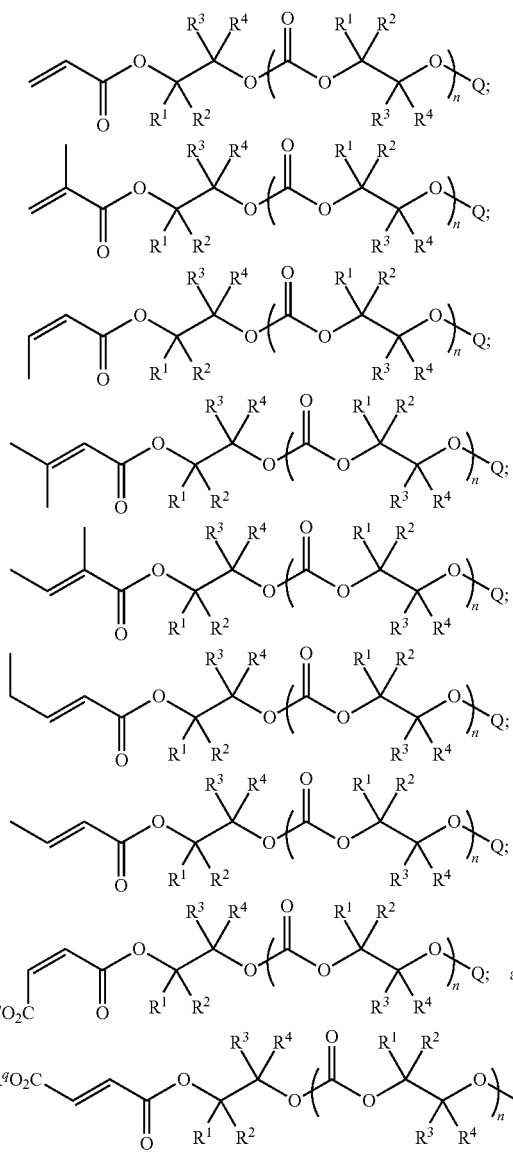

wherein each of $R^1$, $R^2$, $R^3$, $R^4$, n, and Q is as defined above and described in classes and subclasses herein; and $R^q$ is optionally substituted $C_{1-20}$ aliphatic or optionally substituted phenyl.

In certain embodiments, polymer compositions of the present invention comprise aliphatic polycarbonate chains having formula Q2a:

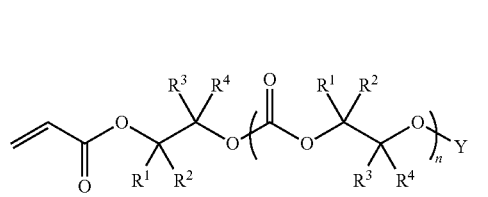

Q2a wherein each of $R^1$, $R^2$, $R^3$, $R^4$, n, and Y is as defined above and described in classes and subclasses herein.

In certain embodiments, polymer compositions of the present invention comprise aliphatic polycarbonate chains having formula Q2b:

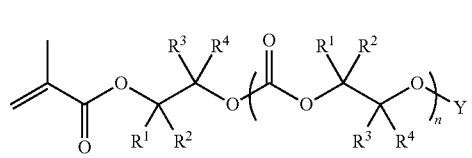

Q2b wherein each of $R^1$, $R^2$, $R^3$, $R^4$, n, and Y is as defined above and described in classes and subclasses herein.

In certain embodiments, polymer compositions of the present invention comprise aliphatic polycarbonate chains having formula Q2c:

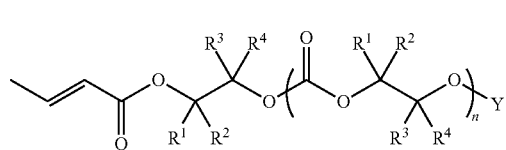

Q2c wherein each of $R^1$, $R^2$, $R^3$, $R^4$, n, and Y is as defined above and described in classes and subclasses herein.

In certain embodiments, polymer compositions of the present invention comprise aliphatic polycarbonate chains having formula Q2d:

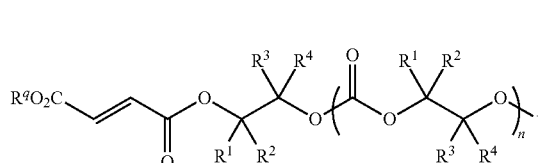

Q2d wherein each of $R^1$, $R^2$, $R^3$, $R^4$, n, Y, and $R^q$ is as defined above and described in classes and subclasses herein.

In certain embodiments, Y'—(CO)$_{q'}$—OH is cinnamic acid derivative having the formula:

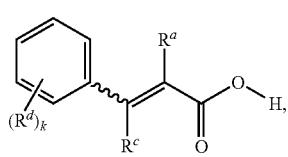

wherein each of $R^a$, $R^c$, and $R^d$ is as defined above and described in classes and subclasses herein, and k is 0 to 5.

In certain embodiments, polymer compositions of the present invention comprise aliphatic polycarbonate chains having formula Q3:

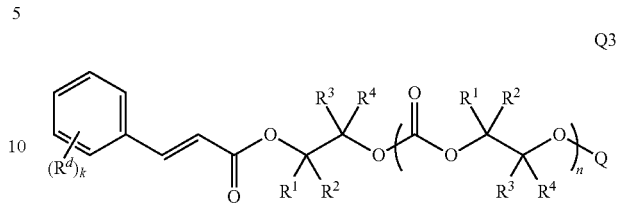

Q3 wherein each of $R^1$, $R^2$, $R^3$, $R^4$, k, n, Q, and $R^d$ is as defined above and described in classes and subclasses herein.

In certain embodiments, polymer compositions of the present invention comprise aliphatic polycarbonate chains having formula Q3a:

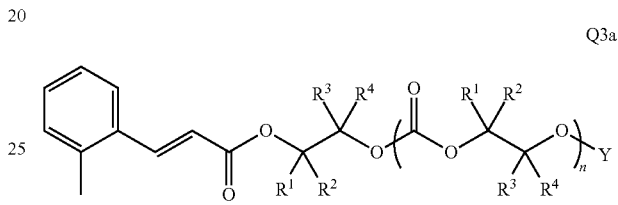

Q3a wherein each of $R^1$, $R^2$, $R^3$, $R^4$, n, and Y is as defined above and described in classes and subclasses herein.

In certain embodiments, polymer compositions of the present invention comprise aliphatic polycarbonate chains having formula Q3b:

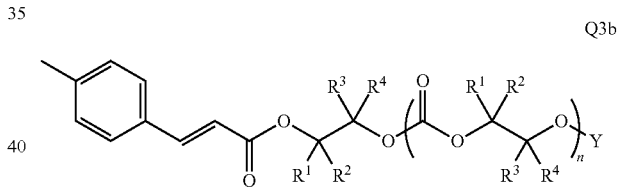

Q3b wherein each of $R^1$, $R^2$, $R^3$, $R^4$, n, and Y is as defined above and described in classes and subclasses herein.

In certain embodiments, polymer compositions of the present invention comprise aliphatic polycarbonate chains having formula Q3c:

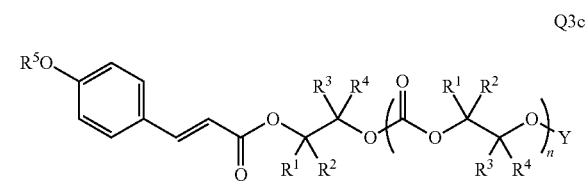

Q3c wherein each of $R^1$, $R^2$, $R^3$, $R^4$, n, and Y is as defined above and described in classes and subclasses herein; and $R^5$ is an optionally substituted group selected from the group consisting of: $C_{1-12}$ aliphatic, $C_{1-12}$ heteroaliphatic, 6- to 10-membered aryl, 5- to 12-membered heteroaryl, acyl, and silyl.

In certain embodiments, polymer compositions of the present invention comprise aliphatic polycarbonate chains having formula Q3d:

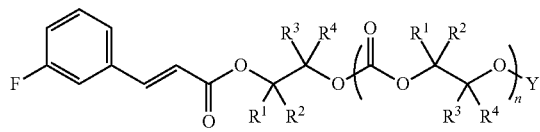

Q3d wherein each of $R^1$, $R^2$, $R^3$, $R^4$, n, and Y is as defined above and described in classes and subclasses herein.

In certain embodiments, polymer compositions of the present invention comprise aliphatic polycarbonate chains having formula Q3e:

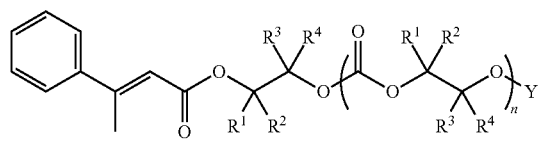

Q3e wherein each of $R^1$, $R^2$, $R^3$, $R^4$, n, and Y is as defined above and described in classes and subclasses herein.

In certain embodiments, polymer compositions of the present invention comprise aliphatic polycarbonate chains having formula Q3f:

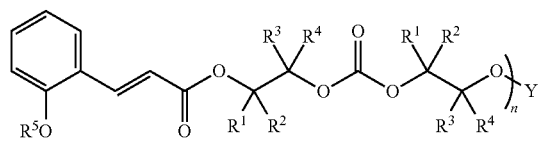

Q3f wherein each of $R^1$, $R^2$, $R^3$, $R^4$, $R^5$, n, and Y is as defined above and described in classes and subclasses herein.

In certain embodiments, polymer compositions of the present invention comprise aliphatic polycarbonate chains having formula Q3g:

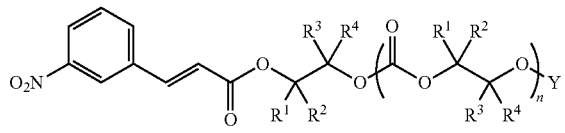

Q3g wherein each of $R^1$, $R^2$, $R^3$, $R^4$, n, and Y is as defined above and described in classes and subclasses herein.

In certain embodiments, polymer compositions of the present invention comprise aliphatic polycarbonate chains having formula Q3h:

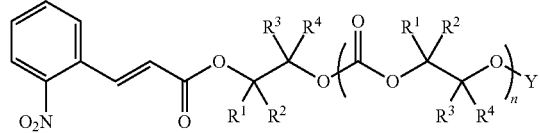

Q3h wherein each of $R^1$, $R^2$, $R^3$, $R^4$, n, and Y is as defined above and described in classes and subclasses herein.

In certain embodiments, polymer compositions of the present invention comprise aliphatic polycarbonate chains having formula Q3i:

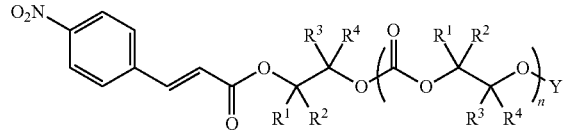

Q3i wherein each of $R^1$, $R^2$, $R^3$, $R^4$, n, and Y is as defined above and described in classes and subclasses herein.

In certain embodiments, aliphatic polycarbonate chains in any of the above structures or compositions are derived by copolymerization of carbon dioxide with an optionally substituted epoxide, or with a mixture of two or more such epoxides.

In certain embodiments, where polymer compositions of the present invention comprise aliphatic polycarbonate chains of any of formulae Q1 through Q3i, Y is selected from the group consisting of the moieties described hereinabove in the descriptions of compounds of formulae II through IIc.

In certain embodiments, each

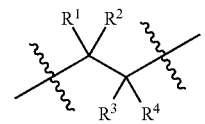

in the structures hereinabove is independently selected from the group consisting of:

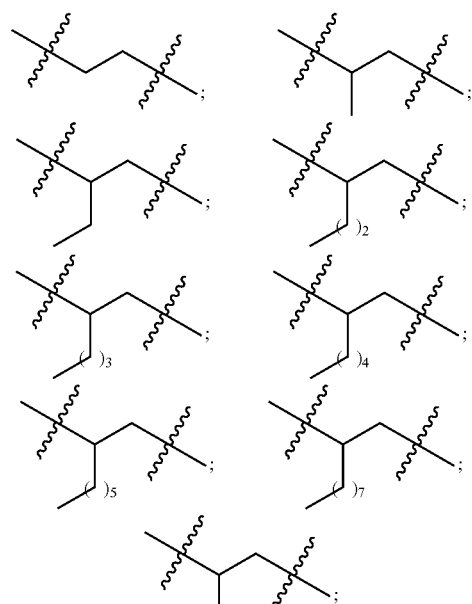

$n = 9\text{-}30$

-continued

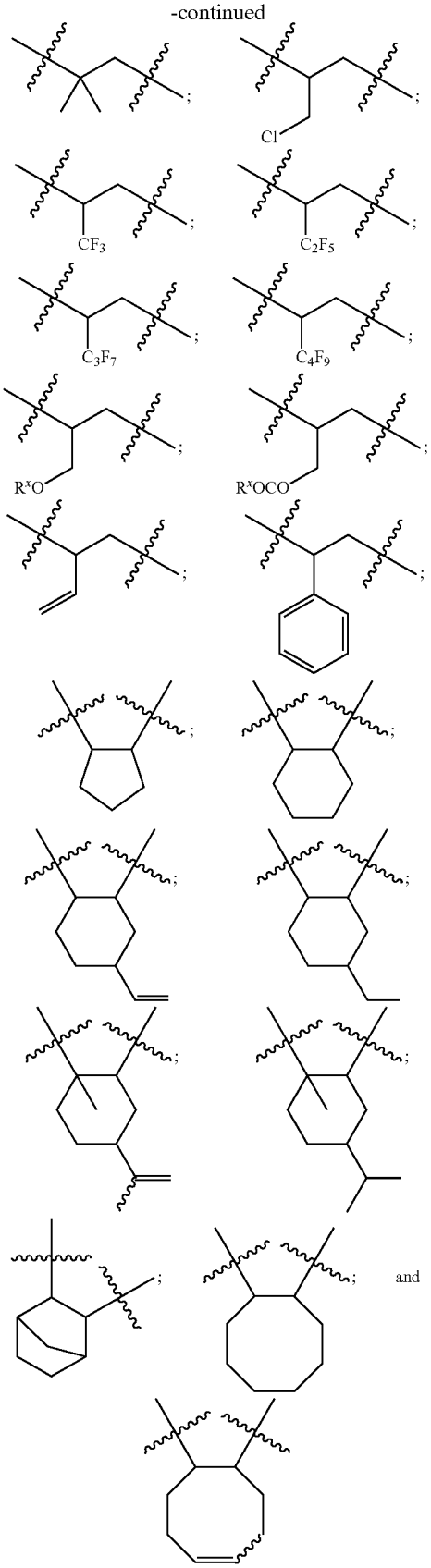

wherein each R$^x$ is independently an optionally substituted group selected from the group consisting of C$_{2-20}$ aliphatic, C$_{2-20}$ heteroaliphatic, 3- to 14-membered carbocyclic, 6- to 10-membered aryl, 5- to 10-membered heteroaryl, and 3- to 12-membered heterocyclic.

In certain embodiments, each

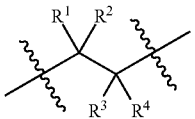

in the structures hereinabove is independently selected from the group consisting of:

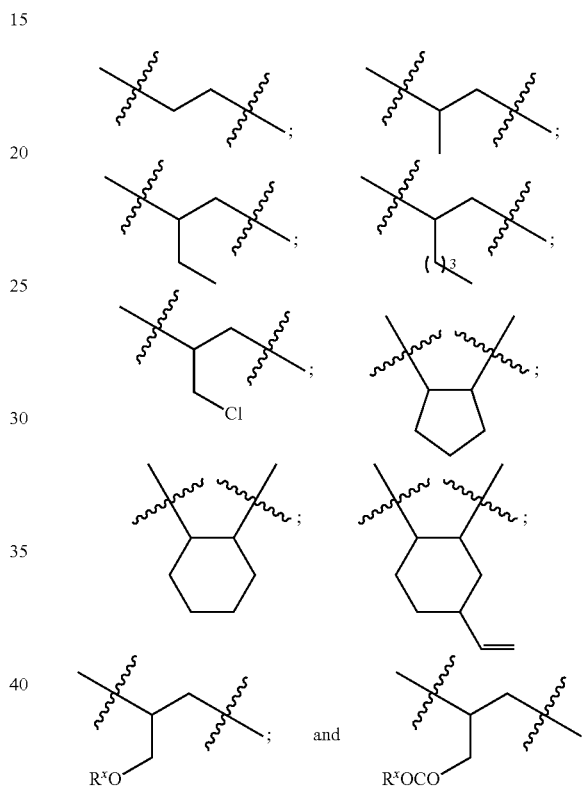

wherein R$^x$ is as defined above and described in classes and subclasses herein.

In certain embodiments, aliphatic polycarbonate chains comprise:

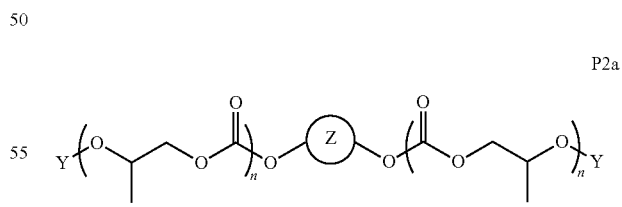

P2a wherein each of

—Y, and n is as defined above and described in classes and subclasses herein.

In certain embodiments, aliphatic polycarbonate chains comprise

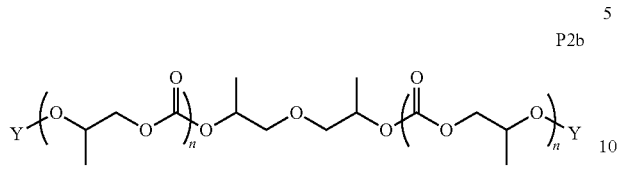
P2b wherein each of —Y and n is as defined above and described in classes and subclasses herein.

In certain embodiments, aliphatic polycarbonate chains comprise

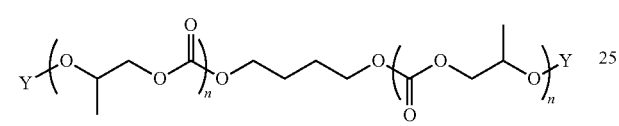
P2b' wherein each of —Y and n is as defined above and described in classes and subclasses herein.

In certain embodiments, aliphatic polycarbonate chains comprise

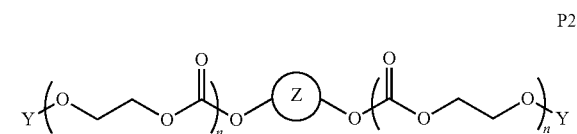
P2c wherein each of

—Y, and n is as defined above and described in classes and subclasses herein.

In certain embodiments, aliphatic polycarbonate chains comprise

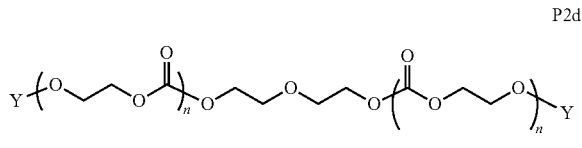
P2d wherein each of —Y and n is as defined above and described in classes and subclasses herein.

In certain embodiments, aliphatic polycarbonate chains comprise

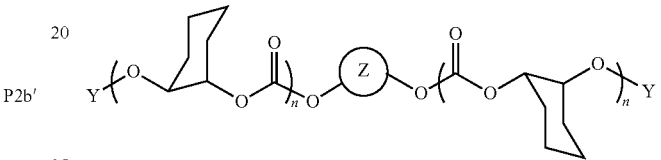
P2d wherein each of

—Y, and n is as defined above and described in classes and subclasses herein.

In certain embodiments, aliphatic polycarbonate chains comprise

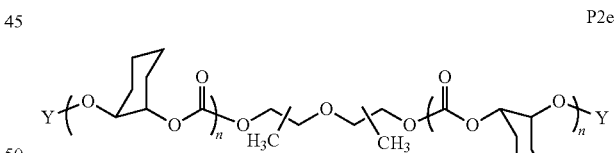
P2e wherein each of —Y and n are is as defined above and described in classes and subclasses herein.

In certain embodiments, aliphatic polycarbonate chains comprise

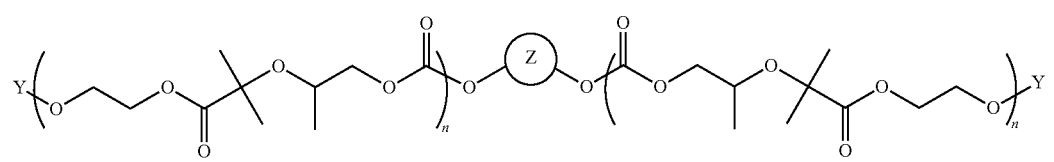
P2f wherein each of

,

—Y, and n is as defined above and described in classes and subclasses herein.

In certain embodiments, aliphatic polycarbonate chains comprise

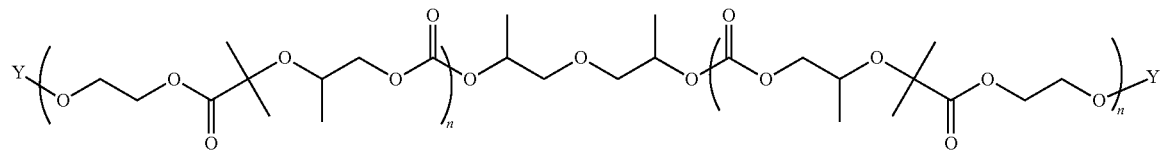

P2g wherein each of —Y and n is as defined above and described in classes and subclasses herein.

In certain embodiments, aliphatic polycarbonate chains comprise

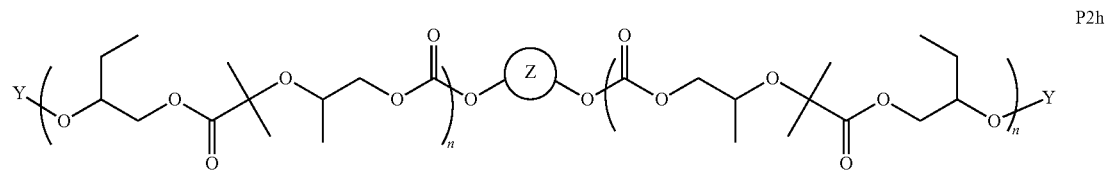

P2h wherein each of

,

—Y, and n is as defined above and described in classes and subclasses herein.

In certain embodiments, aliphatic polycarbonate chains comprise

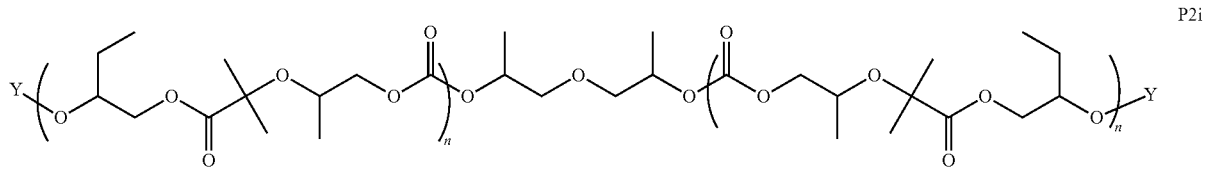

P2i wherein each of —Y and n is as defined above and described in classes and subclasses herein.

In certain embodiments, aliphatic polycarbonate chains comprise

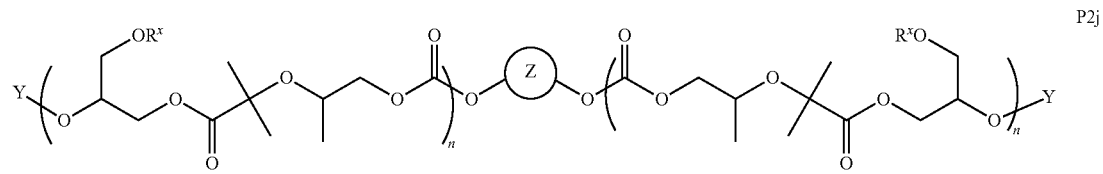

P2j wherein each of

,

—Y, $R^x$, and n is as defined above and described in classes and subclasses herein.

In certain embodiments, aliphatic polycarbonate chains comprise

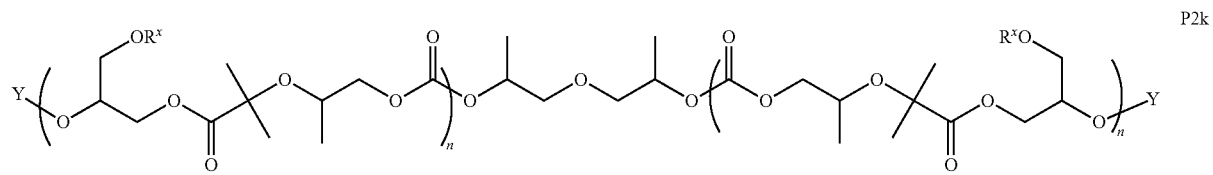

P2k wherein each of —Y, $R^x$, and n is as defined above and described in classes and subclasses herein.

In certain embodiments, aliphatic polycarbonate chains comprise

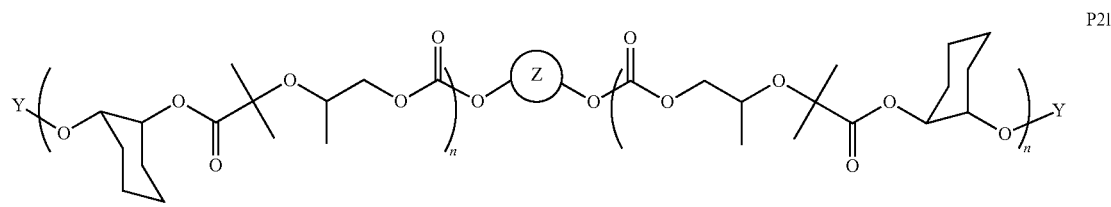

P2l wherein each of

,

—Y, and n is as defined above and described in classes and subclasses herein.

In certain embodiments, aliphatic polycarbonate chains comprise

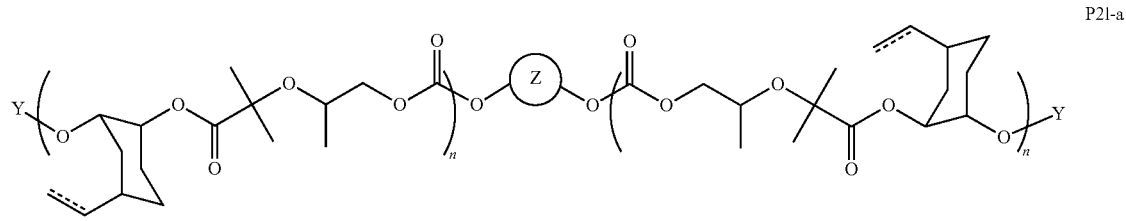

P2l-a wherein each of

,

—Y, and n are is as defined above and described in classes and subclasses herein; and each ===== independently represents a single or double bond.

In certain embodiments, aliphatic polycarbonate chains comprise

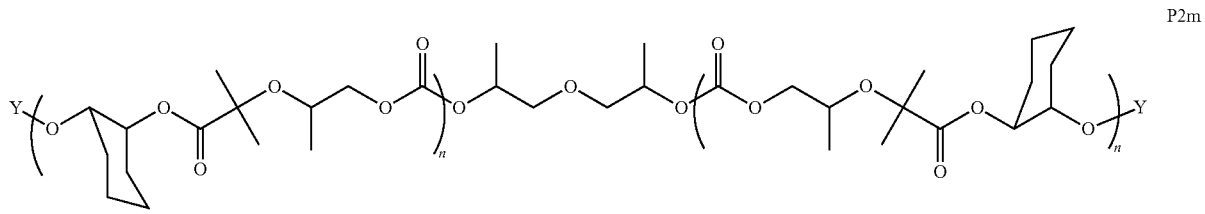

P2m wherein each of —Y and n is as defined above and described in classes and subclasses herein.

In certain embodiments, aliphatic polycarbonate chains comprise

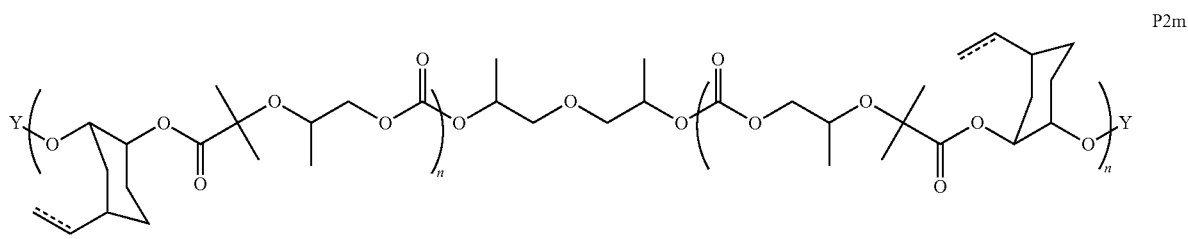

P2m wherein each of —Y, ═══, and n is as defined above and described in classes and subclasses herein.

In certain embodiments, aliphatic polycarbonate chains comprise

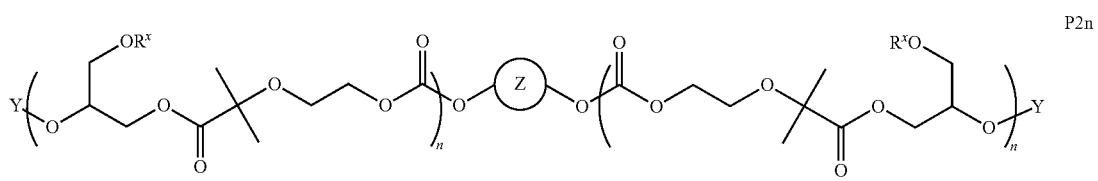

P2n wherein each of

, $R^x$, —Y and n is as defined above and described in classes and subclasses herein.

In certain embodiments, aliphatic polycarbonate chains comprise

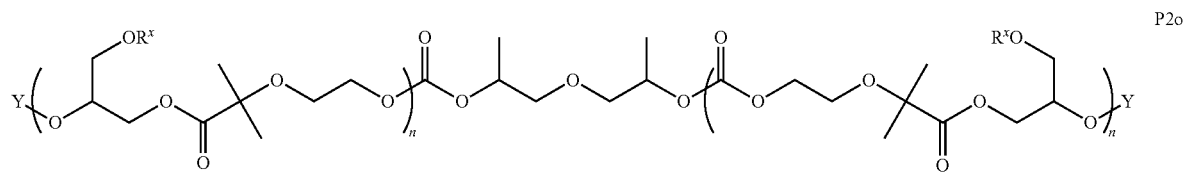

P2o wherein each of —Y, $R^x$, and n is as defined above and described in classes and subclasses herein.

In certain embodiments, aliphatic polycarbonate chains comprise

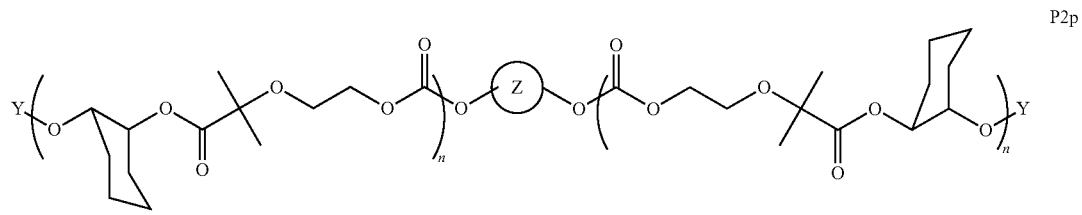

wherein each of

—Y, and n is as defined above and described in classes and subclasses herein.

In certain embodiments, aliphatic polycarbonate chains comprise

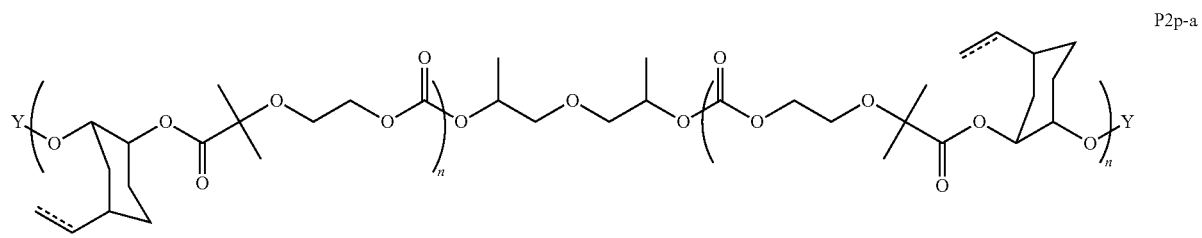

wherein each of —Y, =====, and n is as defined above and described in classes and subclasses herein.

In certain embodiments, aliphatic polycarbonate chains comprise

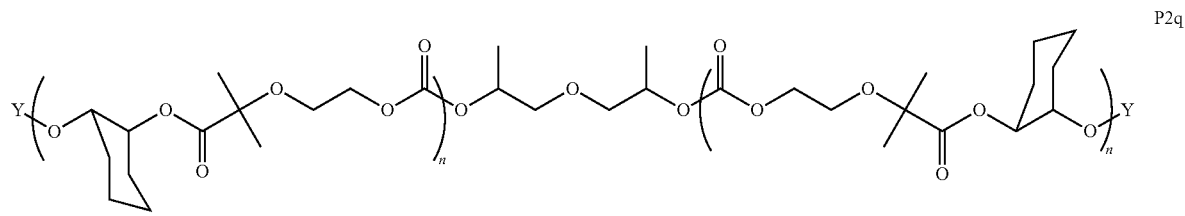

wherein each of —Y and n is as defined above and described in classes and subclasses herein.

In certain embodiments, aliphatic polycarbonate chains comprise

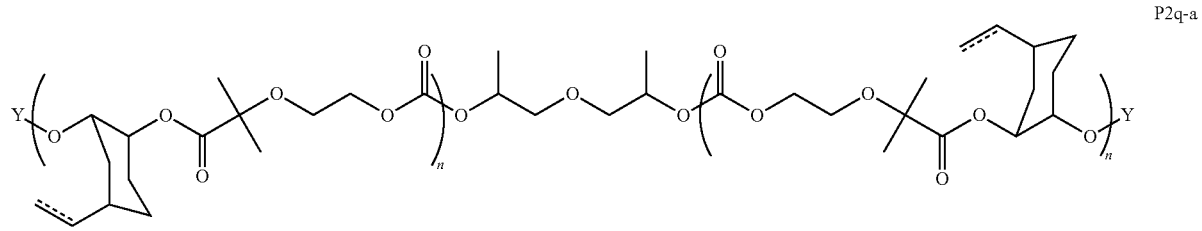

wherein each of —Y, =====, and n is as defined above and described in classes and subclasses herein.

In certain embodiments, aliphatic polycarbonate chains comprise

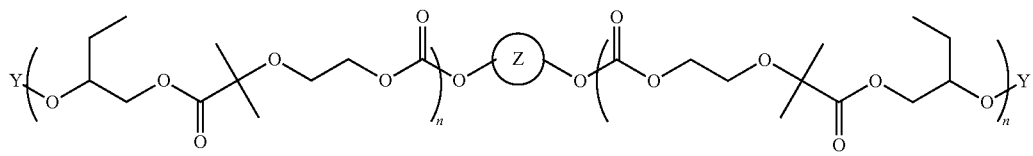

wherein each of

—Y, and n is as defined above and described in classes and subclasses herein.

In certain embodiments, in polycarbonates of structures P2a, P2c, P2d, P2f, P2h, P2j, P2l, P2l-a, P2n, P2p, and P2r,

is selected from the group consisting of: ethylene glycol; diethylene glycol, triethylene glycol, 1,3 propane diol; 1,4 butane diol, hexylene glycol, propylene glycol, dipropylene glycol, tripopylene glycol, and alkoxylated derivatives of any of these.

In certain embodiments, aliphatic polycarbonate chains comprise

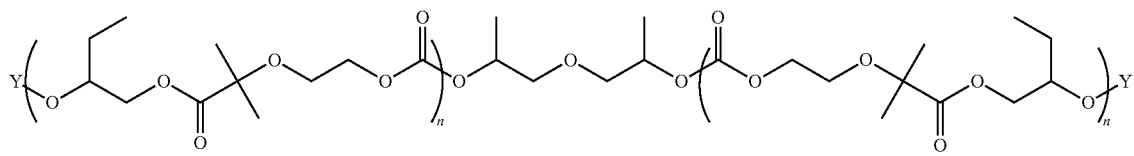

wherein each of —Y and n is as defined above and described in classes and subclasses herein.

In certain embodiments, in polycarbonates of formulae P2a through P2s, —Y is selected from the group consisting of:

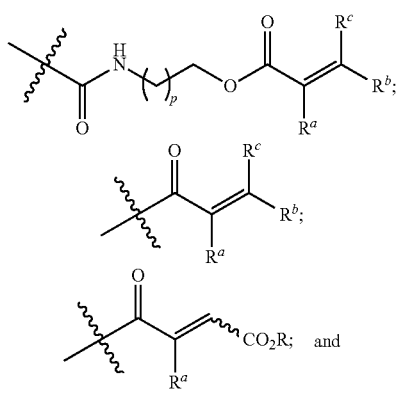

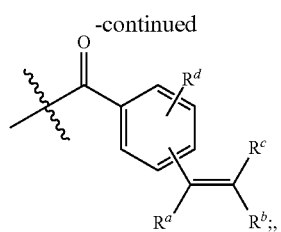

wherein each of p, $R^a$, $R^b$, $R^c$, R and $R^d$ is as defined above and described in classes and subclasses herein.

For polycarbonates comprising repeat units derived from two or more epoxides, it is to be understood that the structures drawn may represent mixtures of positional isomers or regioisomers that are not explicitly depicted. For example, the polymer repeat unit adjacent to either end groups of the polycarbonate chains can be derived from either one of the two epoxides comprising the copolymers. Thus, while the polymers may be drawn with a particular repeat unit attached to an end group, the terminal repeat units might be derived from either of the two epoxides and a given polymer composition might comprise a mixture of all of the possibilities in varying ratios. The ratio of these end-groups can be influenced by several factors including the ratio of the different epoxides used in the polymerization, the structure of the catalyst used, the reaction conditions used (i.e. temperature pressure, etc.) as well as by the timing of addition of reaction components. Furthermore, chemical structures depicted herein are representative of polymer chains that comprise polymer compositions of the present invention. Therefore, while the drawings above may show a defined regiochemistry for repeat units derived from substituted epoxides, the polymer compositions will, in some cases, contain mixtures of regioisomers. The regioselectivity of a given polymerization can be influenced by numerous factors including the structure of the catalyst used and the reaction conditions employed. To clarify, this means that the composition represented by structure P2r above, may contain a mixture of several compounds as shown in the diagram below. This diagram shows the isomers graphically for polymer P2r, where the structures below the depiction of the chain show each regio- and positional isomer possible for the monomer unit adjacent to the chain transfer agent and the end groups on each side of the main polymer chain. Each end group on the polymer may be independently selected from the groups shown on the left or right while the central portion of the polymer including the chain transfer agent and its two adjacent monomer units may be independently selected from the groups shown. In certain embodiments, the polymer composition comprises a mixture of all possible combinations of these. In other embodiments, the polymer composition is enriched in one or more of these.

oxide, epichlorohydrin, and esters or ethers of glycidol. It is to be understood that many variations on these compounds are possible including the use of additional or different epoxides, use of different chain transfer agents (such as olefin containing hydroxy compounds), and the introduction of different Y groups. Such variations will be apparent to one skilled in the

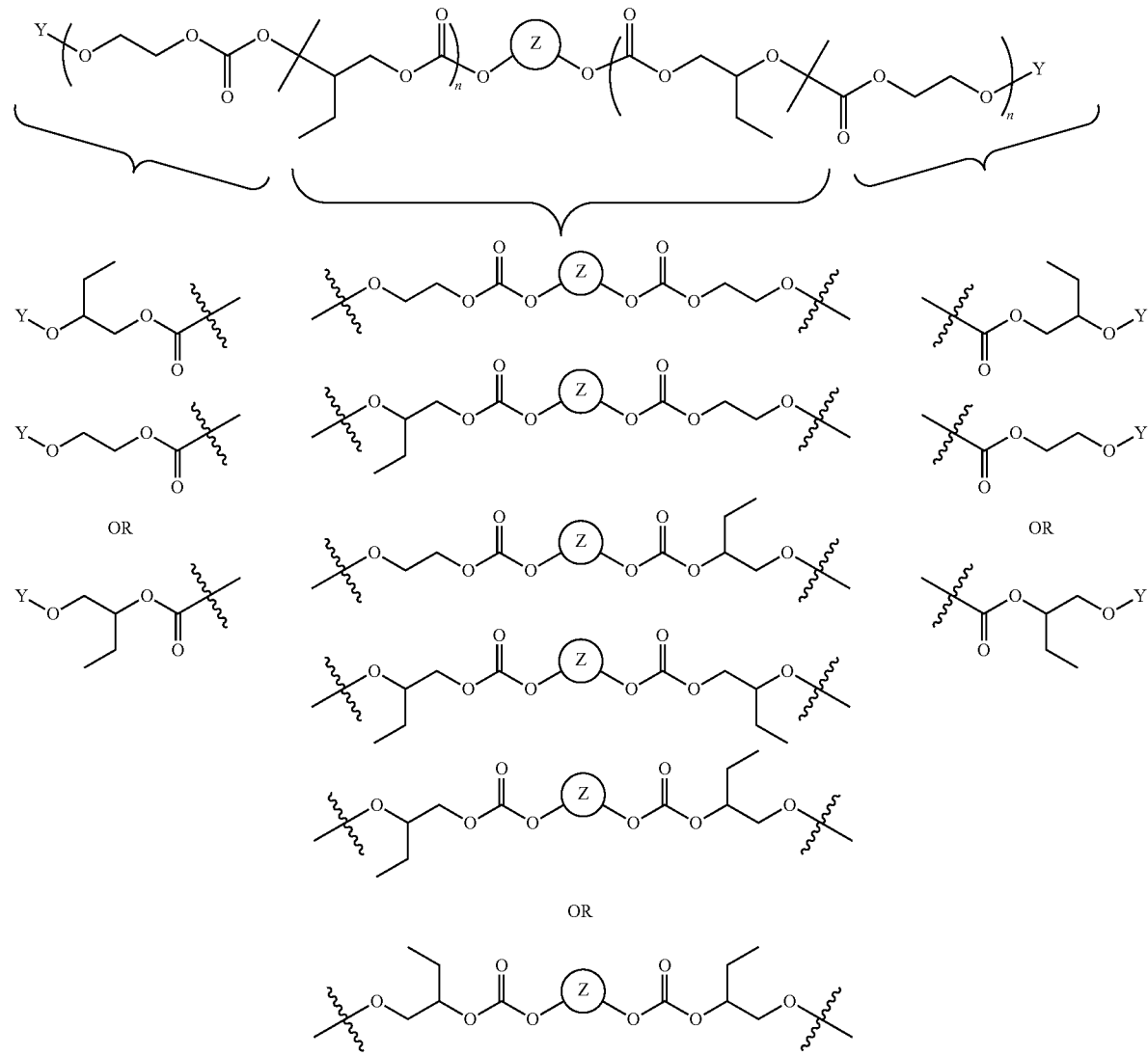

Likewise, certain small molecules depicted herein may comprise mixtures of regio- and/or stereoisomers, but be depicted in only one form. For example, dipropylene glycol (DPG) as provided commercially comprises a mixture of regioisomeric and stereoisomeric compounds. Thus while such molecules may be depicted as one regioisomer for convenience, it will be understood by one skilled in the art that the compound may actually contain a mixture of isomeric dipropylene glycol moieties.

Structures Q1a through Q1af are representative of aliphatic polycarbonates that may be derived from the copolymerization of carbon dioxide and epoxide(s) in the presence of an olefin-containing carboxylic acid chain transfer agent. suitable epoxides include one or more aliphatic epoxides such as propylene oxide, ethylene oxide, butylene oxide, cyclohexene oxide, 3-vinyl cyclohexene oxide, 3-ethyl cyclohexene art based on the disclosure and teachings of the present application and are specifically encompassed within the scope of the present invention.

In certain embodiments, aliphatic polycarbonate chains comprise

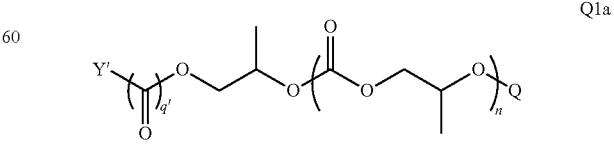

Q1a wherein each of Y', Q, q', and n is as defined above and described in classes and subclasses herein.

In certain embodiments, aliphatic polycarbonate chains comprise

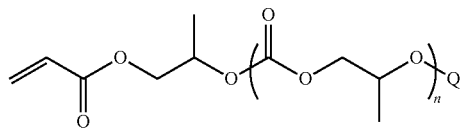

Q1b wherein each of -Q and n is as defined above and described in classes and subclasses herein.

In certain embodiments, the aliphatic polycarbonate chains comprise

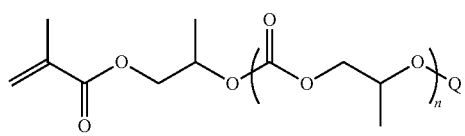

Q1c wherein each of -Q and n is as defined above and described in classes and subclasses herein.

In certain embodiments, the aliphatic polycarbonate chains comprise

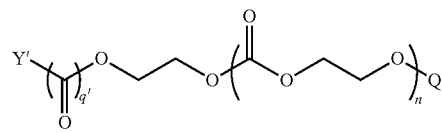

Q1d wherein each of Y', Q, q', and n is as defined above and described in classes and subclasses herein.

In certain embodiments, aliphatic polycarbonate chains comprise

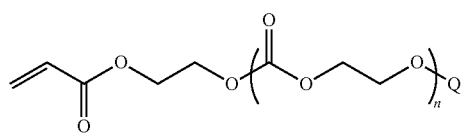

Q1e wherein each of -Q and n is as defined above and described in classes and subclasses herein.

In certain embodiments, aliphatic polycarbonate chains comprise

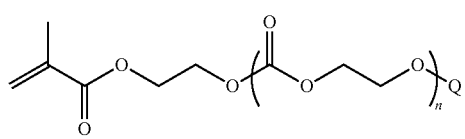

Q1f wherein each of -Q and n is as defined above and described in classes and subclasses herein.

In certain embodiments, the aliphatic polycarbonate chains comprise

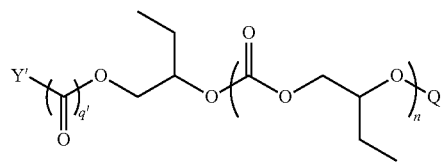

Q1g wherein each of Y', Q, q', and n is as defined above and described in classes and subclasses herein.

In certain embodiments, aliphatic polycarbonate chains comprise

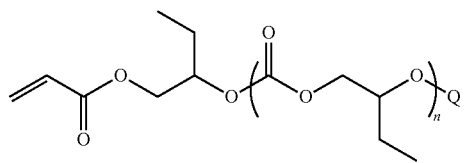

Q1h wherein each of -Q and n is as defined above and described in classes and subclasses herein.

In certain embodiments, aliphatic polycarbonate chains comprise

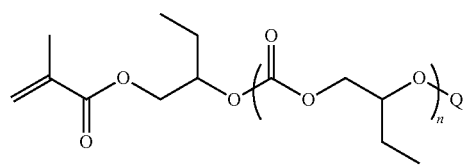

Q1i wherein each of -Q and n is as defined above and described in classes and subclasses herein.

In certain embodiments, aliphatic polycarbonate chains comprise

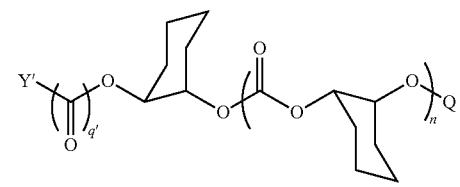

Q1j wherein each of Y', Q, q', and n is as defined above and described in classes and subclasses herein.

In certain embodiments, aliphatic polycarbonate chains comprise

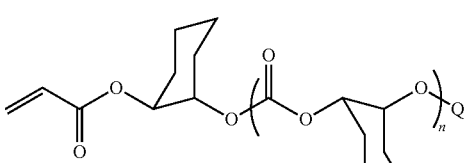

Q1k wherein each of -Q and n is as defined above and described in classes and subclasses herein.

In certain embodiments, aliphatic polycarbonate chains comprise

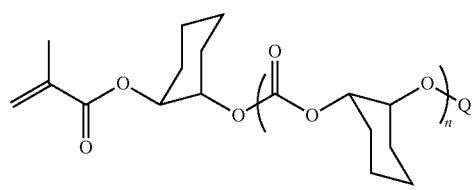

Q1l wherein each of -Q and n is as defined above and described in classes and subclasses herein.

In certain embodiments, aliphatic polycarbonate chains comprise

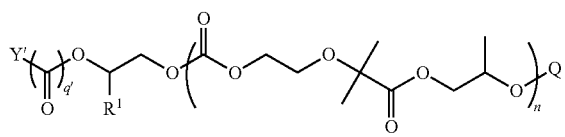

Q1m (R¹ = H or Me)

wherein each of Y', Q, q', and n is as defined above and described in classes and subclasses herein.

In certain embodiments, the aliphatic polycarbonate chains comprise

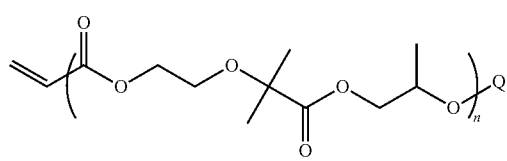

Q1n wherein each of -Q and n is as defined above and described in classes and subclasses herein.

In certain embodiments, the aliphatic polycarbonate chains comprise

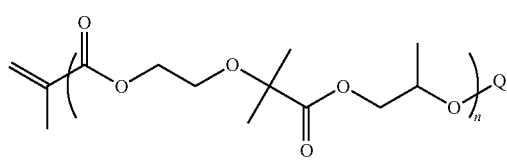

Q1o wherein each of -Q and n is as defined above and described in classes and subclasses herein.

In certain embodiments, the aliphatic polycarbonate chains comprise

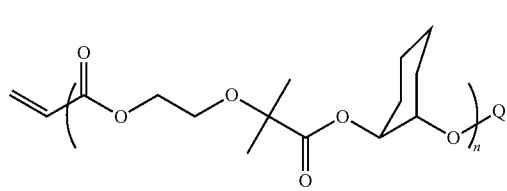

Q1q wherein each of Q and n is as defined above and described in classes and subclasses herein.

In certain embodiments, aliphatic polycarbonate chains comprise

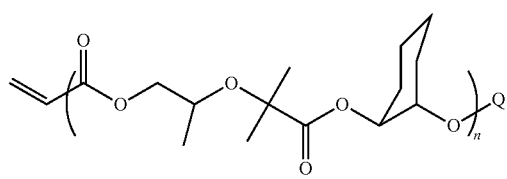

Q1r wherein each of -Q and n is as defined above and described in classes and subclasses herein.

In certain embodiments, the aliphatic polycarbonate chains comprise

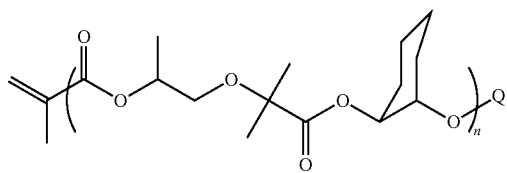

Q1s wherein each of -Q and n is as defined above and described in classes and subclasses herein.

In certain embodiments, aliphatic polycarbonate chains comprise

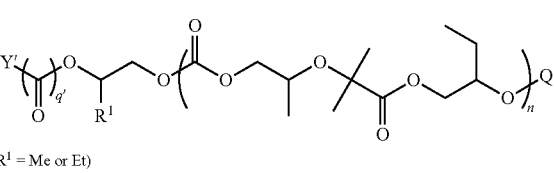

Q1t (R¹ = Me or Et)

wherein each of Y', Q, q', and n is as defined above and described in classes and subclasses herein.

In certain embodiments, aliphatic polycarbonate chains comprise

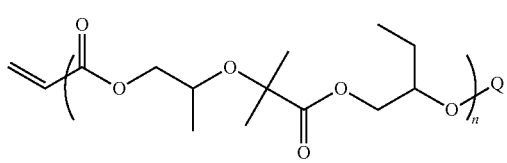

Q1u wherein each of -Q and n is as defined above and described in classes and subclasses herein.

In certain embodiments, aliphatic polycarbonate chains comprise

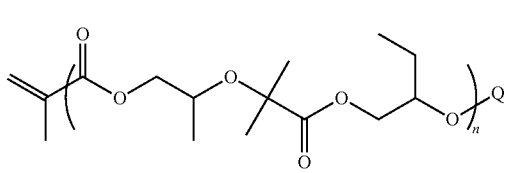

Q1v wherein each of -Q and n is as defined above and described in classes and subclasses herein.

In certain embodiments, aliphatic polycarbonate chains comprise

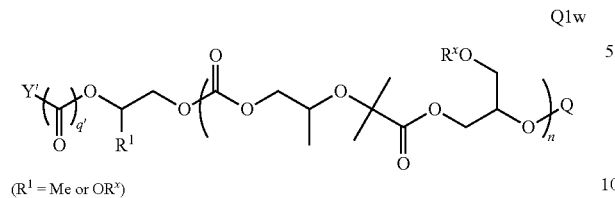
Q1w (R¹ = Me or OR$^x$)

wherein each of Y', Q, R$^x$, q', and n is as defined above and described in classes and subclasses herein.

In certain embodiments, aliphatic polycarbonate chains comprise

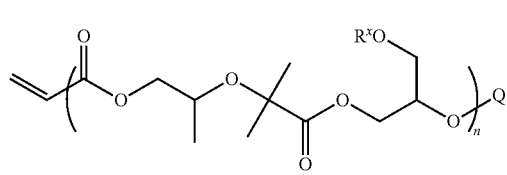
Q1x wherein each of -Q, R$^x$, and n is as defined above and described in classes and subclasses herein.

In certain embodiments, aliphatic polycarbonate chains comprise

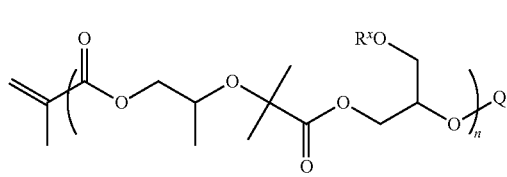
Q1y wherein each of -Q, R$^x$, and n is as defined above and described in classes and subclasses herein.

In certain embodiments, aliphatic polycarbonate chains comprise

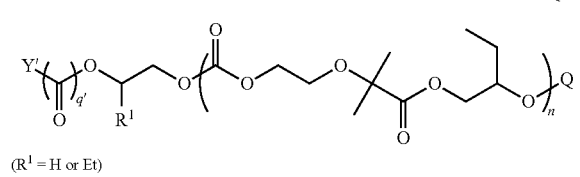
Q1aa (R¹ = H or Et)

wherein each of Y', Q, q', and n is as defined above and described in classes and subclasses herein.

In certain embodiments, aliphatic polycarbonate chains comprise

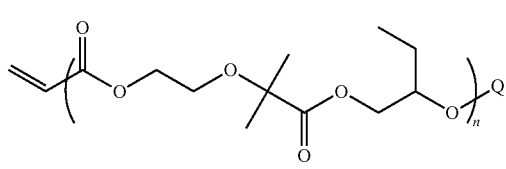
Q1ab wherein each of -Q and n is as defined above and described in classes and subclasses herein.

In certain embodiments, aliphatic polycarbonate chains comprise

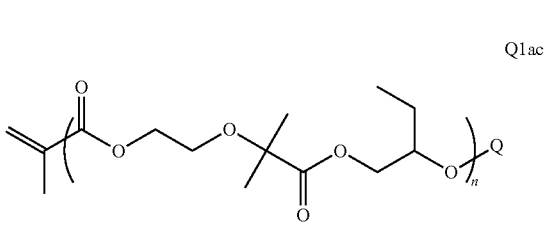
Q1ac wherein each of -Q and n is as defined above and described in classes and subclasses herein.

In certain embodiments, aliphatic polycarbonate chains comprise

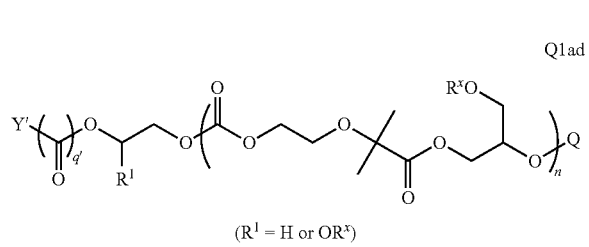
Q1ad (R¹ = H or OR$^x$)

wherein each of Y', R', Q, q', and n is as defined above and described in classes and subclasses herein.

In certain embodiments, in polycarbonates of formulae Q1a, Q1d, Q1g, Q1j, Q1m, Q1q, Q1t, Q1w, Q1aa, and Q1ad, the moiety Y'—(CO)$_{q'}$— is selected from the group consisting of:

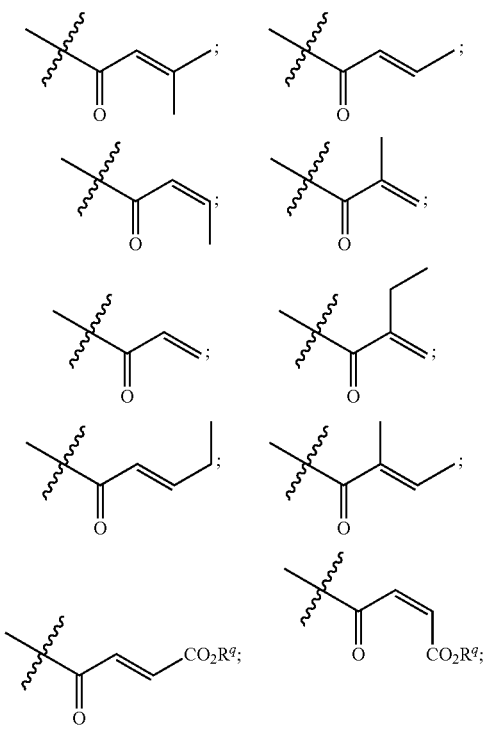

-continued

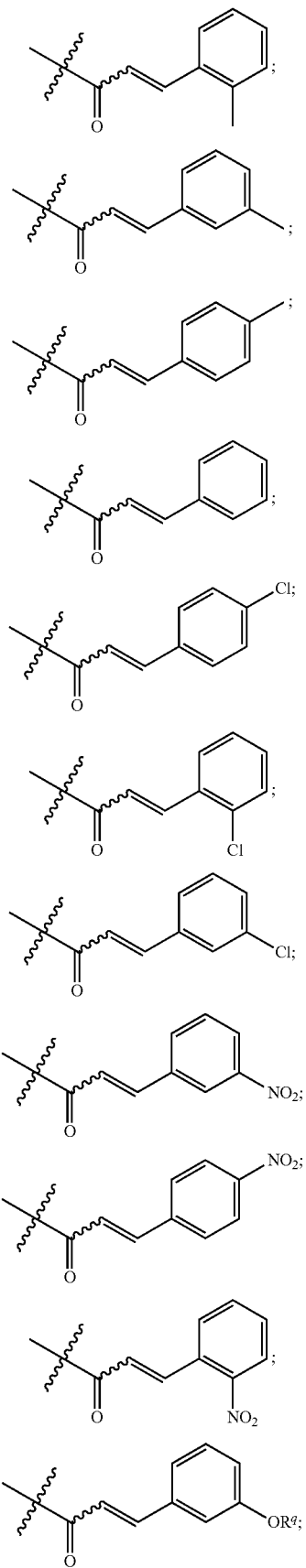

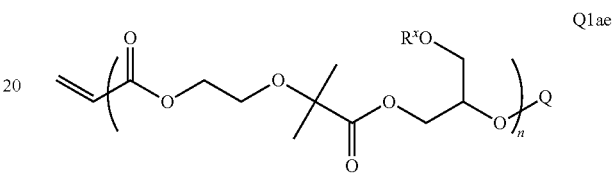

where $R^q$ is as defined above.

In certain embodiments, aliphatic polycarbonate chains comprise

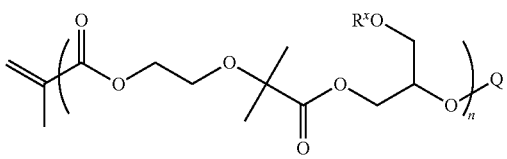
Q1ae wherein each of -Q, $R^x$, and n is as defined above and described in classes and subclasses herein.

In certain embodiments, the aliphatic polycarbonate chains comprise

Q1af wherein each of -Q, $R^x$, and n is as defined above and described in classes and subclasses herein.

In certain embodiments, in polycarbonates of formulae Q1a through Q1af, the moiety Q is selected from the group consisting of:

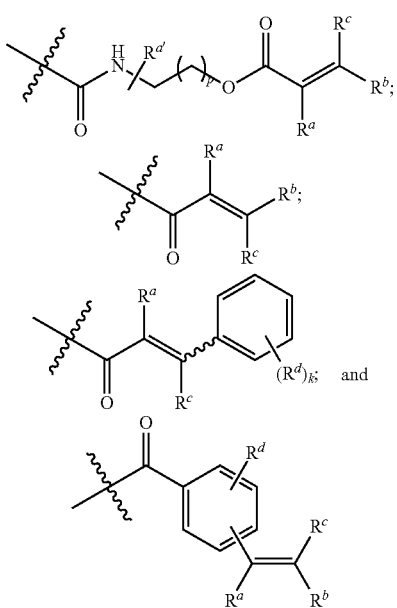

where $R^{a'}$, $R^a$, $R^b$, $R^c$, $R^d$, k and p are as defined above.

For polycarbonates comprising repeat units derived from two or more epoxides, such as those depicted by structures Q1m through Q1af, depicted above, it is to be understood that the structures drawn may represent mixtures of positional isomers or regioisomers. For example, the polymer repeat unit adjacent to either end groups of the polycarbonate chains can be derived from either one of the two epoxides comprising the copolymers. Thus, while the polymers may be drawn with a particular repeat unit attached to an end group, the terminal repeat units might be derived from either of the two epoxides and a given polymer composition might comprise a mixture of all of the possibilities in varying ratios. The ratio of these end-groups can be influenced by several factors including the ratio of the different epoxides used in the polymerization, the structure of the catalyst used, the reaction conditions used (i.e temperature pressure, etc.) and the timing of addition of reaction components. Similarly, while the drawings above may show a defined regiochemistry for repeat units derived from substituted epoxides, the polymer compositions will, in some cases, contain mixtures of regioisomers. The regioselectivity of a given polymerization can be influenced by numerous factors including the structure of the catalyst used and the reaction conditions employed. To clarify, this means that the composition represented by structure Q1ac above, may contain a mixture of several compounds as shown in the diagram below. This diagram shows the isomers graphically for polymer Q1ac, where the structure in brackets represents the polymer with each regio- and positional isomer possible for the monomer unit adjacent to the end groups on each side of the main polymer chain. Each end group on the polymer may be independently selected from the groups shown on the left or right. In certain embodiments, the polymer composition comprises a mixture of all possible combinations of these. In other embodiments, the polymer composition is enriched in one or more of these.

II) Aliphatic Polycarbonates with at Least One Olefinic Substituent Embedded within the Polymer Chain.

In certain embodiments, sites of olefinic unsaturation in the polycarbonate chains are present in a multifunctional initiator embedded within the aliphatic polycarbonate chains. In such aliphatic polycarbonates, sites of olefinic unsaturation are introduced by performing a copolymerization of carbon dioxide with one or more epoxides in the presence of chain transfer agents and/or polymerization initiators where the initiators and/or chain transfer agents contain sites of olefinic unsaturation along with two or more functional groups capable of initiating the copolymerization of epoxides and carbon dioxide. In certain embodiments, such olefinic groups comprise radically-polymerizable olefins such as acrylates, propiolates, acroleins, vinyl ethers or vinyl esters. In certain embodiments, sites capable of initiating the copolymerization of epoxides and carbon dioxide on such chain transfer agents or initiators are hydroxyl groups or carboxyl groups.

In certain embodiments, olefinic unsaturation in the aliphatic polycarbonate chains is present on a sidechain of one or more the repeating units of the polymer chains. In some embodiments, such groups may be introduced by conducting a copolymerization of carbon dioxide and a mixture of epoxide monomers where some of the epoxide monomers epoxides have sidechains containing olefinic unsaturation. In certain embodiments the epoxides bearing sidechains containing olefinic unsaturation are glycidyl esters or glycidyl ethers. Preferably, the olefinic groups on these glycidyl esters or ethers comprise radically-polymerizable olefins such as acrylates, styrenes, vinyl ethers, or vinyl esters.

In certain embodiments, the present invention provides a polymer composition comprising aliphatic polycarbonate chains having two or more sites of olefinic unsaturation, wherein:

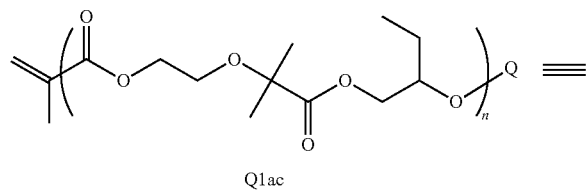

Q1ac

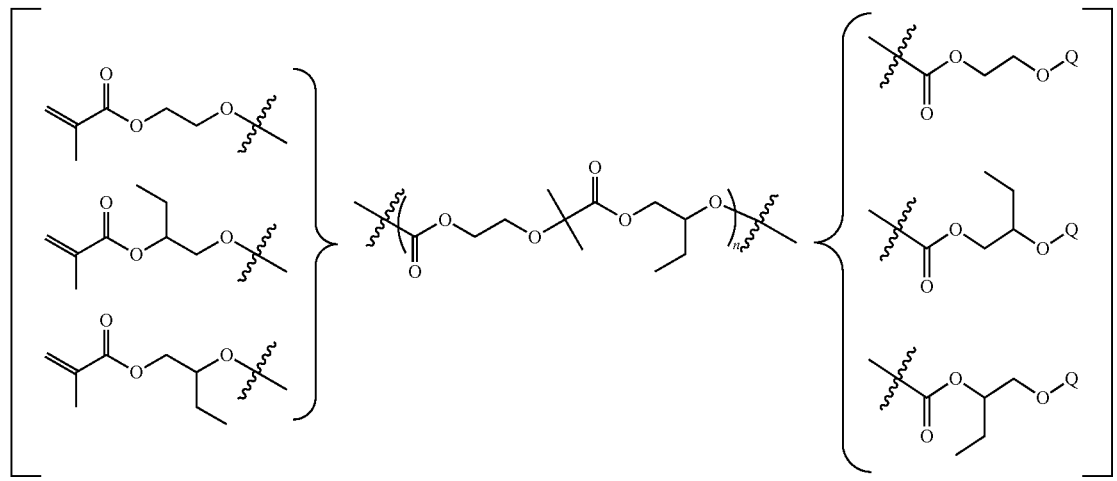

a) each aliphatic polycarbonate chain comprises a repeating unit having a structure:

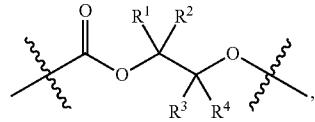

wherein each of $R^1$, $R^2$, $R^3$, and $R^4$ is as defined above and described in classes and subclasses herein;

b) each aliphatic polycarbonate chain further comprises a repeating unit having a structure:

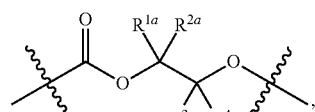

where $R^{1a}$, $R^{2a}$, $R^{3a}$, and $R^{4a}$ are, at each occurrence in a polymer chain, independently selected from the group consisting of —H, fluorine, an optionally substituted $C_{1-20}$ heteroaliphatic group, an optionally substituted $C_{1-20}$ aliphatic group, and -T-V, wherein for each unit of B, one or more of $R^{1a}$, $R^{2a}$, $R^{3a}$, and $R^{4a}$ is -T-V;

each T is independently a covalent bond or an optionally substituted bivalent $C_{1-8}$ saturated or unsaturated, straight or branched, hydrocarbon chain, wherein one or more methylene units are optionally and independently replaced by —NR—, —N(R)C(O)—, —C(O)N(R)—, —N(R)SO$_2$—, —SO$_2$N(R)—, —O—, —C(O)—, —OC(O)—, —OC(O)O—, —C(O)O—, —N(R)C(O)O—, —OC(O)N(R)—, —S—, —SO—, or —SO$_2$—;

each R is independently —H, or an optionally substituted moiety selected from the group consisting of $C_{1-6}$ aliphatic, $C_{1-6}$ heteroaliphatic, 3- to 7-membered heterocyclic, 3- to 7-membered carbocyclic 6- to 10-membered aryl, and 5- to 10-membered heteroaryl;

each V is an optionally substituted acyl, $C_{1-12}$ aliphatic, $C_{1-12}$ heteroaliphatic, 6- to 10-membered aryl, 5- to 12-membered heteroaryl, 3- to 14-membered carbocylic, or 3- to 12-membered heterocyclic, wherein V contains one or more units of olefinic unsaturation;

c) the molecular weight of the aliphatic polycarbonate chains is on average in the range of about 500 g/mol to about 200,000 g/mol.

In certain embodiments, the present invention provides a polymer composition comprising aliphatic polycarbonate chains having two or more sites of olefinic unsaturation and having the formula:

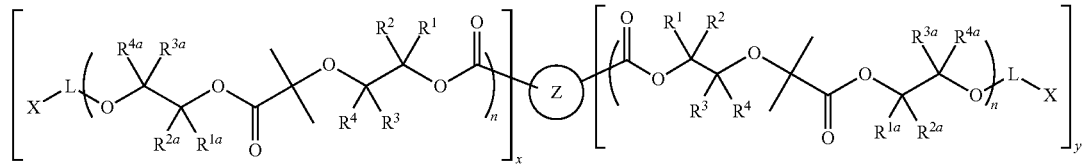

wherein each of R, $R^1$, $R^2$, $R^3$, $R^4$, $R^{1a}$, $R^{2a}$, $R^{3a}$, $R^{4a}$, x, y, and n is as defined above and described in classes and subclasses herein;

each L is independently a covalent bond or an optionally substituted $C_{1-8}$ saturated or unsaturated, straight or branched, hydrocarbon chain, wherein one or more methylene units are optionally and independently replaced by —NR—, —N(R)C(O)—, —N(R)C(O)O—, —C(O)N(R)—, —N(R)SO$_2$—, —SO$_2$N(R)—, —O—, —C(O)—, —OC(O)—, —OC(O)O—, —C(O)O—, —N(R)C(O)O—, —OC(O)N(R)—, —S—, —SO—, or —SO$_2$—; and each X is independently hydrogen, an optionally substituted moiety selected from the group consisting of aliphatic, acyl, alkyl or aryl silane, alkyl or aryl sulfonyl, and carbamoyl, or a group containing one or more units of olefinic unsaturation;

is a covalent bond, a heteroatom, or a multivalent moiety; and x and y are each independently an integer from 0 to 6, where the sum of x and y is between 2 and 6 inclusive.

In certain embodiments, the present invention provides a polymer composition comprising aliphatic polycarbonate chains having two or more sites of olefinic unsaturation and having the formula:

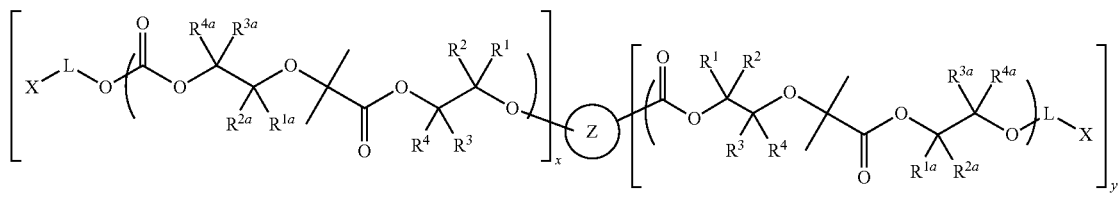

wherein each of R, R$^1$, R$^2$, R$^3$, R$^4$, R$^{1a}$, R$^{2a}$, R$^{3a}$, R$^{4a}$, L,

,

X, x, y, and n is as defined above and described in classes and subclasses herein.

In certain embodiments, the present invention provides a polymer composition comprising aliphatic polycarbonate chains having two or more sites of olefinic unsaturation and having the formula:

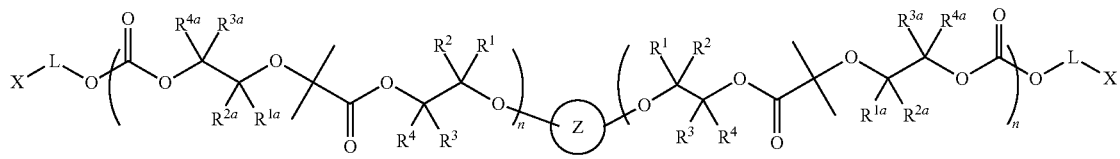

wherein each of R, R$^1$, R$^2$, R$^3$, R$^4$, R$^{1a}$, R$^{2a}$, R$^{3a}$, R$^{4a}$ L,

,

X, and n is as defined above and described in classes and subclasses herein.

In certain embodiments, the present invention provides a polymer composition comprising aliphatic polycarbonate chains having two or more sites of olefinic unsaturation and having the formula:

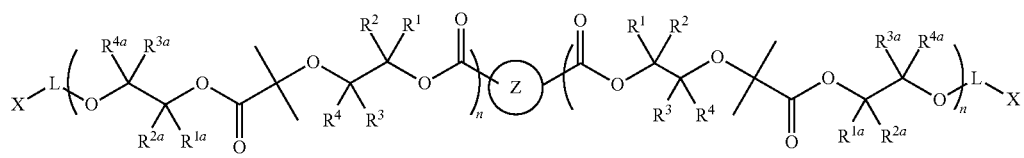

wherein each of R, R$^1$, R$^2$, R$^3$, R$^4$, R$^{1a}$, R$^{2a}$, R$^{3a}$, R$^{4a}$ L,

,

X, and n is as defined above and described in classes and subclasses herein.

It will be appreciated that when

is a multivalent moiety, it may be derived from a polyfunctional chain transfer reagent as defined above and described in classes the subclasses herein. In some embodiments,

is a diol, triol, tetraol, hexanol- or other polyol as described above and in classes and subclasses herein. In some embodiments,

is a hydroxy acid as described above and in classes and subclasses herein. In some embodiments,

is a polycarboxylic acid as described above and in classes and subclasses herein. In some embodiments,

comprises an alkoxylated derivative of a compound selected from the group consisting of: a polycarboxylic acid, a polyol, or a hydroxy acid. In certain embodiments, such alkoxylated derivatives comprise ethoxylated or propoxylated compounds.

In certain embodiments, the present invention provides a polymer composition comprising aliphatic polycarbonate chains having two or more sites of olefinic unsaturation and having the formula:

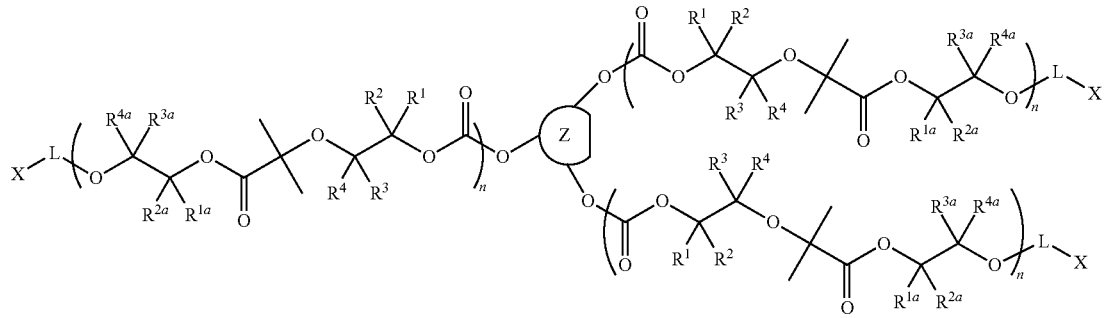

wherein each of R, $R^1$, $R^2$, $R^3$, $R^4$, $R^{1a}$, $R^{2a}$, $R^{3a}$, $R^{4a}$, L,

X, and n is as defined above and described in classes and subclasses herein.

In certain embodiments, the present invention provides a polymer composition comprising aliphatic polycarbonate chains having two or more sites of olefinic unsaturation and having the formula:

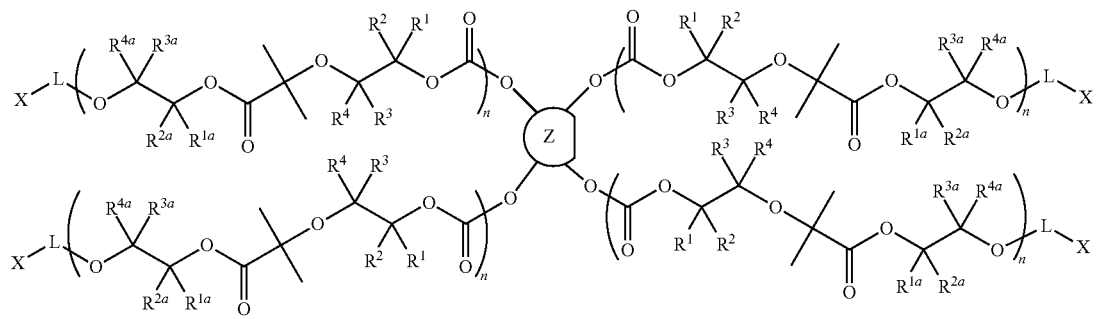

wherein each of R, $R^1$, $R^2$, $R^3$, $R^4$, $R^{1a}$, $R^{2a}$, $R^{3a}$, $R^{4a}$, L,

X, and n is as defined above and described in classes and subclasses herein.

In certain embodiments, the present invention provides a polymer composition comprising aliphatic polycarbonate chains having two or more sites of olefinic unsaturation and having the formula:

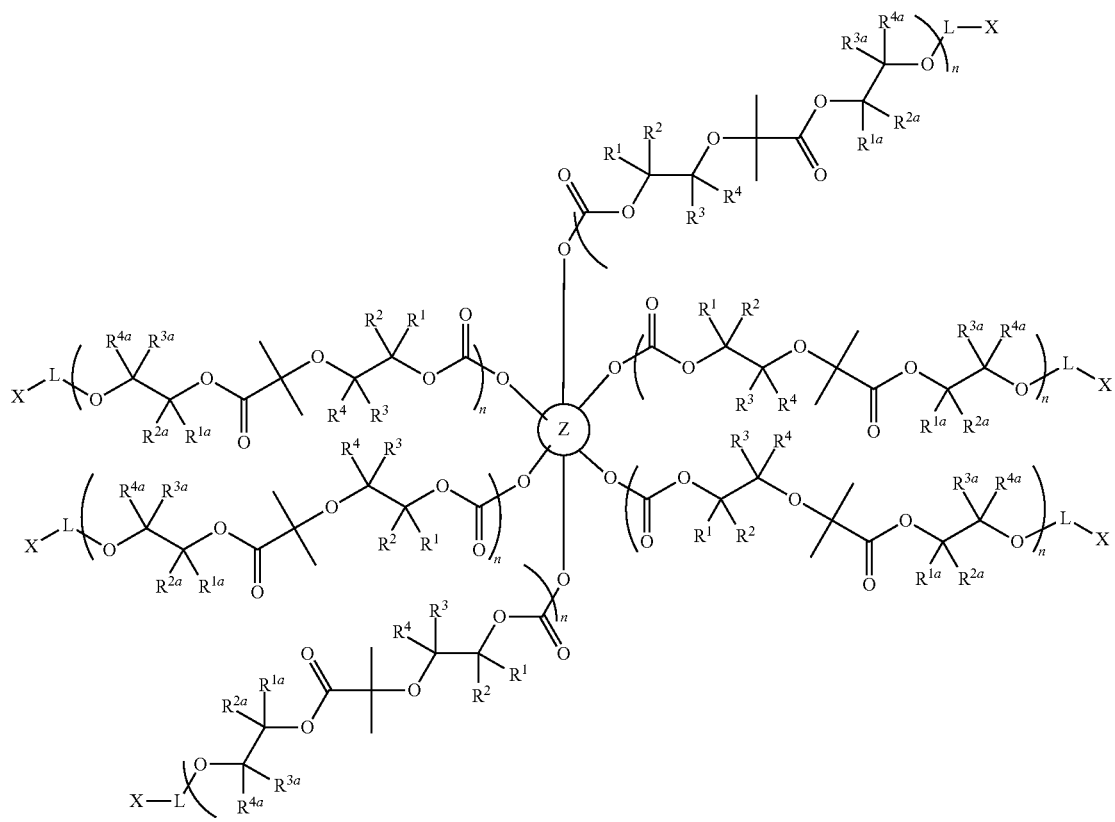

wherein each of $R^1$, $R^2$, $R^3$, $R^4$, Y,

and n is as defined above and described in classes and subclasses herein.

In certain embodiments,

comprises or is derived from a polyfunctional chain transfer reagent containing two or more sites capable of initiating the copolymerization of epoxides and carbon dioxide and also containing one or more sites of olefinic unsaturation.

In some embodiments,

comprises or is derived from a polyol wherein one or more hydroxyl groups are functionalized with an optionally substituted acrylate, optionally substituted acrolein, optionally substituted acrylamide, optionally substituted maleimide, optionally substituted vinyl ether, or optionally substituted styrene. In some embodiments,

comprises or is derived from a triol wherein one or two hydroxyl groups are functionalized with an optionally substituted acrylate, optionally substituted acrolein, optionally substituted acrylamide, optionally substituted maleimide, optionally substituted vinyl ether, or optionally substituted styrene. In some embodiments,

Z comprises or is derived from a tetraol wherein one, two, or three hydroxyl groups are functionalized with an optionally substituted acrylate, optionally substituted acrolein, optionally substituted acrylamide, optionally substituted maleimide, optionally substituted vinyl ether, or optionally substituted styrene.

In some embodiments,

Z comprises or is derived from a triol wherein one or two hydroxyl groups are functionalized with an optionally substituted acrylate. In some embodiments,

comprises or is derived from a tetraol wherein one, two, or three, hydroxyl groups are functionalized with an optionally substituted acrylate. In some embodiments,

comprises or is derived from a polyhydric alcohol wherein some hydroxyl groups are functionalized with an optionally substituted acrylate but at least two hydroxyl groups remain free —OH groups. In certain embodiments,

comprises or is derived from a partially acrylated or methacrylated polyhydric alcohol.

In some embodiments, X is hydrogen. In some embodiments, X is other than hydrogen. In some embodiments, V is hydrogen. In some embodiments, V is other than hydrogen. In certain embodiments, each X and V independently comprise a moiety selected from the group consisting of: optionally substituted acrylate, optionally substituted acrolein, optionally substituted acrylamide, optionally substituted maleimide, optionally substituted vinyl ether, and optionally substituted styrene. In certain embodiments, each X and V are independently selected from:

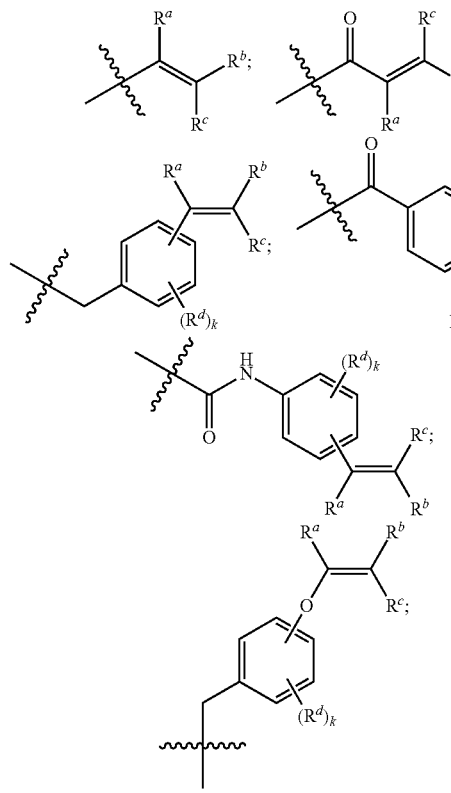

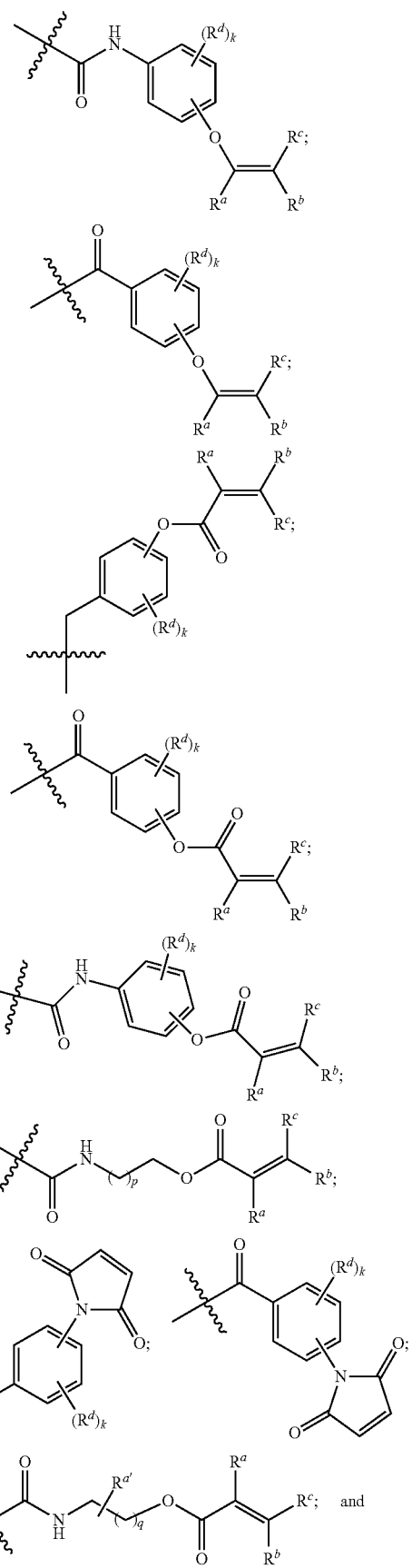

-continued

[structure: pivaloyl-NH-phenyl(R^d)_k-maleimide]

wherein each of R, $R^a$, $R^b$, $R^c$, $R^d$, and k, q, p, and $R^{a'}$ is as defined above and described in classes and subclasses herein.

In certain embodiments, each X and V are independently selected from:

[structures shown]

wherein each of k, R, and $R^d$ is as defined above and described in classes and subclasses herein.

In some embodiments, each X is independently any Q, Y, or Y'—(CO)$_q$— group as defined above and described in classes and subclasses herein.

In some embodiments, X is

[structure with $R^c$, $R^b$, $R^a$]

In some embodiments, X is

[structure with $R^c$, $R^b$, H]

In certain embodiments, X is

[structure with $R^c$, $R^b$, methyl]

In some embodiments, X is

[vinyl ketone structure]

In some embodiments, X is

[methylvinyl ketone structure]

In certain embodiments, one or both L-X groups is hydrogen and the aliphatic polycarbonate chain is chemically modified in a post-polymerization reaction to introduce sites of olefinic unsaturation, as shown in Scheme 1, above. The present invention includes methods of introducing one or more sites of olefinic unsaturation on the end(s) of provided aliphatic polycarbonates having a repeating unit B, as described above. Such methods include all methods and substituents described above in Section I.

In some embodiments, V is

[structure with $R^c$, $R^b$, $R^a$]

In some embodiments, V is

[structure with $R^c$, $R^b$, H]

In certain embodiments, V is

[structure with $R^c$, $R^b$, methyl]

In some embodiments, V is

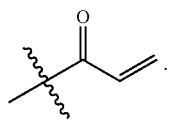 [SMILES: *C(=O)C=C]

In some embodiments, V is

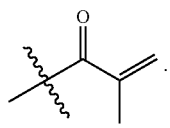 [SMILES: *C(=O)C(=C)C]

In certain embodiments, V is different from at least one X. In other embodiments, X and V are the same.

In some embodiments, each T is independently an optionally substituted $C_{1-8}$ saturated or unsaturated, straight or branched, hydrocarbon chain, wherein one or more methylene units are optionally and independently replaced by —NR—, —N(R)C(O)—, —C(O)N(R)—, —O—, —C(O)—, —OC(O)—, —OC(O)O—, —C(O)O—, —N(R)C(O)O—, or —OC(O)N(R)—. In certain embodiments, each T is independently an optionally substituted $C_{1-3}$ saturated or unsaturated, straight or branched, hydrocarbon chain, wherein one or more methylene units are optionally and independently replaced by —NR—, —N(R)C(O)—, —C(O)N(R)—, —O—, —C(O)—, —OC(O)—, —OC(O)O—, —C(O)O—, —N(R)C(O)O—, or —OC(O)N(R)—. In some embodiments, each T is independently an optionally substituted $C_{1-3}$ saturated or unsaturated, straight or branched, hydrocarbon chain, wherein one or more methylene units are optionally and independently replaced by —O—, —C(O)—, —OC(O)—, —OC(O)O—, or —C(O)O—.

In some embodiments, T is selected from the group consisting of —CH$_2$O—*, —CH$_2$OC(O)—*, —CHMeO—*, or —CHMeOC(O)—*, wherein * designates the point of attachment to V. In some embodiments, T is —CH$_2$O—*. In some embodiments, T is —CH$_2$OC(O)—*. In some embodiments, T is —CHMeO—*. In some embodiments, T is —CHMeOC(O)—*.

In some embodiments, L is a covalent bond. In other embodiments, each L is independently an optionally substituted $C_{1-8}$ saturated or unsaturated, straight or branched, hydrocarbon chain, wherein one or more methylene units are optionally and independently replaced by —NR—, —N(R)C(O)—, —C(O)N(R)—, —O—, —C(O)—, —OC(O)—, —OC(O)O—, —C(O)O—, —N(R)C(O)O—, or —OC(O)N(R)—. In some embodiments, each L is independently an optionally substituted $C_{1-3}$ saturated or unsaturated, straight or branched, hydrocarbon chain, wherein one or more methylene units are optionally and independently replaced by —NR—, —N(R)C(O)—, —C(O)N(R)—, —O—, —C(O)—, —OC(O)—, —OC(O)O—, —C(O)O—, —N(R)C(O)O—, or —OC(O)N(R)—. In some embodiments, each L is independently an optionally substituted $C_{1-3}$ saturated or unsaturated, straight or branched, hydrocarbon chain, wherein one or more methylene units are optionally and independently replaced by —O—, —C(O)—, —OC(O)—, —OC(O)O—, or —C(O)O—.

In some embodiments, L is selected from the group consisting of —CH$_2$CH$_2$O—*, —CH$_2$CH$_2$OC(O)—*, —CH$_2$CHMeO—*, —CHMeCH$_2$O—*, —CH$_2$CHMeOC(O)—*, or —CHMeCH$_2$OC(O)—*, wherein * designates the point of attachment to X. In some embodiments, L is —CH$_2$CH$_2$O—*. In some embodiments, L is —CH$_2$CH$_2$OC(O)—*. In some embodiments, L is —CH$_2$CHMeO—*. In some embodiments, L is —CHMeCH$_2$O—*. In some embodiments, L is —CH$_2$CHMeOC(O)—*. In some embodiments, L is —CHMeCH$_2$OC(O)—*.

In certain embodiments, aliphatic polycarbonate chains are of the formula:

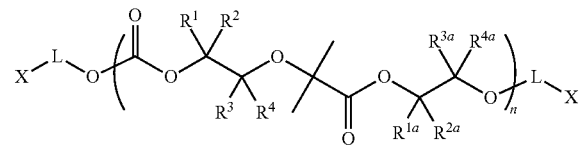

wherein each of L, X, $R^1$, $R^2$, $R^3$, $R^4$, $R^{1a}$, $R^{2a}$, $R^{3a}$, $R^{4a}$, and n is as defined above and described in classes and subclasses herein.

In some embodiments, aliphatic polycarbonate chains are of the formula:

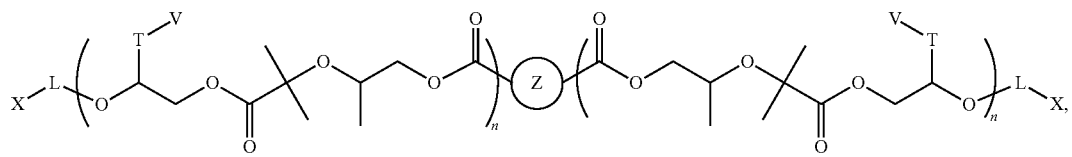

wherein each of L, X, T, V, and Z is as defined above and described in classes and subclasses herein and where n is, on average in the polymer, an integer from about 5 to about 400.

In some embodiments, aliphatic polycarbonate chains are of the formula:

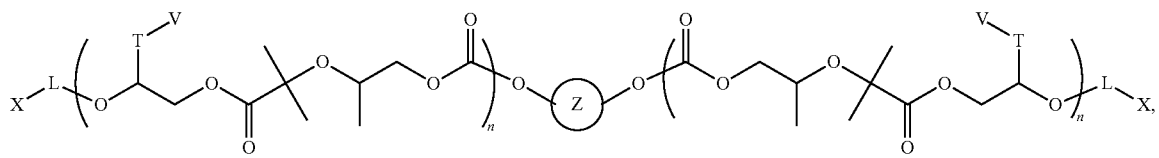

wherein each of L, X, T, V, and Z is as defined above and described in classes and subclasses herein and where n is, on average in the polymer, an integer from about 5 to about 400.

In some embodiments, aliphatic polycarbonates are of the formula:

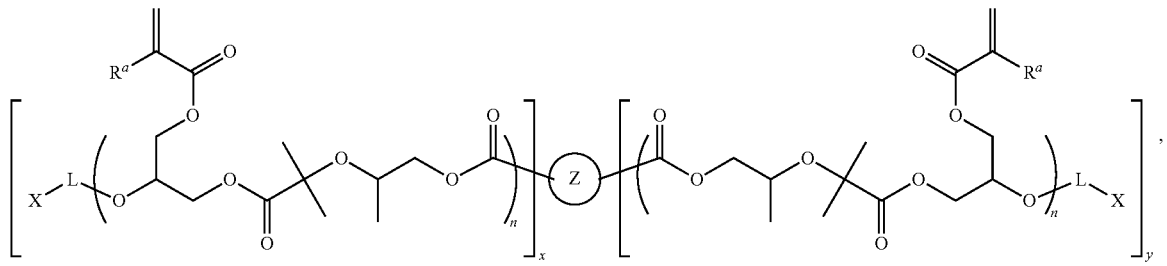

wherein each of L, X, x, y, n, and Z is as defined above and described in classes and subclasses herein, and $R^a$ is hydrogen or methyl.

In some embodiments, aliphatic polycarbonates are of the formula:

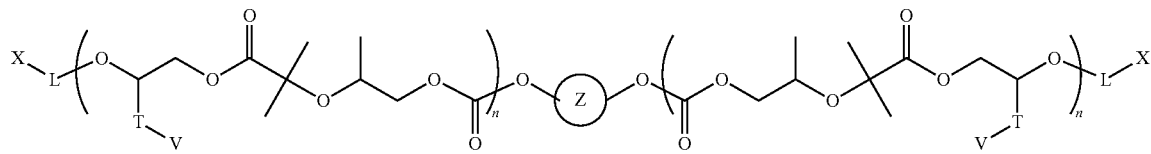

wherein each of L, X, T, V, and Z is as defined above and described in classes and subclasses herein and where n is, on average in the polymer, an integer from about 5 to about 400.

In some embodiments, aliphatic polycarbonates are of the formula:

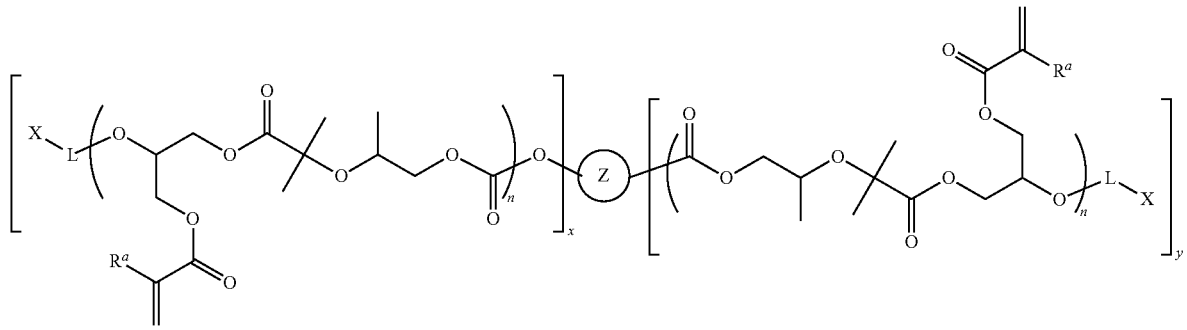

wherein each of L, X, x, y, n, and Z is as defined above and described in classes and subclasses herein, and $R^a$ is hydrogen or methyl.

In some embodiments, aliphatic polycarbonates are of the formula:

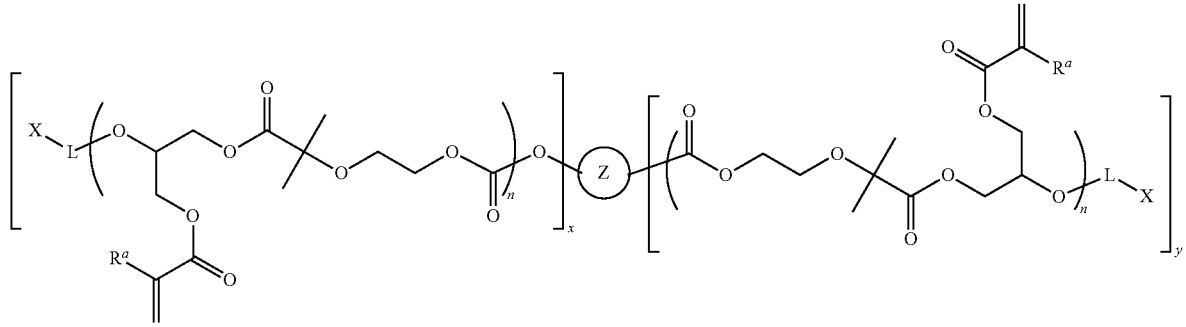

wherein each of L, X, x, y, n, and Z is as defined above and described in classes and subclasses herein, and $R^a$ is hydrogen or methyl.

In certain embodiments, the present invention provides polymer compositions (in either of sections I and II above) of each of the following classes and subclasses, both singly and in combination, wherein each variable is as defined above unless otherwise specified:

i. comprising aliphatic polycarbonate chains having two or more sites of olefinic unsaturation, wherein
   a) the aliphatic polycarbonate chains comprise a repeating unit having a structure:

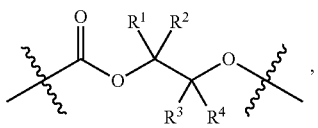

wherein
   $R^1$, $R^2$, $R^3$, and $R^4$ are, at each occurrence in the polymer chain, independently selected from the group consisting of —H, fluorine, an optionally substituted $C_{1-30}$ aliphatic group, and an optionally substituted $C_{1-20}$ heteroaliphatic group, and an optionally substituted $C_{6-10}$ aryl group, where any two or more of $R^1$, $R^2$, $R^3$, and $R^4$ may optionally be taken together with intervening atoms to form one or more optionally substituted rings optionally containing one or more heteroatoms;
   b) at least two of the sites of olefinic unsaturation comprise carbon-carbon double bonds in a moiety selected from the group consisting of: optionally substituted acrylate, optionally substituted acrolein, optionally substituted acrylamide, optionally substituted maleimide, optionally substituted vinyl ether, and optionally substituted styrene; and
   c) the molecular weight of the aliphatic polycarbonate chains is on average in the range of about 500 g/mol to about 100,000 g/mol;
ii. wherein sites of olefinic unsaturation are disposed at one or more ends of the aliphatic carbonate chains;
iii. wherein the sites of olefinic unsaturation disposed at the ends of the aliphatic carbonate chains are independently selected from the group consisting of: acrylate ester, optionally substituted acrolein, optionally substituted acrylamide, optionally substituted maleimide, optionally substituted vinyl ether, and optionally substituted styrene;
iv. comprising aliphatic polycarbonate chains having a formula:

wherein:
   each Y is independently a functional group containing olefinic unsaturation,

is a covalent Dona, a heteroatom, or a multivalent moiety, and
   x and y are each independently an integer from 0 to 6, where the sum of x and y is between 2 and 6;
v. for subset iv, wherein the sites of olefinic unsaturation in Y comprise carbon-carbon double bonds in a moiety selected from the group consisting of: optionally substituted acrylate, optionally substituted acrolein, optionally substituted acrylamide, optionally substituted maleimide, optionally substituted vinyl ether, and optionally substituted styrene;
vi. for subset iv, wherein each Y is independently selected from the group consisting of:

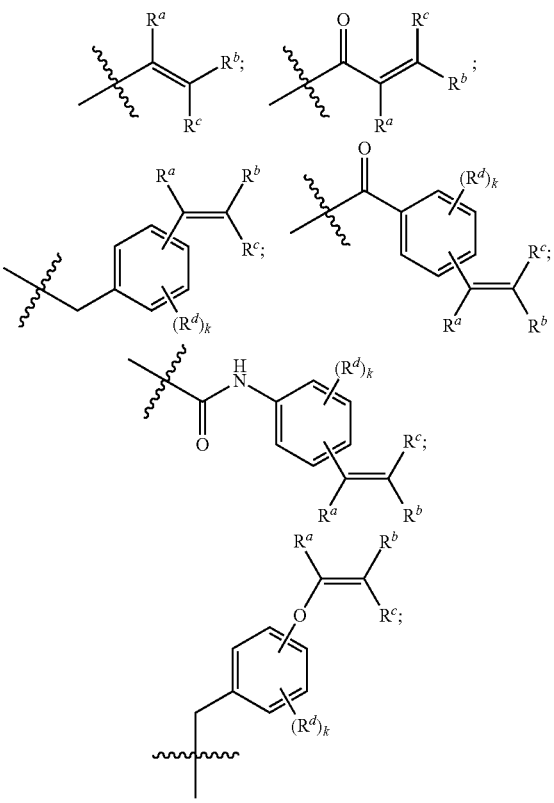

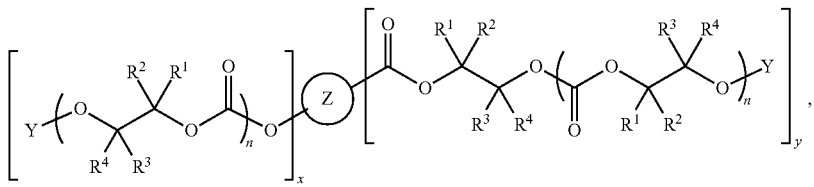

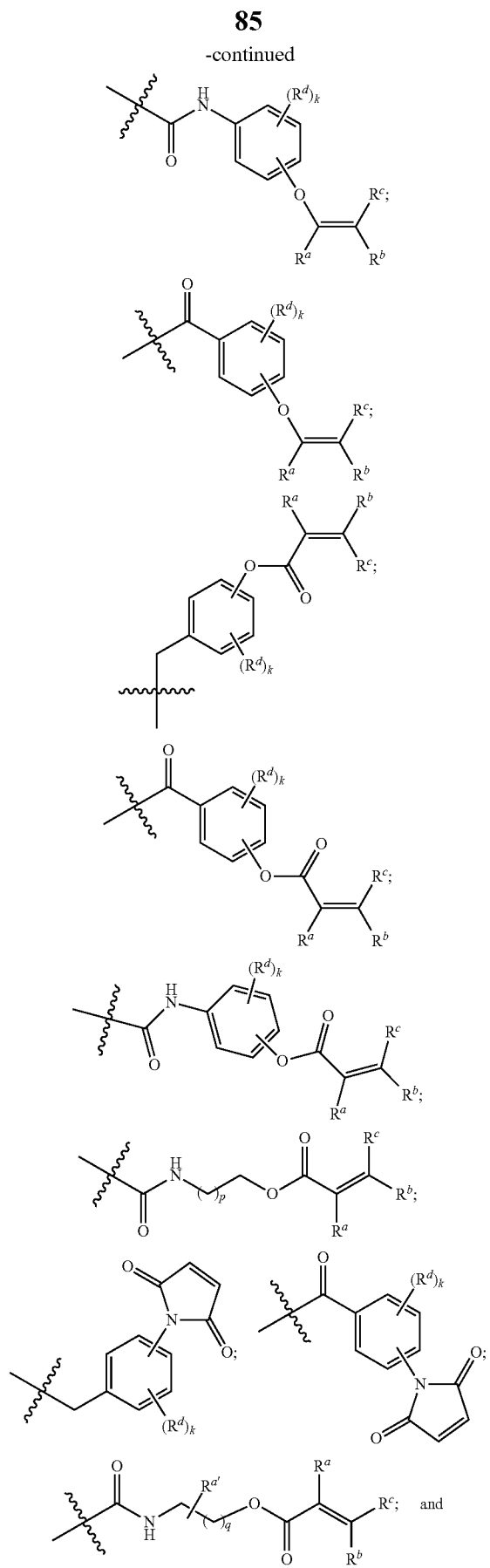
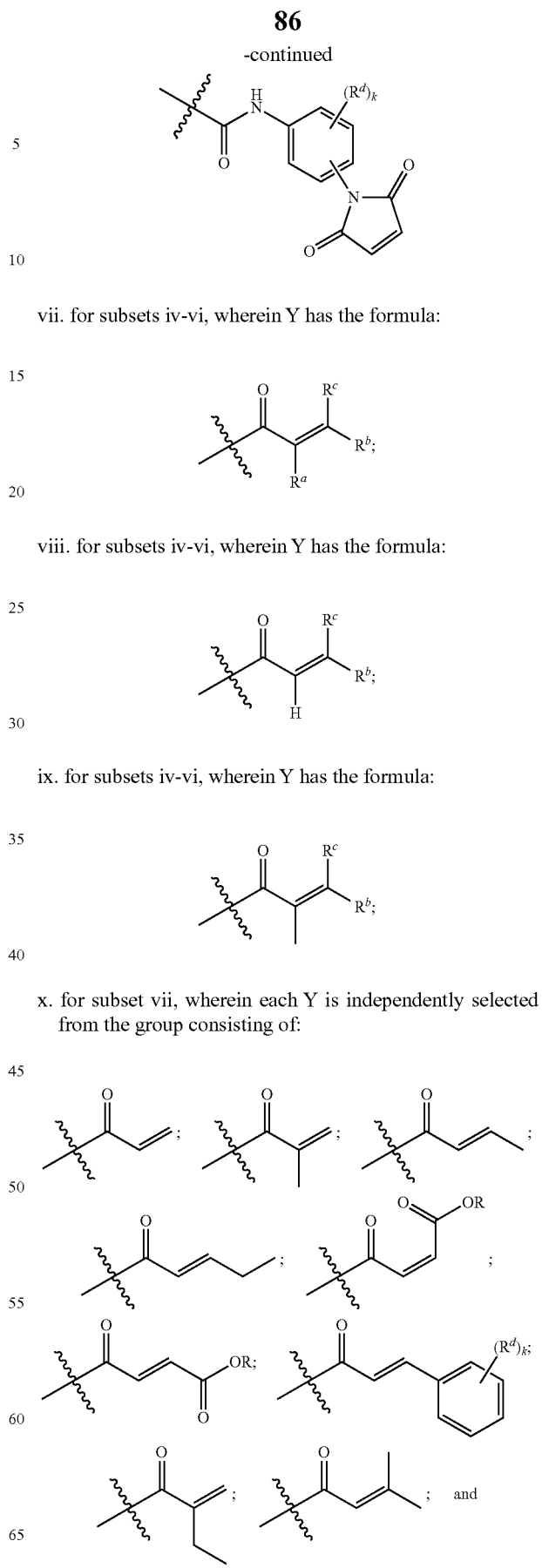
vii. for subsets iv-vi, wherein Y has the formula:
viii. for subsets iv-vi, wherein Y has the formula:
ix. for subsets iv-vi, wherein Y has the formula:
x. for subset vii, wherein each Y is independently selected from the group consisting of:

-continued

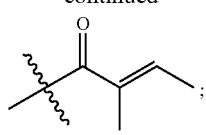

xi. wherein Y has the formula:

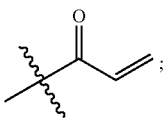 [SMILES: *C(=O)C=C]

xii. wherein Y has the formula:

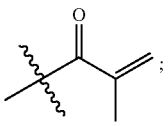 [SMILES: *C(=O)C(=C)C]

xiii. wherein Y has the formula:

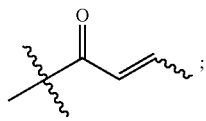

xiv. wherein Y has the formula:

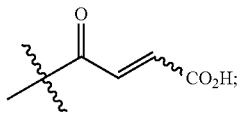 [SMILES: *C(=O)C=CC(=O)O]

xv. Y has the formula:

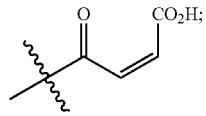 [SMILES: *C(=O)/C=C\C(=O)O]

xvi. wherein Y has the formula:

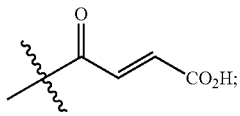 [SMILES: *C(=O)/C=C/C(=O)O]

xvii. wherein Y has the formula:

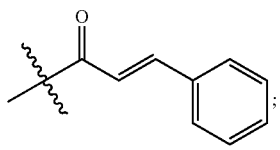 [SMILES: *C(=O)/C=C/c1ccccc1]

xviii. wherein Y has the formula:

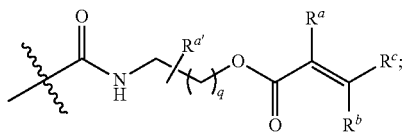

xix. wherein X and Y have the formula:

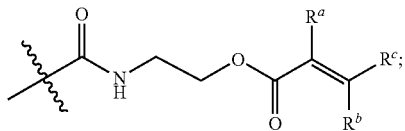

xx. wherein Y has the formula:

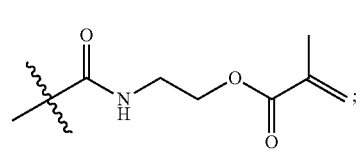 [SMILES: *C(=O)NCCOC(=O)C(=C)C]

xxi. wherein Y has the formula:

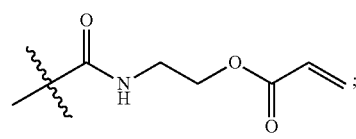 [SMILES: *C(=O)NCCOC(=O)C=C]

xxii. wherein at least one Y group is different from the others;
xxiii. wherein each Y group is the same;
xxiv. comprising aliphatic polycarbonate chains having a formula:

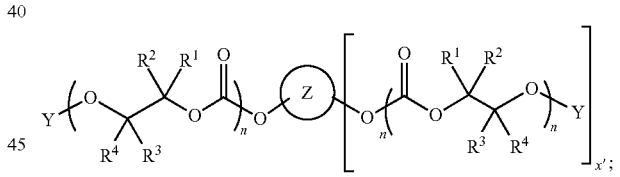

xxv. wherein

is derived from a dihydric alcohol;
xxvi. for subset xxv, wherein the dihydric alcohol comprises a $C_{2-40}$ diol;
xxvii. comprising aliphatic polycarbonate chains having a formula:

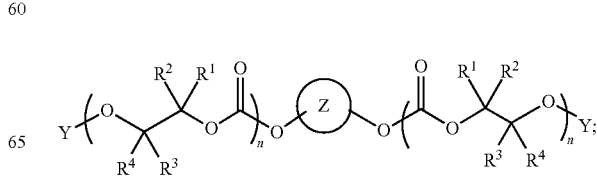

xxviii. wherein

is derived from a polyhydric alcohol;

xxix. for subset xxviii, wherein the polyhydric alcohol comprises a $C_{2-40}$ triol;

xxx. comprising aliphatic polycarbonate chains having a formula:

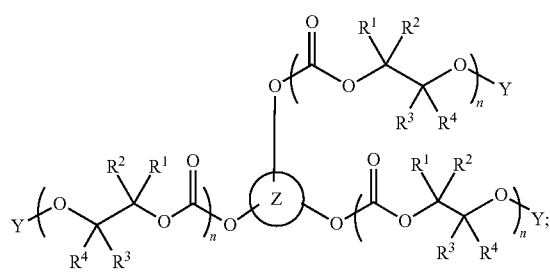

xxxi. wherein

is derived from a polycarboxylic acid;

xxxii. comprising aliphatic polycarbonate chains having a formula:

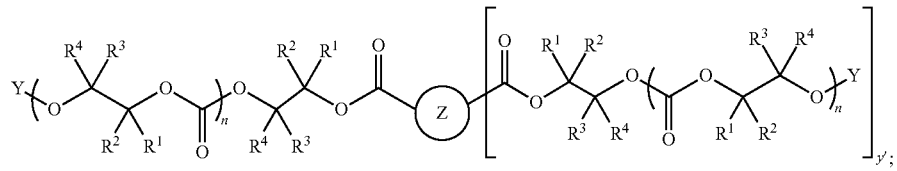

xxxiii. wherein

is derived from a dicarboxylic acid;

xxxiv. comprising aliphatic polycarbonate chains having a formula:

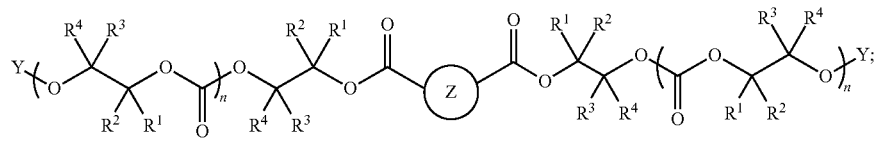

xxxv. wherein

is derived from a hydroxy acid;

xxxvi. comprising aliphatic polycarbonate chains having a formula:

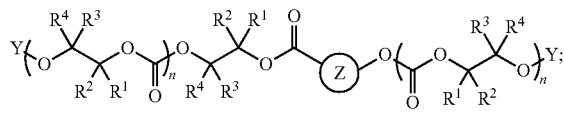

xxxvii. comprising poly(propylene carbonate) chains having a formula:

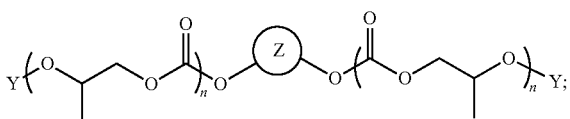

xxxviii. wherein

is selected from the group consisting of: ethylene glycol; diethylene glycol, trimethylene glycol, 1,3 propane diol; 1,4 butane diol, propylene glycol, hexylene glycol, dipropylene glycol, tripopylene glycol, and alkoxylated derivatives thereof.

xxxix. wherein sites of olefinic unsaturation are present on at least a portion of the

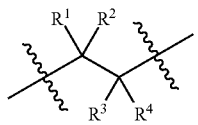

moieties within the aliphatic polycarbonate chains;

xl. wherein the sites of olefinic unsaturation disposed within the aliphatic carbonate chains are independently selected from the group consisting of: acrylate ester, optionally substituted vinyl ether, and optionally substituted styrene;

xli. wherein the sites of olefinic unsaturation disposed within the aliphatic carbonate chains are derived from a substituted epoxide bearing a pendant acrylate ester, vinyl ether or styrenyl substituent;

xlii. wherein one of $R^1$, $R^2$, $R^3$, and $R^4$ on at least a fraction of the repeating units of the aliphatic polycarbonate chains comprise sites of olefinic unsaturation;

xliii. comprising aliphatic polycarbonate chains containing at least two types of repeat units, wherein a first type of repeat unit has a substituent with olefinic unsaturation and a second type of repeat unit does not have substituents with olefinic unsaturation;

xliv. comprising aliphatic polycarbonate chains having a formula

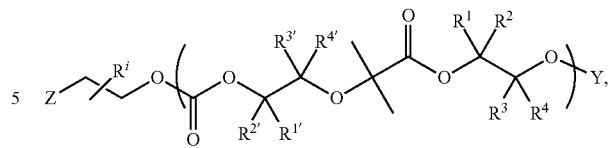

wherein Z is any group that can ring-open an epoxide,

Y is selected from the group consisting of —H, optionally substituted aliphatic, acyl, alkyl or aryl silane, alkyl or aryl sulfonyl, and carbamoyl, $R^{1'}$, $R^{2'}$, $R^{3'}$, and $R^{4'}$ are, at each occurrence within the aliphatic polycarbonate chains, independently selected from the group consisting of: —H, fluorine, and an optionally substituted $C_{1-20}$ aliphatic group, where any two or more of $R^{1'}$, $R^{2'}$, $R^{3'}$, and $R^{4'}$ may optionally be taken together with intervening atoms to form one or more optionally substituted rings optionally containing one or more heteroatoms; wherein at least one of $R^{1'}$, $R^{2'}$, $R^{3'}$, or $R^{4'}$ is a group including olefinic unsaturation, and $R^i$ represents either $R^{1'}$, $R^{2'}$, $R^{3'}$, and $R^{4'}$ or $R^1$, $R^2$, $R^3$, and $R^4$;

xlv. comprising aliphatic polycarbonate chains having a formula:

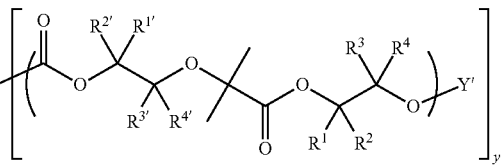

wherein:

X' and Y' are selected from the group consisting of —H, optionally substituted aliphatic, acyl, alkyl or aryl silane, alkyl or aryl sulfonyl, and carbamoyl, $R^{1'}$, $R^{2'}$, $R^{3'}$, and $R^{4'}$ are, at each occurrence within the aliphatic polycarbonate chains, independently selected from the group consisting of: —H, fluorine, and an optionally substituted $C_{1-20}$ aliphatic group, where any two or more of $R^{1'}$, $R^{2'}$, $R^{3'}$, and $R^{4'}$ may optionally be taken together with intervening atoms to form one or more optionally substituted rings optionally containing one or more heteroatoms; wherein at least one of $R^{1'}$, $R^{2'}$, $R^{3'}$, or $R^{4'}$ is a group including olefinic unsaturation;

xlvi. comprising aliphatic polycarbonate chains having a formula:

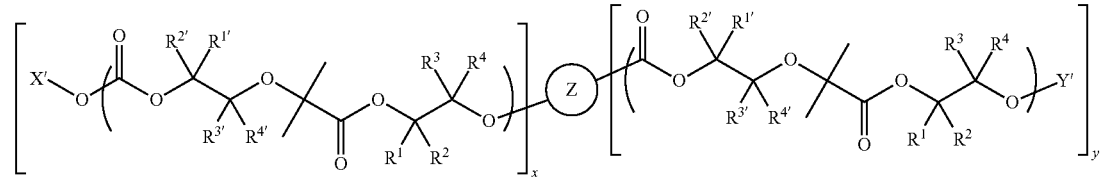

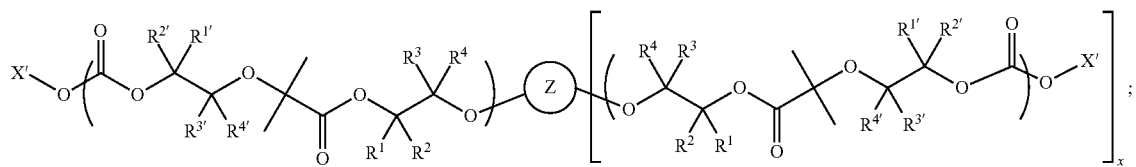

xlvii. wherein

is derived from a dihydric alcohol;

xlviii. comprising aliphatic polycarbonate chains having a formula:

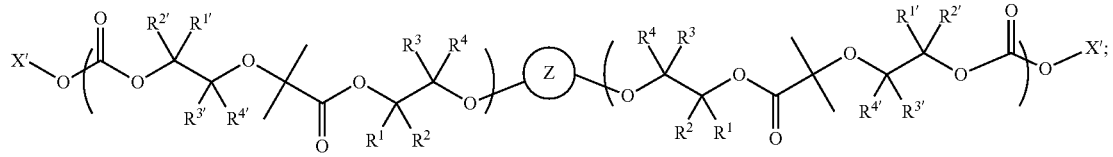

xlix. for subset xlvii, wherein the dihydric alcohol comprises a $C_{2-40}$ diol;

l. wherein

is derived from a polyhydric alcohol;

li. for subset l, wherein the polyhydric alcohol comprises a $C_{2-40}$ triol;

lii. comprising aliphatic polycarbonate chains having a formula:

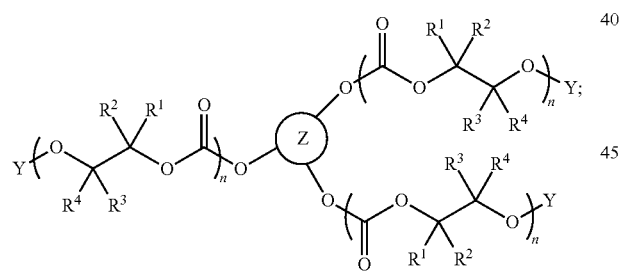

liii. comprising aliphatic polycarbonate chains having two or more sites of olefinic unsaturation, wherein
   a) each aliphatic polycarbonate chain comprises a repeating unit having a structure:

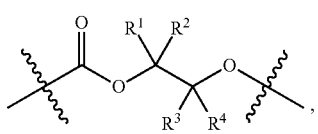

A where $R^1$, $R^2$, $R^3$, and $R^4$ are, at each occurrence in a polymer chain, independently selected from the group consisting of —H, fluorine, an optionally substituted $C_{1-20}$ heteroaliphatic group, and an optionally substituted $C_{1-30}$ aliphatic group, and an optionally substituted $C_{6-10}$ aryl group, where any two or more of $R^1$, $R^2$, $R^3$, and $R^4$ may optionally be taken together with intervening atoms to form one or more optionally substituted rings optionally containing one or more heteroatoms;

b) each aliphatic polycarbonate chain further comprises a repeating unit having a structure:

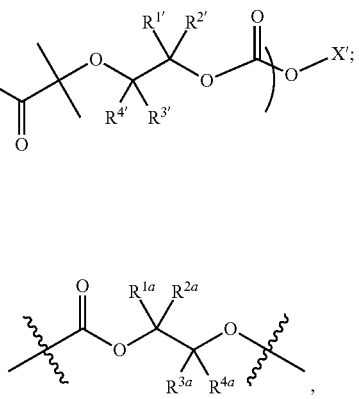

B where $R^{1a}$, $R^{2a}$, $R^{3a}$, and $R^{4a}$ are, at each occurrence in a polymer chain, independently selected from the group consisting of —H, fluorine, an optionally substituted $C_{1-20}$ aliphatic group, and -T-V, wherein for each unit of B, one or more of $R^{1a}$, $R^{2a}$, $R^{3a}$, and $R^{4a}$ is -T-V;

each T is independently a covalent bond or an optionally substituted bivalent $C_{1-8}$ saturated or unsaturated, straight or branched, hydrocarbon chain, wherein one or more methylene units are optionally and independently replaced by —NR—, —N(R)C(O)—, —C(O)N(R)—, —N(R)SO$_2$—, —SO$_2$N(R)—, —O—, —C(O)—, —OC(O)—, —OC(O)O—, —C(O)O—, —N(R)C(O)O—, —OC(O)N(R)—, —S—, —SO—, or —SO$_2$—;

each R is independently —H, or an optionally substituted radical selected from the group consisting of $C_{1-20}$ aliphatic, heterocyclic, carbocyclic, aryl, and heteroaryl;

each V is an optionally substituted acyl, $C_{1-12}$ aliphatic, $C_{1-12}$ heteroaliphatic, aryl, heteroaryl, carbocyclic, or heterocyclic group containing one or more units of olefinic unsaturation;

c) the molecular weight of the aliphatic polycarbonate chains is on average in the range of about 500 g/mol to about 100,000 g/mol;

liv. comprising aliphatic polycarbonate chains having a formula:

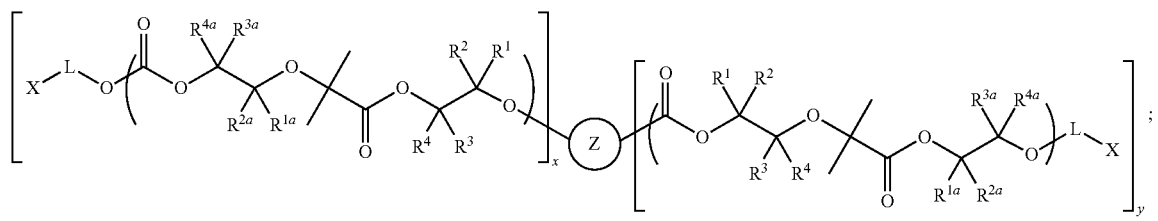

lv. comprising aliphatic polycarbonate chains having a formula:

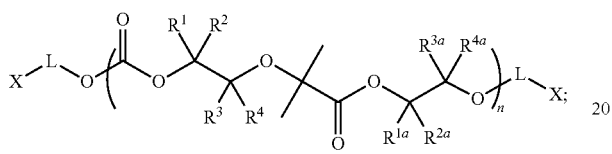

lvi. wherein the sites of olefinic unsaturation in X and V comprise carbon-carbon double bonds in a moiety selected from the group consisting of: optionally substituted acrylate, optionally substituted acrolein, optionally substituted acrylamide, optionally substituted maleimide, optionally substituted vinyl ether, and optionally substituted styrene;

lvii. wherein X and V are independently selected from the group consisting of:

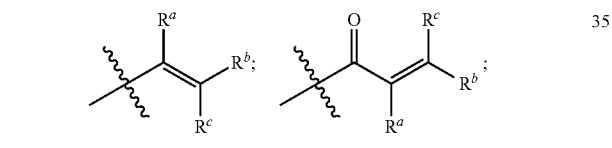

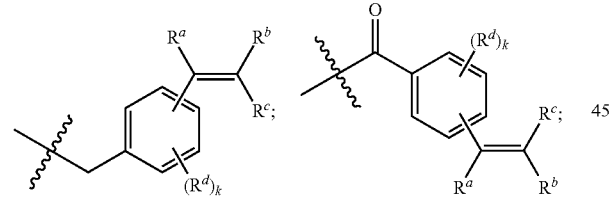

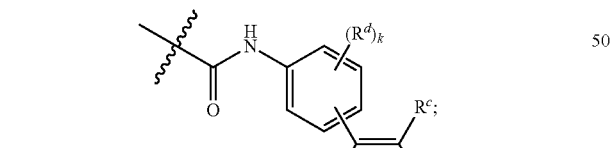

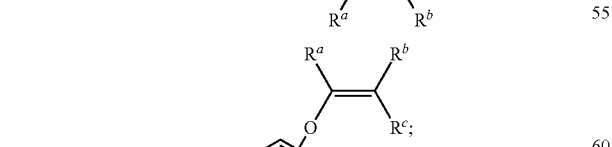

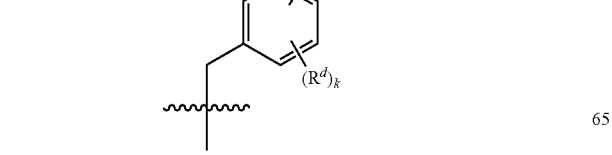

-continued

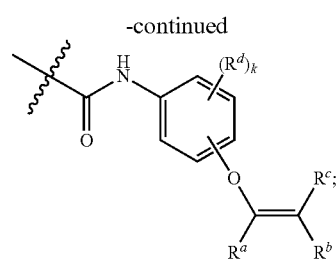

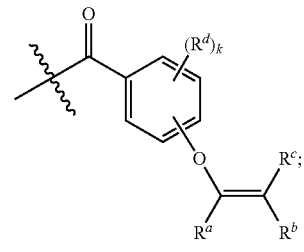

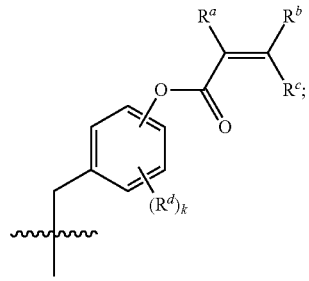

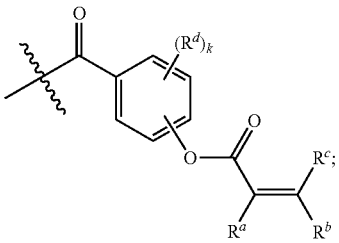

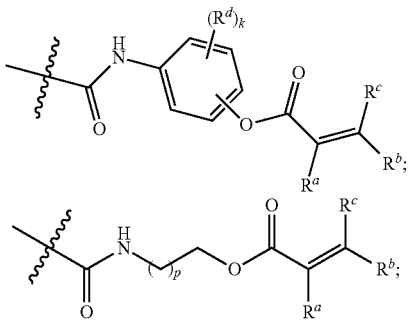

-continued

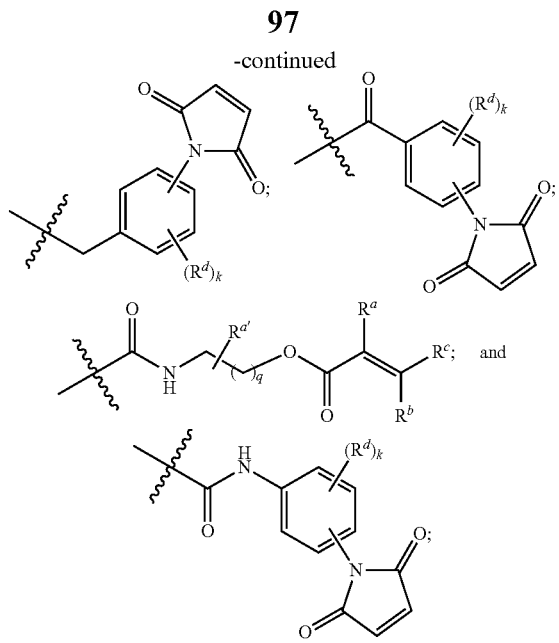

lviii. wherein X and V have the formula:

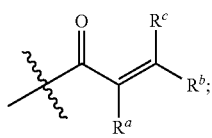

lvix: wherein X and V have the formula:

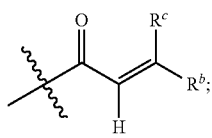

lx. wherein X and V have the formula:

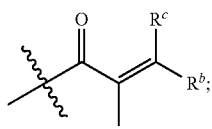

lxi. wherein X and V are independently selected from the group consisting of:

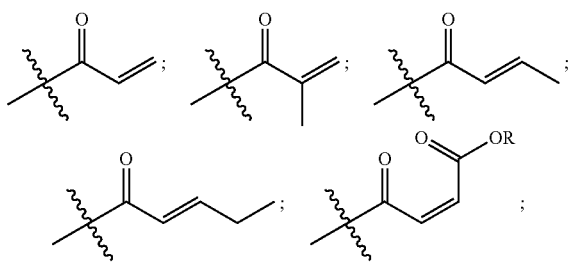

-continued

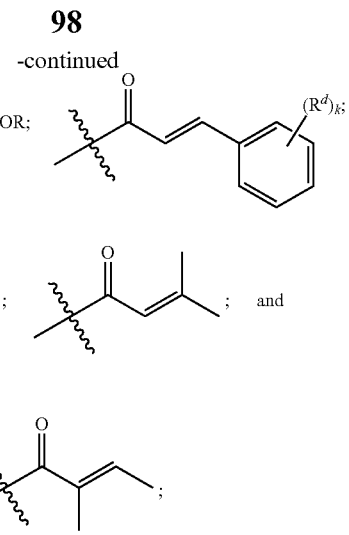

lxii. wherein X and V have the formula:

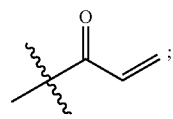 [SMILES: *C(=O)C=C]

lxiii. wherein X and V have the formula:

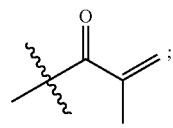 [SMILES: *C(=O)C(=C)C]

lxiv. wherein X and V are different;
lxv. wherein X and V are the same;
lxvi. wherein each T is independently an optionally substituted bivalent $C_{1-8}$ saturated or unsaturated, straight or branched, hydrocarbon chain, wherein one or more methylene units are optionally and independently replaced by —NR—, —N(R)C(O)—, —C(O)N(R)—, —O—, —C(O)—, —OC(O)—, —OC(O)O—, —C(O)O—, —N(R)C(O)O—, or —OC(O)N(R)—;
lxvii. wherein each T is independently an optionally substituted bivalent $C_{1-3}$ saturated or unsaturated, straight or branched, hydrocarbon chain, wherein one or more methylene units are optionally and independently replaced by —NR—, —N(R)C(O)—, —C(O)N(R)—, —O—, —C(O)—, —OC(O)—, —OC(O)O—, —C(O)O—, —N(R)C(O)O—, or —OC(O)N(R)—;
lxviii. wherein each T is independently an optionally substituted bivalent $C_{1-3}$ saturated or unsaturated, straight or branched, hydrocarbon chain, wherein one or more methylene units are optionally and independently replaced by —O—, —C(O)—, —OC(O)—, —OC(O)O—, or —C(O)O—;
lxix. wherein T is selected from the group consisting of —CH$_2$O—*, —CH$_2$OC(O)—*, —CHMeO—*, or —CHMeOC(O)—*, wherein * designates the point of attachment to V;

lxx. wherein T is —CH$_2$O—*;

lxxi. wherein each L is a covalent bond;

lxxii. wherein each L is independently an optionally substituted bivalent C$_{1-8}$ saturated or unsaturated, straight or branched, hydrocarbon chain, wherein one or more methylene units are optionally and independently replaced by —NR—, —N(R)C(O)—, —C(O)N(R)—, —O—, —C(O)—, —OC(O)—, —OC(O)O—, —C(O)O—, —N(R)C(O)O—, or —OC(O)N(R)—;

lxxiii. wherein each L is independently an optionally substituted bivalent C$_{1-3}$ saturated or unsaturated, straight or branched, hydrocarbon chain, wherein one or more methylene units are optionally and independently replaced by —NR—, —N(R)C(O)—, —C(O)N(R)—, —O—, —C(O)—, —OC(O)—, —OC(O)O—, —C(O)O—, —N(R)C(O)O—, or —OC(O)N(R)—;

lxxiv. wherein each L is independently an optionally substituted bivalent C$_{1-3}$ saturated or unsaturated, straight or branched, hydrocarbon chain, wherein one or more methylene units are optionally and independently replaced by —O—, —C(O)—, —OC(O)—, —OC(O)O—, or —C(O)O—;

lxxv. wherein L is selected from the group consisting of —CH$_2$CH$_2$O—*, —CH$_2$CH$_2$OC(O)—*, —CH$_2$CHMeO—*, —CHMeCH$_2$O—*, —CH$_2$CHMeOC(O)—*, or —CHMeCH$_2$OC(O)—*, wherein * designates the point of attachment to X;

lxxvi. wherein L is —CH$_2$CH$_2$O—*;

lxxvii. wherein X is H;

lxxviii. wherein

is a polyhydric alcohol;

lxxix. wherein

has two, three, four, five, or six hydroxyl groups;

lxxx. wherein

is derived from a dihydric alcohol;

lxxxi. comprising aliphatic polycarbonate chains having a formula:

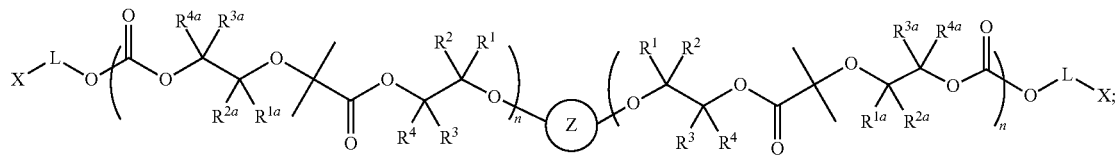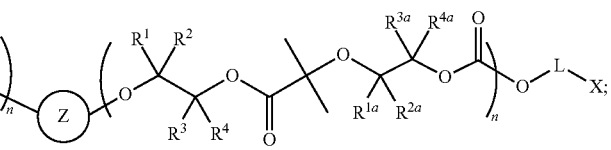

lxxxii. for subset lxxx, wherein the dihydric alcohol comprises a C$_{2-40}$ diol;

lxxxiii. wherein

comprises one or more units of olefinic unsaturation;

lxxxiv. wherein

comprises or is derived from a polyfunctional chain transfer reagent containing two or more sites capable of initiating the copolymerization of epoxides and carbon dioxide and also containing one or more sites of olefinic unsaturation;

lxxxv. wherein

comprises or is derived from a partially acrylated or methacrylated polyhydric alcohol;

lxxxvi. wherein R$^1$, R$^2$, and R$^3$ are each hydrogen and R$^4$ is selected from hydrogen or methyl;

lxxxvii. comprising poly(propylene carbonate) chains having the formula:

101

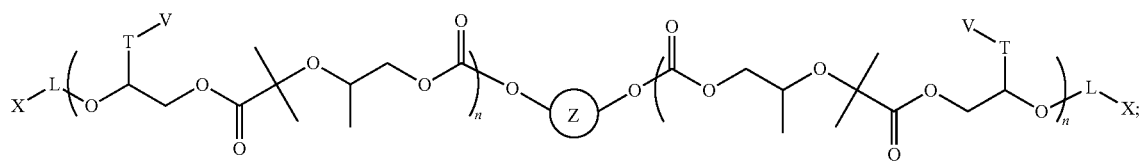

lxxxviii. comprising poly(propylene carbonate) chains having the formula:

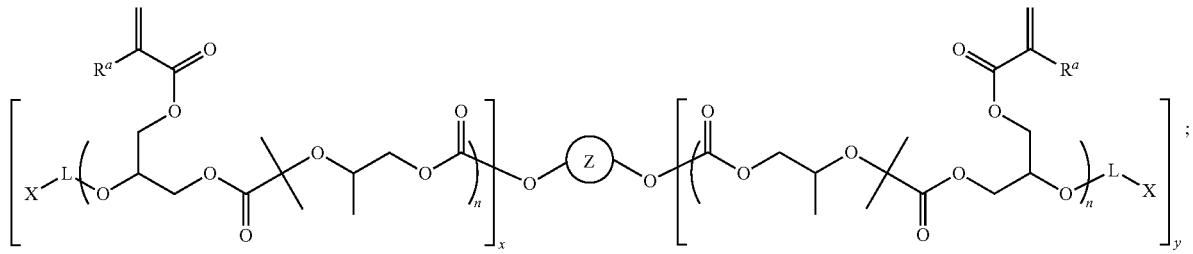

lxxxix: for subset lxxx, wherein the dihydric alcohol is selected from the group consisting of: 1,2-ethanediol, 1,2-propanediol, 1,3-propanediol, 1,2-butanediol, 1,3-butanediol, 1,4-butanediol, 1,5-pentanediol, 2,2-dimethylpropane-1,3-diol, 2-butyl-2-ethylpropane-1,3-diol, 1,5-hexanediol, 1,6-hexanediol, 1,8-octanediol, 1,10-decanediol, 1,12-dodecanediol, 2,2,4,4-tetramethylcyclobutane-1,3-diol, 1,3-cyclopentanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 1,4-cyclohexanediethanol, isosorbide, glycerol monoesters, glycerol monoethers, trimethylolpropane monoesters, trimethylolpropane monoethers, pentaerythritol diesters, pentaerythritol diethers and alkoxylated derivatives of any of these;

xc. for subset lxxx, wherein the dihydric alcohol is selected from the group consisting of: diethylene glycol, triethylene glycol, tetraethylene glycol, higher poly(ethylene glycol), such as those having number average molecular weights of from 220 to about 2000 g/mol, dipropylene glycol, tripropylene glycol, and higher poly(propylene glycols) such as those having number average molecular weights of from 234 to about 2000 g/mol;

xci. for subset lxxx, wherein the dihydric alcohol comprises an alkoxylated derivative of a compound selected from the group consisting of: a diacid, a diol, or a hydroxy acid;

xcii. for subset xci, wherein the alkoxylated derivative comprises an ethoxylated or propoxylated compound;

xciii. for subset xci, wherein the alkoxylated derivative comprises ethoxylated or propoxylated derivative of maleic acid;

xciv. for subset xci, wherein the alkoxylated derivative comprises ethoxylated or propoxylated derivative of fumaric acid;

xcv. for subset lxxx, wherein the dihydric alcohol comprises a polymeric diol.

xcvi. for subset xcv, wherein the polymeric diol is selected from the group consisting of: polyethers, polyesters, hydroxy-terminated polyolefins, and polyether-copolyesters, polyether polycarbonates, polycarbonate-copolyesters, and alkoxylated analogs of any of these;

102 xcvii. for subset xcv, wherein the polymeric diol has an average molecular weight less than about 2000 g/mol;

xcviii. for subset lxxviii, wherein the polyhydric alcohol is selected from the group consisting of: glycerol, 1,2,4-butanetriol, 2-(hydroxymethyl)-1,3-propanediol; hexane triols, trimethylol propane, trimethylol ethane, trimethylolhexane, 1,4-cyclohexanetrimethanol, pentaerythritol mono esters, pentaerythritol mono ethers, and alkoxylated analogs thereof;

xcix. for subset lxxviii, wherein the polyhydric alcohol comprises a $C_{2-40}$ polyhydric alcohol with more than three hydroxyl groups;

c. wherein

is derived from a dicarboxylic acid;

ci. for subset c, wherein the dicarboxylic acid is selected from the group consisting of: phthalic acid, isophthalic acid, terephthalic acid, maleic acid, succinic acid, malonic acid, glutaric acid, adipic acid, pimelic acid, suberic acid, and azelaic acid;

cii. for subset xxxi, wherein the polycarboxylic acid is selected from the group consisting of:

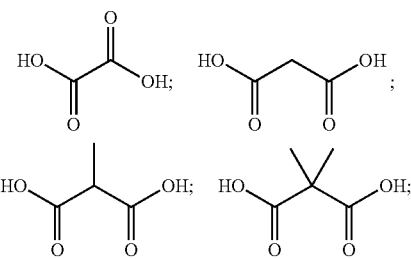

-continued

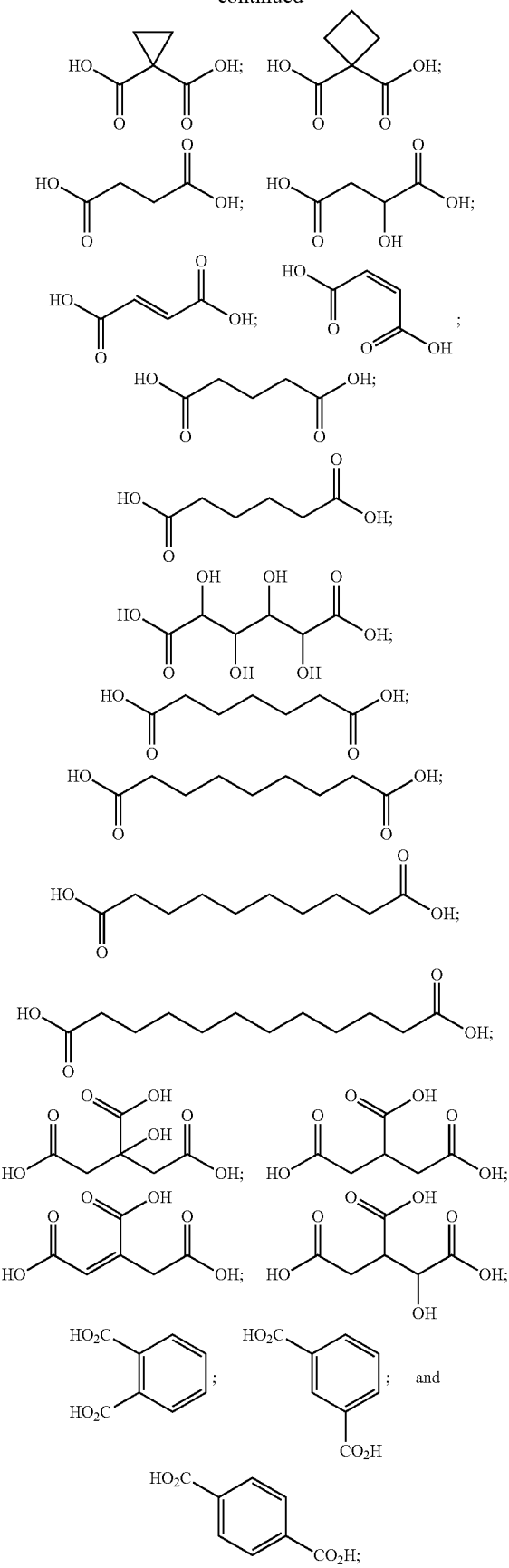

ciii. wherein

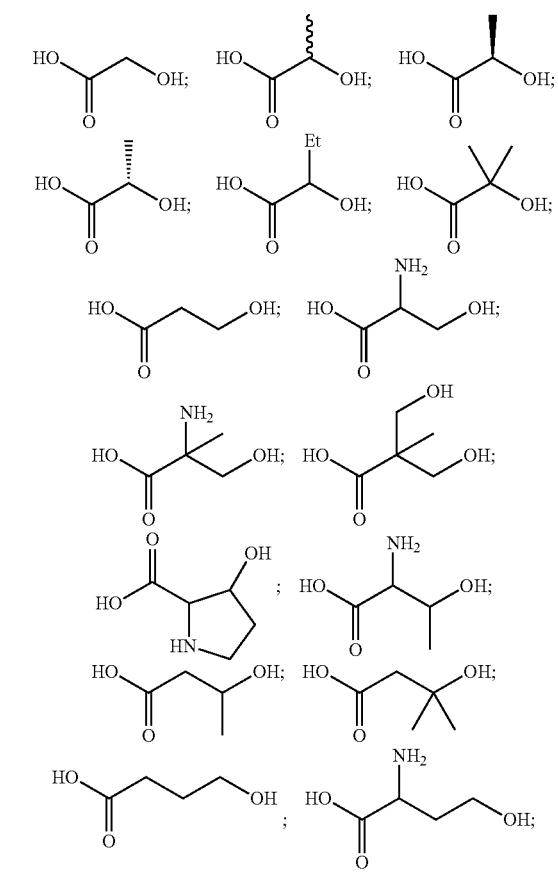

is derived from a hydroxy acid;

civ. for subset ciii, wherein the hydroxy acid is an alpha-hydroxy acid;

cv. for subset ciii, wherein the hydroxy acid is selected from the group consisting of: glycolic acid, DL-lactic acid, D-lactic acid, L-lactic, citric acid, and mandelic acid;

cvi. for subset ciii, wherein the hydroxy acid is a beta-hydroxy acid;

cvii. for subset ciii, wherein the hydroxy acid is selected from the group consisting of: 3-hydroxypropionic acid, DL 3-hydroxybutryic acid, D-3 hydroxybutryic acid, L 3-hydroxybutyric acid, DL-3-hydroxy valeric acid, D-3-hydroxy valeric acid, L-3-hydroxy valeric acid, salicylic acid, and derivatives of salicylic acid;

cviii. for subset ciii, wherein the hydroxy acid is a α-ω hydroxy acid;

cix. for subset ciii, wherein the hydroxy acid is selected from the group consisting of: of optionally substituted $C_{3-20}$ aliphatic α-ω hydroxy acids and oligomeric esters;

cx. for subset ciii, wherein the hydroxy acid is selected from the group consisting of:

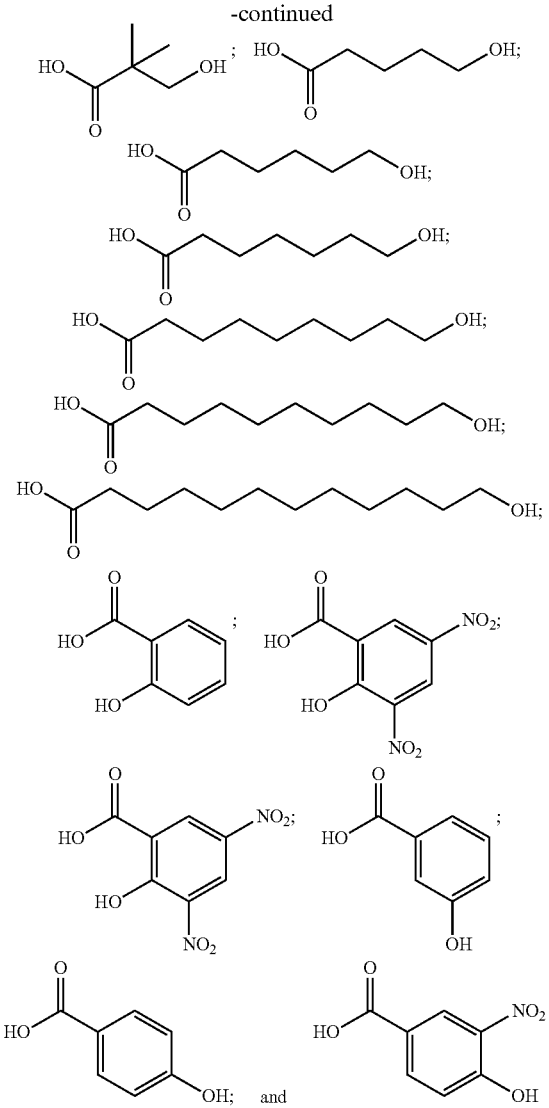
cxi. wherein the moiety
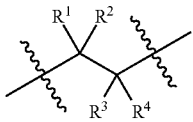
is, at each occurrence in the aliphatic polycarbonate chains, independently selected from the group consisting of:
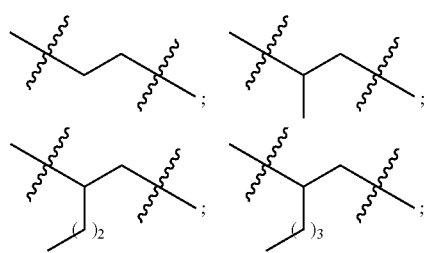
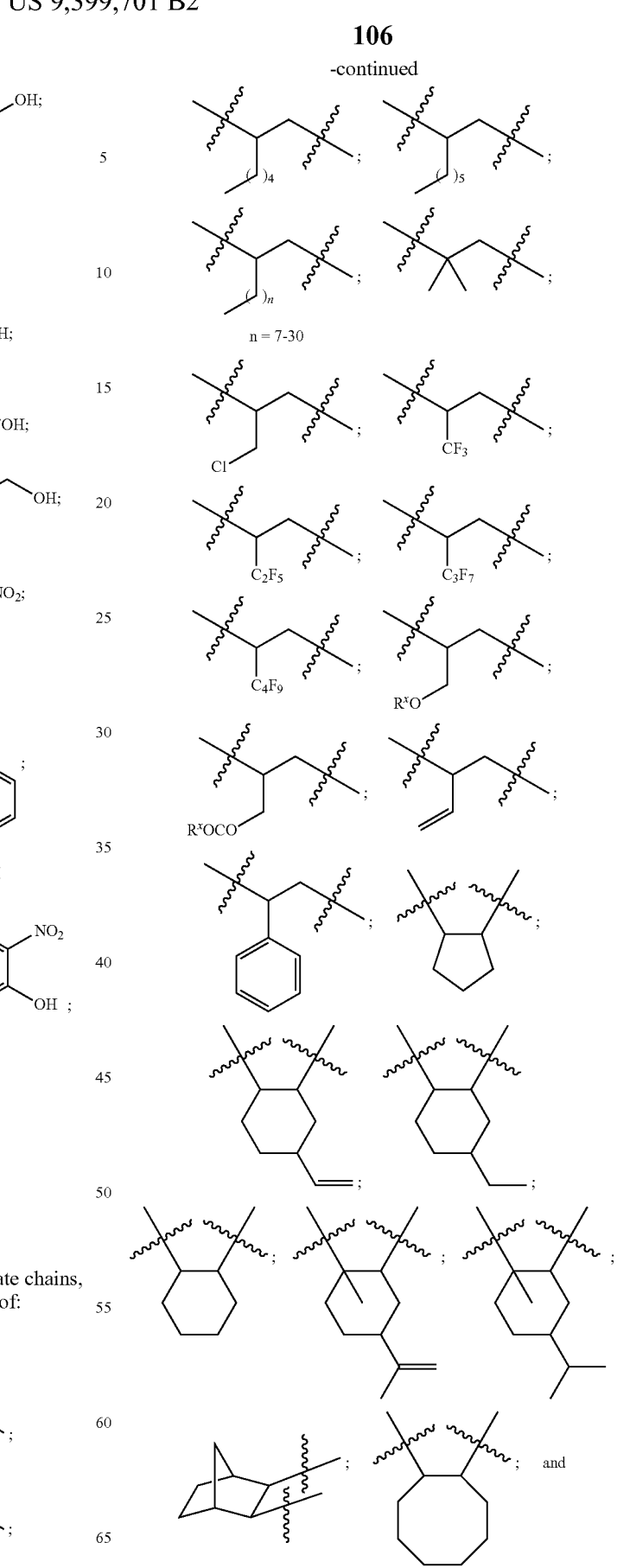

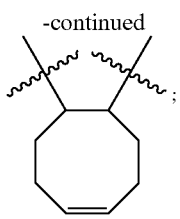

cxii. wherein the moiety

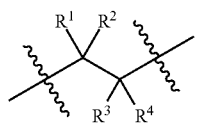

is, at each occurrence in the aliphatic polycarbonate chains, independently selected from the group consisting of:

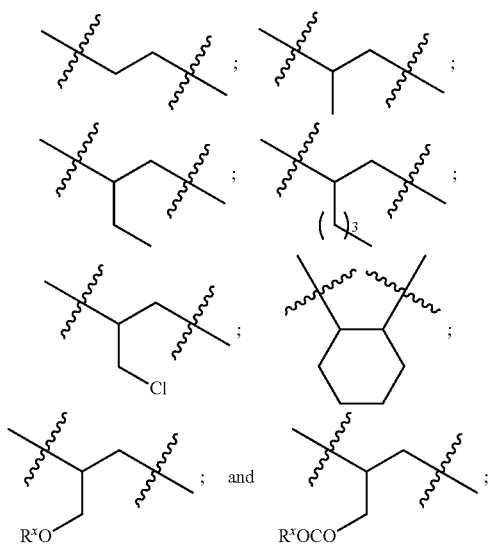

cxiii. wherein a majority of the

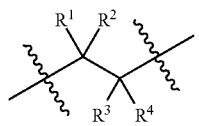

moieties in the aliphatic polycarbonate chains comprise

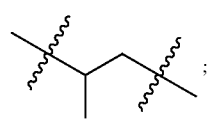 [SMILES: *CC(*)C]

cxiv. wherein a majority of the

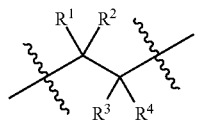

moieties in the aliphatic polycarbonate chains comprise

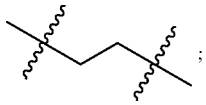 [SMILES: *CC*]

cxv. wherein substantially of the

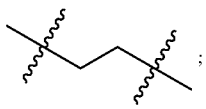 [SMILES: *CC*]

moieties in the aliphatic polycarbonate chains comprise

cxvi. for subsets i-cxv, characterized in that the aliphatic polycarbonate chains have: an Mn between about 500 g/mol and about 20,000 g/mol, greater than 90% carbonate linkages on average, and at least 90% of the end groups are moieties containing aliphatic unsaturation;

cxvii. for subsets i-cxvi, comprising greater than 92% carbonate linkages;

cxviii. for subsets i-cxvi, comprising greater than 95% carbonate linkages;

cxix. for subsets i-cxvi, comprising greater than 97% carbonate linkages;

cxx. for subsets i-cxvi, comprising greater than 99% carbonate linkages;

cxxi. for subsets i-cxvi, having an Mn between about 500 and about 100,000 g/mol;

cxxii. for subsets i-cxvi, having an Mn between about 800 and about 5,000 g/mol;

cxxiii. for subsets i-cxvi, having an Mn between about 1,000 and about 4,000 g/mol;

cxxiv. for subsets i-cxvi, having an Mn of about 1,000 g/mol;

cxxv. for subsets i-cxvi, having an Mn of about 2,000 g/mol;

cxxvi. for subsets i-cxvi, having an Mn of about 3,000 g/mol;

cxxvii. for subsets i-cxvi, having an Mn of about 4,000 g/mol;

cxxviii. for subsets i-cxvi, having an Mn of about 5,000 g/mol;

cxxix. for subsets i-cxvi, having an Mn of about 8,000 g/mol;

cxxx. for subsets i-cxvi, wherein the aliphatic polycarbonate has a polydispersity index of less than 1.5;

cxxxi. for subsets i-cxvi, wherein the aliphatic polycarbonate has a polydispersity index of less than 1.4;

cxxxii. for subsets i-cxvi, wherein the aliphatic polycarbonate has a polydispersity index of less than 1.3;

cxxxiii. for subsets i-cxvi, wherein the aliphatic polycarbonate has a polydispersity index of less than 1.2;

cxxxiv. for subsets i-cxvi, wherein the aliphatic polycarbonate has a polydispersity index of less than 1.1;

cxxxv. wherein more than 85% of adjacent monomer groups in poly(propylene carbonate) chains are oriented head-to-tail;

cxxxvi. wherein more than 90% of adjacent monomer groups in poly(propylene carbonate) chains are oriented head-to-tail;

cxxxvii. wherein $$Z$$

is derived from or comprises an alkoxylated moiety;

cxxxviii. for subset cxxxvii, wherein the alkoxylated moiety comprises one or more units of ethylene glycol or propylene glycol.

In certain embodiments, aliphatic polycarbonate chains comprise a copolymer of carbon dioxide and one epoxide. In certain embodiments, aliphatic polycarbonate chains comprise a copolymer of carbon dioxide and propylene oxide. In certain embodiments, aliphatic polycarbonate chains comprise a copolymer of carbon dioxide and ethylene oxide. In certain embodiments, aliphatic polycarbonate chains comprise a copolymer of carbon dioxide and cyclohexene oxide. In certain embodiments, aliphatic polycarbonate chains comprise a copolymer of carbon dioxide and cyclopentene oxide. In certain embodiments, aliphatic polycarbonate chains comprise a copolymer of carbon dioxide and 3-vinyl cyclohexane oxide.

In other embodiments, aliphatic polycarbonate chains comprise a terpolymer of carbon dioxide and two different epoxides. In certain embodiments, aliphatic polycarbonate chains comprise a copolymer of carbon dioxide and propylene oxide along with one or more additional epoxides selected from the group consisting of ethylene oxide, 1,2-butene oxide, 2,3-butene oxide, cyclohexene oxide, 3-vinyl cyclohexene oxide, epichlorohydrin, glicydyl esters, glycidyl ethers, styrene oxides, and epoxides of higher alpha olefins. In certain embodiments, such terpolymers contain a majority of repeat units derived from propylene oxide with lesser amounts of repeat units derived from one or more additional epoxides. In certain embodiments, terpolymers contain about 50% to about 99.5% propylene oxide-derived repeat units. In certain embodiments, terpolymers contain greater than 60% propylene oxide-derived repeat units. In certain embodiments, terpolymers contain greater than 75% propylene oxide-derived repeat units. In certain embodiments, terpolymers contain greater than 80% propylene oxide-derived repeat units. In certain embodiments, terpolymers contain greater than 85% propylene oxide-derived repeat units. In certain embodiments, terpolymers contain greater than 90% propylene oxide-derived repeat units. In certain embodiments, terpolymers contain greater than 95% propylene oxide-derived repeat units.

In certain embodiments, aliphatic polycarbonate chains comprise a terpolymer of carbon dioxide and ethylene oxide along with one or more additional epoxides selected from the group consisting of propylene oxide, 1,2-butene oxide, 2,3-butene oxide, cyclohexene oxide, 3-vinyl cyclohexene oxide, epichlorohydrin, glicydyl esters, glycidyl ethers, styrene oxides, and epoxides of higher alpha olefins. In certain embodiments, such terpolymers contain a majority of repeat units derived from ethylene oxide with lesser amounts of repeat units derived from one or more additional epoxides. In certain embodiments, terpolymers contain about 50% to about 99.5% ethylene oxide-derived repeat units. In certain embodiments, terpolymers contain greater than about 60% ethylene oxide-derived repeat units. In certain embodiments, terpolymers contain greater than 75% ethylene oxide-derived repeat units. In certain embodiments, terpolymers contain greater than 80% ethylene oxide-derived repeat units. In certain embodiments, terpolymers contain greater than 85% ethylene oxide-derived repeat units. In certain embodiments, terpolymers contain greater than 90% ethylene oxide-derived repeat units. In certain embodiments, terpolymers contain greater than 95% propylene oxide-derived repeat units.

In certain embodiments, in the polymer compositions described hereinabove, aliphatic polycarbonate chains have a number average molecular weight ($M_n$) in the range of 500 g/mol to about 250,000 g/mol.

In certain embodiments, aliphatic polycarbonate chains have an $M_n$ less than about 100,000 g/mol. In certain embodiments, aliphatic polycarbonate chains have an $M_n$ less than about 70,000 g/mol. In certain embodiments, aliphatic polycarbonate chains have an $M_n$ less than about 50,000 g/mol. In certain embodiments, aliphatic polycarbonate chains have an $M_n$ between about 500 g/mol and about 40,000 g/mol. In certain embodiments, aliphatic polycarbonate chains have an $M_n$ less than about 25,000 g/mol. In certain embodiments, aliphatic polycarbonate chains have an $M_n$ between about 500 g/mol and about 20,000 g/mol. In certain embodiments, aliphatic polycarbonate chains have an $M_n$ between about 1,000 g/mol and about 10,000 g/mol. In certain embodiments, aliphatic polycarbonate chains have an $M_n$ between about 1,000 g/mol and about 5,000 g/mol. In certain embodiments, aliphatic polycarbonate chains have an $M_n$ between about 500 g/mol and about 1,000 g/mol. In certain embodiments, aliphatic polycarbonate chains have an $M_n$ between about 1,000 g/mol and about 3,000 g/mol. In certain embodiments, aliphatic polycarbonate chains have an $M_n$ of about 5,000 g/mol. In certain embodiments, aliphatic polycarbonate chains have an $M_n$ of about 4,000 g/mol. In certain embodiments, aliphatic polycarbonate chains have an $M_n$ of about 3,000 g/mol. In certain embodiments, aliphatic polycarbonate chains have an $M_n$ of about 2,500 g/mol. In certain embodiments, aliphatic polycarbonate chains have an $M_n$ of about 2,000 g/mol. In certain embodiments, aliphatic polycarbonate chains have an $M_n$ of about 1,500 g/mol. In certain embodiments, aliphatic polycarbonate chains have an $M_n$ of about 1,000 g/mol. In certain embodiments, aliphatic polycarbonate chains have an $M_n$ of about 750 g/mol. In certain embodiments, aliphatic polycarbonate chains have an $M_n$ of about 500 g/mol.

In certain embodiments, in the polymer compositions described hereinabove, aliphatic polycarbonate chains are characterized in that they have a narrow molecular weight distribution. This can be indicated by the polydispersity indices (PDI) of the aliphatic polycarbonate polymers. In certain embodiments, aliphatic polycarbonate compositions have a PDI less than 2. In certain embodiments, aliphatic polycarbonate compositions have a PDI less than 1.8. In certain embodiments, aliphatic polycarbonate compositions have a PDI less than 1.5. In certain embodiments, aliphatic polycarbonate compositions have a PDI less than 1.4. In certain embodiments, aliphatic polycarbonate compositions have a PDI between about 1.0 and 1.2. In certain embodiments, aliphatic polycarbonate compositions have a PDI between about 1.0 and 1.1.

In certain embodiments aliphatic polycarbonate compositions of the present invention comprise substantially alternating polymers containing a high percentage of carbonate linkages and a low content of ether linkages. In certain embodiments, aliphatic polycarbonate compositions of the present invention are characterized in that, on average in the composition, the percentage of carbonate linkages is 85% or greater. In certain embodiments, aliphatic polycarbonate compositions of the present invention are characterized in that, on average in the composition, the percentage of carbonate linkages is 90% or greater. In certain embodiments, aliphatic polycarbonate compositions of the present invention are characterized in that, on average in the composition, the percentage of carbonate linkages is 91% or greater. In certain embodiments, aliphatic polycarbonate compositions of the present invention are characterized in that, on average in the composition, the percentage of carbonate linkages is 92% or greater. In certain embodiments, aliphatic polycarbonate compositions of the present invention are characterized in that, on average in the composition, the percentage of carbonate linkages is 93% or greater. In certain embodiments, aliphatic polycarbonate compositions of the present invention are characterized in that, on average in the composition, the percentage of carbonate linkages is 94% or greater. In certain embodiments, aliphatic polycarbonate compositions of the present invention are characterized in that, on average in the composition, the percentage of carbonate linkages is 95% or greater. In certain embodiments, aliphatic polycarbonate compositions of the present invention are characterized in that, on average in the composition, the percentage of carbonate linkages is 96% or greater. In certain embodiments, aliphatic polycarbonate compositions of the present invention are characterized in that, on average in the composition, the percentage of carbonate linkages is 97% or greater. In certain embodiments, aliphatic polycarbonate compositions of the present invention are characterized in that, on average in the composition, the percentage of carbonate linkages is 98% or greater. In certain embodiments, aliphatic polycarbonate compositions of the present invention are characterized in that, on average in the composition, the percentage of carbonate linkages is 99% or greater. In certain embodiments, aliphatic polycarbonate compositions of the present invention are characterized in that, on average in the composition, the percentage of carbonate linkages is 99.5% or greater. In certain embodiments, the percentages above exclude ether linkages present in polymerization initiators or chain transfer agents and refer only to the linkages formed during epoxide $CO_2$ copolymerization. In certain embodiments, aliphatic polycarbonate compositions of the present invention are characterized in that they contain essentially no ether linkages either within the polymer chains derived from epoxide $CO_2$ copolymerization or within any polymerization initiators, chain transfer agents or end groups that may be present in the polymer. In certain embodiments, aliphatic polycarbonate compositions of the present invention are characterized in that they contain, on average, less than one ether linkage per polymer chain within the composition.

In certain embodiments where an aliphatic polycarbonate is derived from mono-substituted epoxides (e.g. such as propylene oxide, 1,2-butylene oxide, epichlorohydrin, or a glycidol derivative), the aliphatic polycarbonate is characterized in that it is regioregular. Regioregularity may be expressed as the percentage of adjacent monomer units that are oriented in a head-to-tail arrangement within the polymer chain. In certain embodiments, aliphatic polycarbonate chains in the inventive polymer compositions have a head-to-tail content higher than about 80%. In certain embodiments, the head-to-tail content is higher than about 85%. In certain embodiments, the head-to-tail content is higher than about 90%. In certain embodiments, the head-to-tail content is greater than about 91%, greater than about 92%, greater than about 93%, greater than about 94%, or greater than about 95%.

In certain embodiments, the structures of aliphatic polycarbonate chains derived from the polymerization of carbon dioxide with one or more epoxides as described above are represented by the following non-limiting examples:

Structures P2a through P2s are representative of aliphatic polycarbonates derived from a diol chain transfer agent and one or more aliphatic epoxides such as propylene oxide, ethylene oxide, butylene oxide, cyclohexene oxide, 3-vinyl cyclohexene oxide, 3-ethyl cyclohexene oxide, and esters or ethers of glycidol. It is to be understood that many variations on these compounds are possible including the use of additional or different epoxides, use of different chain transfer agents (such as higher polyhydric alcohols, hydroxy acids, and polyacids), and the introduction of different Y groups. Such variations will be apparent to one skilled in the art based on the disclosure and teachings of the present application and are specifically encompassed within the scope of the present invention.

Crosslinking

In another aspect, the present invention encompasses polymer compositions resulting from olefin polymerizations incorporating the aliphatic polycarbonate compositions described hereinabove. In certain embodiments such materials are derived by chain-extending or cross-linking the aliphatic polycarbonate chains by exposing the olefin groups in the —Y, —V, or —X moieties to conditions that promote olefin polymerization. In certain embodiments, the aliphatic polycarbonates are combined with additional materials that participate in the olefin polymerization. Such materials can include olefinic monomers or prepolymers. The conditions that promote olefin polymerization can include the presence of polymerization initiators or catalysts. In certain embodiments, such olefin crosslinking polymerizations are radical polymerizations. In some embodiments, the source of a radical initiator can be peroxides, other chemicals, heat, or high energy radiation.

In certain embodiments, the olefin monomers are selected from the group consisting of styrene or derivatives thereof, acrylic acid or derivatives thereof, vinyl ethers, vinyl esters, polymeric materials containing any one or more of these, and combinations of two or more of the foregoing. In some embodiments, olefin monomers suitable for crosslinking are mixtures of styrene or derivatives thereof. In some embodiments, an olefin monomer is styrene. In some embodiments, olefin monomers suitable for crosslinking are selected from the group consisting of styrene, divinyl benzene, vinyl toluene, methyl methacrylate, and combinations thereof. In some embodiments, olefin monomers suitable for crosslinking are a mixture of styrene and divinyl benzene. In some embodiments, styrene and divinyl benzene are used in a ratio of less than 10:1. In some embodiments, styrene and divinyl benzene are used in a ratio of 10:1 to 6:1. In some embodiments, styrene and divinyl benzene are used in a ratio of 10:1 to 5:1. In some embodiments, styrene and divinyl benzene are used in a ratio of 10:1 to 4:1. In some embodiments, styrene and divinyl benzene are used in a ratio of 10:1 to 3:1. In some embodiments, styrene and divinyl benzene are used in a ratio of 10:1 to 2:1. In some embodiments, styrene and divinyl benzene are used in a ratio of 2:1 to 1:1. In some embodiments, styrene and divinyl benzene are used in a ratio of 6:1 to 3:1. In some embodiments, styrene and divinyl benzene are used in a ratio about 10:1. In some embodiments, styrene and divinyl benzene are used in a ratio about 9:1. In some embodiments, styrene and divinyl benzene are used in a ratio about 8:1. In some embodiments, styrene and divinyl benzene are used in a ratio about 7:1. In some embodiments, styrene and divinyl benzene are used in a ratio about 6:1. In some embodiments, styrene and divinyl benzene are used in a ratio about 5:1. In some embodiments, styrene and divinyl benzene are used in a ratio about 4:1. In some embodiments, styrene and divinyl benzene are used in a ratio about 3:1. In some embodiments, styrene and divinyl benzene are used in a ratio about 2:1. In some embodiments, styrene and divinyl benzene are used in a ratio about 1:1.

Methods of performing such radical polymerizations are well known in the art. In some embodiments, an olefin monomer is a acrylic monomer. Acrylic monomers include acrylic or methacrylic acid, esters of acrylic or (meth)acrylic acid and derivatives and mixtures thereof, such as but not limited to acrylamides and acrylonitriles. Non-limiting examples of suitable acrylic monomers are acrylate esters such as alkyl acrylates that have 1-18 carbon atoms in the alkyl group such as methyl acrylate, ethyl acrylate, n-propyl acrylate, n-butyl acrylate, isopropyl acrylate, isobutyl acrylate, t-butyl acrylate, n-amyl acrylate, n-hexyl acrylate, isoamyl acrylate, 2-ethylhexyl acrylate, nonyl acrylate, lauryl acrylate, stearyl acrylate, and the like. Cycloaliphatic acrylates also can be used such as trimethylcyclohexyl acrylate, t-butylcyclohexyl acrylate, cyclohexyl acrylate, isobornyl acrylate, and the like. Aryl acrylates can also be used such as benzyl acrylate, phenyl acrylate. Non-limiting examples of suitable (meth)acrylic monomers are (meth)acrylate esters such as alkyl methacrylates that have 1-18 carbon atoms in the alkyl group such as methyl (meth)acrylate, ethyl (meth)acrylate, n-propyl(meth) acrylate, n-butyl (meth)acrylate, isopropyl(meth)acrylate, isobutyl (meth)acrylate, t-butyl (meth)acrylate, n-amyl (meth)acrylate, n-hexyl(meth)acrylate, isoamyl(meth)acrylate, 2-ethylhexyl(meth)acrylate, nonyl(meth)acrylate, lauryl (meth)acrylate, stearyl(meth)acrylate, and the like. Cycloaliphatic (meth)acrylates also can be used such as trimethylcyclohexyl(meth)acrylate, t-butylcyclohexyl(meth) acrylate, cyclohexyl(meth)acrylate, isobornyl(meth)acrylate, and the like. Aryl(meth)acrylates can also be used such as benzyl (meth)acrylate, phenyl(meth)acrylate, and the like.

Other suitable acrylic monomers include acrylic acid derivatives such as: acrylic acid and its salts, acrylonitrile, acrylamide, N-alkyl acrylamide, N,N-dialkyl acrylamide, N-phenyl-acrylamide and acrolein. Other suitable (meth) acrylic monomers include (meth)acrylic acid derivatives such as: (meth)acrylic acid and its salts, (meth)acrylonitrile, (meth)acrylamide, N-alkyl (meth)acrylamide, N,N-dialkyl (meth)acrylamide, N-phenyl-(meth)acrylamide and (meth) acrolein.

Other polymerizable nonacrylic monomers that can be used for forming the polymer include vinyl aromatics such as styrene, alpha-methyl styrene, t-butyl styrene, vinyl toluene, divinyl benzene, vinyl acetate, and vinyltrimethoxy silane, or a combination thereof. In some embodiments, a monomer is styrene. In some embodiments, a monomer is vinyl toluene.

In some embodiments, a monomer is 2-phenoxy ethyl acrylate (PHEA), 1,6-hexanediol diacrylate (HDDA), trimethylolpropane triacrylate (TMPTA), dipentaerythritol hexaacrylate (DPHA), or a combination thereof. In some embodiments, a monomer is 2-phenoxy ethyl methacrylate (PHEM), 1,6-hexanediol dimethacrylate (HDDMA), trimethylolpropane trimethacrylate (TMPTMA), dipentaerythritol hexamethacrylate (DPHMA), or a combination thereof.

In some embodiments, a crosslinking agent reacted with an inventive polymer is a polymer or oligomer rather than a monomer. In some embodiments, a crosslinking agent is pentaerythritol triacrylate (PETA), pentaerythritol tetraacrylate (PETA-4), N,N'-methylenebisacrylamide (MBAAm), ethylene glycol dimethacrylate (EGDMA), tetra(ethyleneglycol) dimethacrylate (TEGDMA), oligo(ethyleneglycol)diacrylate, poly(ethyleneglycoldi(meth)acrylate, trimethylolpropane trimethacrylate (TMPTMA), or methacrylic anhydride.

In certain embodiments, methods for free radical crosslinking comprise a peroxide or azo initiator. In some embodiments, an initiator is selected from the group consisting of diacyl peroxides, dialkyl peroxy-dicarbonates, tert-alkyl peroxyesters, di-(tert-alkyl) peroxyketals, and di-tert-alkyl peroxides.

In certain embodiments, an initiator is selected from the group consisting of t-butyl peroxide, methyl ethyl ketone peroxide, benzoyl peroxide, α-cumyl peroxyneodecanoate, α-cumyl peroxyneopheptanoate, t-amyl peroxyneodecanoate, t-butyl peroxyneodecanoate, di-(2-ethylhexyl) peroxy-dicarbonate, t-amyl peroxypivalate, t-butyl peroxypivalate, 2,5-dimethyl-2,5 bis(2-ethyl-hexano ylperoxy) hexane, dibenzoyl peroxide, t-amyl peroxy-2-ethylhexanoate, t-amyl peroxy-2-ethylhexanoate, 1,1-di-(t-amylperoxy)cyclohexane, 1,1-di-(t-butylperoxy) 3,3,5-trimethyl cyclohexane, 1,1-di-(t-butylperoxy)cyclohexane, OO-t-Amyl-0(2-ethylhexyl) monoperoxycarbonate, OO-t-butyl 0-isopropyl monoperoxycarbonate, 00-t-butyl 0-(2-ethylhexyl)monoperoxycarbonate, t-amyl peroxybenzoate, t-butyl peroxybenzoate, t-butyl peroxyacetate, ethyl 3,3-di-(t-amylperoxy) butyrate, ethyl 3,3-di-(t-butylperoxy) butyrate, dicumyl peroxide, t-butyl peroctoate, cumene hydroperoxide, 2,2'-azobis (isobutyronitrile).

In some embodiments, crosslinking is photoinitiated and comprises a photoinitiator. In certain embodiments, a photoinitiator is 1-hydroxy-cyclohexyl-phenyl-ketone, 2,2-dimethyl-2-hydroxyacetophenone, 2,2-dimethyl-2-hydroxyacetophenone, 2'4-hydroxybenzophenone, benzophenone, 2-benzyl-2-(dimethylamino)-1-(4-(4-morphorlinyl)phenyl)-1-butanone, 2-methyl-1-(4-methylthio)phenyl-2-(4-morphorlinyl)-1-propanone, diphenyl-(2,4,6-trimethylbenzoyl) phospine oxide, phenyl bis(2,4,6-trimethylbenzoyl) phosphine oxide, benzyl-dimethylketal, isopropylthioxanthone, 4-(dimethylamino)benzoate, and combinations thereof. In some embodiments, a photoinitiator is an alkyl or aromatic ketone such as benzophenone, benzoin, acetophenone, 4,4-bis(dimethylamino)benzophenone, benzoin methyl ether, [2-hydroxy-2-methyl-1-phenylpropan-1-one], [1-(4-dodecylphenyl)-2-hydroxy-2-methylpropan-1-one], [1-(4-isopropylphenyl)-2-hydroxy-2-methylpropan-1-one] and a mixture of 2-(1-methylethyl)-9H-thioxanthen-9-one, 2-hydroxy-2-methyl-1-phenylpropan-1-one and camphorquinone. This list is not exhaustive; any known photoinitiator that can be used in the composition of an aliphatic polycarbonate may be used.

In certain embodiments, the present invention provides methods for producing a crosslinked polymer composition, wherein an aliphatic polycarbonate composition having sites of olefinic unsaturation as described above is combined under suitable conditions with a suitable initiator and optionally a crosslinking agent to produce a crosslinked polymer composition. In certain embodiments, an initiator comprises a photoinitiator and the method further comprises the step of applying radiation. In some embodiments, the radiation of gamma and/or ultraviolet radiation. In some embodiments, suitable conditions comprise an organic solvent that produces a polymer solution, suspension, or emulsion. In some embodiments, the solvent that is a chemical reactant in the crosslinking reaction. In some embodiments, the solvent that is not a chemical reactant in the crosslinking.

In certain embodiments, crosslinking as described herein provides materials with desirable properties. In some embodiments, the heat distortion temperature of a crosslinked polymer composition is at least 60° C. In some embodiments, the heat distortion temperature of a crosslinked polymer composition is at least 70° C. In some embodiments, the heat distortion temperature of a crosslinked polymer composition is at least 80° C. In some embodiments, the heat distortion temperature of a crosslinked polymer composition is at least 90° C. In some embodiments, the heat distortion temperature of a crosslinked polymer composition is at least 100° C. In some embodiments, the heat distortion temperature of a crosslinked polymer composition is between about 70° C. and about 100° C. In some embodiments, the heat distortion temperature of a crosslinked polymer composition is between about 70° C. and about 105° C.

In certain embodiments, particular crosslinking methods achieve a higher heat distortion temperature (HDT). In some embodiments, a one pot procedure as described in Example 11 provides a higher HDT. While not wishing to be bound by any particular theory, it is possible that the incorporation of methacrylic acid into the resin network causes a higher HDT due to hydrogen bonding; it is also possible that residual methacrylic anhydride incorporated into the crosslinking network provides better crosslinking density; it is further possible that residual molybdenum catalyst facilitates crosslinking radical polymerization.

In certain embodiments, higher HDT is achieved when using divinyl benzene in crosslinking formulations, as described below in the Examples.

In certain embodiments, the olefin-containing aliphatic polycarbonates described hereinabove, are combined with one or more additional unsaturated polymers or resins. In certain embodiments, the invention comprises blends of the olefin-containing aliphatic polycarbonates described hereinabove with commercial vinyl ester resins. In certain embodiments, the invention comprises blends of the olefin-containing aliphatic polycarbonates described hereinabove with commercial unsaturated polyesters. Such blends may also comprise any of the initiators and additives described herein.

It will be understood that the present invention includes compositions of crosslinked polymer resulting from such methods.

Composites

In another aspect, the present invention encompasses composites incorporating the polymer compositions described hereinabove. In some embodiments, such composites are derived from radical polymerizations of compositions containing aliphatic polycarbonate chains having sites of olefinic unsaturation. It will be appreciated that resin formulations of provided polymer compositions are useful in various composite or coating applications. In certain embodiments, such composites further comprise fibers or solids. In certain embodiments, such fibers or solids are coated with or embedded in the polymer compositions described hereinabove. In certain embodiments the composites comprise glass fibers, carbon fibers, ceramic fibers, mineral fibers and the like. In certain embodiments, the composites comprise inorganic materials such as clays, ceramics, alumina, silicaceous minerals, and the like. In certain embodiments, the composites comprise organic solids such as wood fibers, paper, cellulose, plant-derived fibers, and the like. In certain embodiments, the composites comprise nano particles or related particulate materials. In certain embodiments, the composites comprise carbon nanotubes or other carbon fibers. In certain embodiments, the composites comprise other polymers in the form of sheets, fibers, scrims and the like.

It is well known in the art that certain components may be added to composites to improve various properties. In certain embodiments, flame and smoke retardants are added to composite formulations to improve heat and fire resistance properties and to reduce the amount of smoke generated upon combustion. Common flame and smoke retardant additives include aluminum trihydrate, dimethyl methyl phosphonate, chlorendic anhydride, tetrabromophthalic anhydride, dibromoneopentyl glycol, and tetrabromobisphenol. Additional examples include Albermarle's ANTIBLAZE™ and SAY-TEX™ additives.

In certain embodiments, low profile or low shrink additives are used with provided composites to promote smooth surfaces and to reduce shrinkage of the finished composite material. A number of additives can be incorporated into the composite formulation for this purpose including Reichhold's POLYLITE 31702-40 and POLYLITE 31701-35 additives.

In certain embodiments, rheology modifiers and thixotropic agents are used to control the viscosity of a resin. Common additives in this category include silicas and organoclays. Additional examples include BYK's BYK-R 605™ and BYK-R 606™ rheology additives.

In some embodiments, surface conditioning and barrier forming agents are included in the composite formulation to minimize air inhibition and decrease surface tack. Common surface conditioning and barrier forming additives include paraffins, polyethers, and polysiloxanes. In some embodiments, additives of this type include Reichhold's Paraffin Wax Solution and BYK's BYK-W 909™ additive.

In some embodiments, fillers and reinforcement materials are added to increase composite strength. In some embodiments the additive is calcium carbonate, calcium sulfate, aluminum trihydrate, silica, alumina, silica-alumina, silica-magnesia, calcium silicate, glass beads, glass flakes, glass fibers, carbon fibers, aramid fibers, or asbestos. Particular examples of these materials include 3M's Glass Bubbles, PPG's ChopVantage series of fibers, and AGY's S-2 Glass products line.

In some embodiments plasticizers act as dispersion agents within the composite formulation to increase plasticity and fluidity within the resin. Suitable additives of this type are BASF's Palatinol 11P-E and Dow Chemical's Diethylene Glycol Resin.

It will be appreciated that a number of other additives may be added to the resin system including UV stabilizers and absorbents which function to guard the composite against long-term degradation due to light (eg. Chemtura's Lowilite additive), accelerators and curing agents that promote resin curing, and pigments and dyes (eg. Interplastic Co.'s CoREZYN™ colorants) that give rise to composite coloring.

Each of the above-described additives and combinations thereof may be incorporated into the polymer composite in an amount up to about 80% by weight, such as in an amount up to about 50% by weight. In some embodiments, additives are incorporated into the polymer composite in an amount less than about 20% by weight, such as less than about 10% by weight. In some embodiments, additives are incorporated into the composite in an amount less than about 5% by weight, such as less than about 3% by weight. In some embodiments, additives are incorporated into a polymer in an amount less than about 2% by weight, such as from about 0.25% to about 1% by weight.

Articles of Manufacture

The present invention further provides articles of manufacture made from the polycarbonate compositions and composites described above. It is well known that polymer composites may have desirable properties over their component parts, such as increased stiffness or strength, relative to their density. In some embodiments, composite materials offer the advantages of corrosion resistance, electrical insulation, better fatigue properties, biological inertness, and decreased assembly cost. This makes such materials particularly useful in electrical, appliance, hardware, dental, orthopedic, medical device, and other biomedical applications. Composites of KEVLAR® (p-phenylene terephtalamide, PPTA, para-polyaramide) and polycarbonate are non-resorbable and are useful for long-term implants such as joint replacements, bone cement, spine rods, and dental posts; short-term uses include bone plates, rods, screws, ligaments, and catheters (Ramakrishna et al., Composites Science and Technology, 61, pp. 1189-1224, 2001). Additional common applications for such composites include windmill blades, fiberglass boats, automotive parts, sporting goods and the like.

Glass-reinforced polycarbonate is known to be useful in designs where metals (e.g., die-cast aluminum and zinc) are commonly used. For example, the addition of varying amounts of glass fibers to polycarbonate increases tensile strength, stiffness, compressive strength, and lowers the thermal expansion coefficient. Such glass-reinforced polycarbonate is generally more impact resistant than most other plastics and die cast aluminum. The present invention encompasses articles of manufacture containing glass-reinforced composites of provided polycarbonate compositions.

Methods of Making

In another aspect, the present invention encompasses methods of producing aliphatic polycarbonate chains having end groups that contain sites of olefinic unsaturation.

In certain embodiments, the present invention encompasses a method of treating an aliphatic polycarbonate polymer of formula M1:

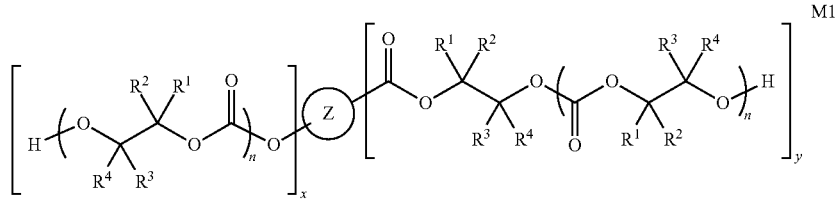

with an alkylating agent, an acylating agent, or an isocyanate under suitable conditions to provide a compound of formula P1:

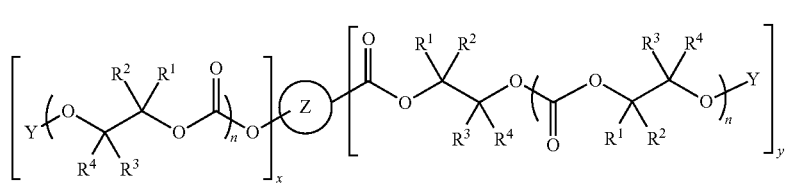

wherein each of $Z$, $R^1$, $R^2$, $R^3$, $R^4$, n, x, y, and Y is as defined above and described in classes and subclasses herein.

In certain embodiments, methods of the present invention include the step of treating a polymer of formula M1 with an alkylating agent, an acylating agent, or an isocyanate containing olefinic unsaturation. In certain embodiments, the alkylating agent, acylating agent, or isocyanate comprises one or more moieties selected from the group consisting of: an alpha beta unsaturated carbonyl, a styrene, a vinyl ether, or a vinyl ester.

In certain embodiments, an acylating agent comprises an acid anhydride. In certain embodiments, an acylating agent comprises an acid chloride. In certain embodiments, an isocyanate comprises a 2-isocyanoethylester derivative. In certain embodiments, a polymer of formula M1 is treated with a 2-isocyanoethylester derivative under conditions disclosed in US 2006/02026401 the entirety of which is incorporated herein by reference.

In certain embodiments, methods of treating a polymer of formula M1 with an alkylating agent, an acylating agent, or an isocyanate include the addition of a solvent. In certain embodiments, added solvents include non-protic organic solvents. In certain embodiments, added solvents are selected from the group consisting of ethers, esters, amides, nitriles, aliphatic hydrocarbons, halogenated hydrocarbons, aromatic hydrocarbons, and combinations of any two or more of these.

In certain embodiments, methods of treating a polymer of formula M1 with an alkylating agent, an acylating agent, or an isocyanate include the addition of a catalyst or promoter. In certain embodiments, added catalysts or promoters include bases. In certain embodiments, bases are selected from the group consisting of aromatic amines, aliphatic amines, nitrogen-containing heterocycles, and combinations of two or more of these. In certain embodiments, added catalysts or promoters include metal salts. In certain embodiments, added metal salts include metal sulfonates. In certain embodiments, added metal salts include metal triflates. In certain embodiments, added metal salts include tin compounds. In certain embodiments, added metal salts include compounds or complexes of transition metals. In certain embodiments, added metal salts include molybdenum complexes. In certain embodiments, added catalysts or promoters include acids. In certain embodiments, added acids are selected from the group consisting of alkyl or aryl sulfonic acids. In certain embodiments, added acids include triflic acid.

In certain embodiments, methods of the present invention include the step of copolymerization of one or more epoxides with carbon dioxide in the presence of an initiator having a formula $Y'—(CO)_{q'}—OH$ as defined hereinabove.

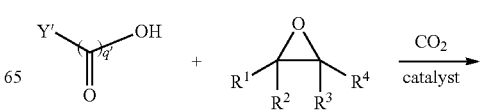

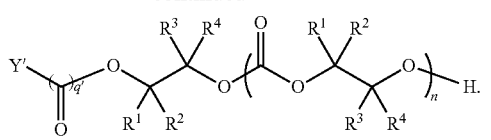

In certain embodiments, methods of the present invention include the step of copolymerizing propylene oxide with carbon dioxide in the presence of a chain transfer agent comprising an alpha beta unsaturated carboxylic acid. In certain embodiments, the method includes using acrylic acid as a chain transfer agent.

In certain embodiments, methods of the present invention include the step of reacting a polymer having a formula

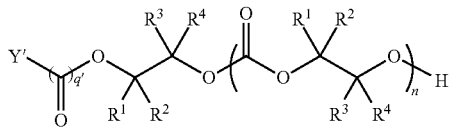

(such as those resulting from the copolymerization of one or more epoxides with carbon dioxide in the presence of an initiator having a formula Y'—(CO)$_{q'}$—OH as defined hereinabove) to introduce a —Y group on the free hydroxyl end of the polymer:

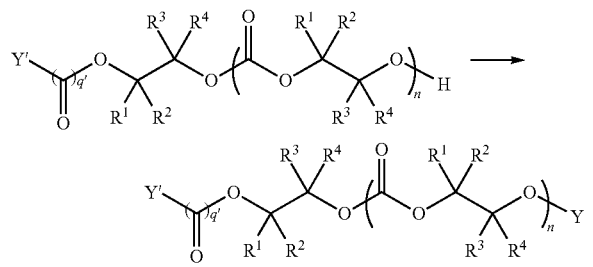

In certain embodiments, methods of the present invention include the step of treating such a polymer with an alkylating agent, an acylating agent, or an isocyanate containing olefinic unsaturation. In certain embodiments, the alkylating agent, acylating agent, or isocyanate comprises one or more moieties selected from the group consisting of: an alpha beta unsaturated carbonyl, a styrene, a vinyl ether, or a vinyl ester.

In certain embodiments, the present invention provides a method comprising the step of reacting a first epoxide or mixture of epoxides

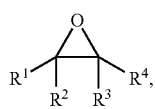

wherein each of $R^1$, $R^2$, $R^3$, and $R^4$ is as defined above and described in classes and subclasses herein, and carbon dioxide with a catalyst under suitable conditions and in the presence of second epoxide

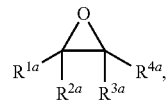

wherein each of $R^{1a}$, $R^{2a}$, $R^{3a}$, and $R^{4a}$ is as defined above and described in classes and subclasses herein, to form a polymer composition comprising aliphatic polycarbonate chains having two or more sites of olefinic unsaturation.

In certain embodiments, the present invention provides a method comprising the step of reacting a first epoxide or mixture of epoxides

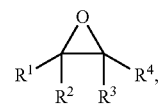

wherein each of $R^1$, $R^2$, $R^3$, and $R^4$ is as defined above and described in classes and subclasses herein, and carbon dioxide with a catalyst under suitable conditions and in the presence of a chain transfer reagent having one or more sites of olefinic unsaturation, to form a polymer composition comprising aliphatic polycarbonate chains having two or more sites of olefinic unsaturation. In some embodiments, the method further comprises addition of a second epoxide

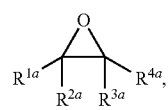

wherein each of $R^{1a}$, $R^{2a}$, $R^{3a}$, and $R^{4a}$ is as defined above and described in classes and subclasses herein.

In certain embodiments, the present invention encompasses methods of forming polymeric materials comprising the step of contacting one or more aliphatic polycarbonates containing olefinic unsaturation as defined hereinabove with an olefin polymerization initiator or catalyst under conditions that cause at least some of the olefinic groups on the aliphatic polycarbonates to become cross-linked.

In certain embodiments, the present invention encompasses methods of forming polymeric materials comprising the step of contacting one or more aliphatic polycarbonates containing olefinic unsaturation as defined hereinabove, with one or more olefinic monomers or prepolymers in the presence of an olefin polymerization initiator or catalyst under conditions that cause at least some of the olefinic groups on the aliphatic polycarbonates to become linked to the olefinic monomers and/or prepolymers. In certain embodiments, the olefinic monomers of this step comprise styrenes, vinyl ethers, vinyl esters, acrylates, or combinations of two or more of these. In certain embodiments the method includes contacting the mixture of aliphatic polycarbonate and olefinic monomer with a radical polymerization initiator.

EXAMPLES

General Procedures

For the Examples below, various mechanical and thermal data were obtained using the following standard tests. Tensile strength, elongation and tensile modulus were determined using the method described in ASTM D638 on a Tinius Olsen tensile machine, a gap separation of 4.5 inches and a speed of 2 inches/minute.

Flexural strength and modulus of elasticity were determined using the method described in ASTM 790 on a Tinius Olsen tensile machine with a span of 2 inches and a speed of 0.2 inches/minute.

Heat deflection temperature was determined using the method described in ASTM D648 on a Tinius Olsen tensile machine with 66 psi fiber stress, 11 oz weight and a specimen thickness of 0.25 inches.

Example 1

(Synthesis of a compound of formula P2b where n is approximately 10, and each —Y is

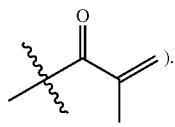

).

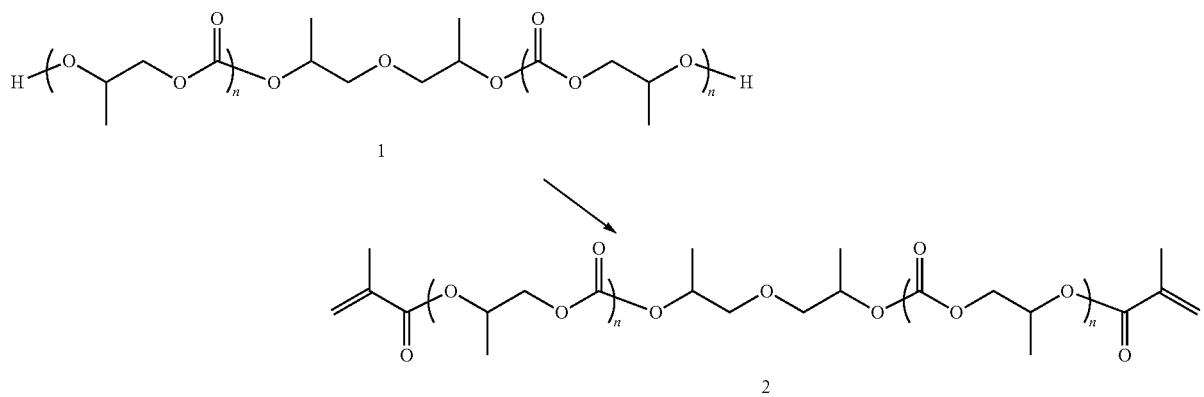

A sealed container of polyol diol[1] 1 (synthesized according to methods disclosed in WO 2010/028362 A1) was warmed in an oven at 120° C. for ca. 90 min to reduce the polyol's viscosity. A sample (210.6 g, 93.5 mmol) of this polyol was poured into a large beaker then, with gentle warming (fluid temperature ca. 35-40° C.) and overhead-stirring, dissolved in 0.5 L reagent grade ethyl acetate. Using an additional 0.5 L ethyl acetate, this solution was washed into a 2 L reaction vessel, containing 2,5-di-tert-butylhydroquinone (DBHQ; 5 mg, 25 ppm) and 4-(N,N-dimethylamino)pyridine (DMAP; 22.8 g, 187 mmol). The homogenous warm solution (ca. 30-35° C.) was then treated over 3 min, using an addition funnel, with methacrylic anhydride[2] (MAAn; 45 mL, 300 mmol); a mild exotherm was noted (ca. 5° C.) subsequent to the addition. The reaction mixture was stirred at ambient temperature for 45 min then treated with methanol (18 mL, 560 mmol) to destroy residual MAAn. The reaction was stirred at ambient temperature for 30 min, then treated with triethylamine (45 mL, 610 mmol). The reaction mixture stirred at ambient temperature for 5 min. The homogenous crude reaction mixture was then loaded onto a slurry-packed, silica gel column[3] (11.5×28 cm). The column was eluted with about 5 L of ethyl acetate. The first liter of eluant, obtained during sample loading, was discarded. The next three liters of eluant were treated with additional DBHQ (5 mg, 25 ppm) and concentrated in vacuo using a rotary evaporator. The thick glassy residue was further concentrated under high vacuum for 30 min. The product (186.3 g) was obtained as a pale amber glassy-oil in 83.4% yield.

[1] Polyol Diol analyses: SET (PE equivalent) Mn=2640, PD 1.06; OH#=49.8, Mn=2250; Mass Spec. Mn=2163, PD 1.04. The OH# derived Mn was employed to derive stoichiometry.
[2] Fractionally distilled under aspirator vacuum from the commercially available 94-95% anhydride.
[3] Sorbent Technologies Inc., premium-grade 60 Å gravity (75-200 mm) silica gel, slurry-packed employing ethyl acetate.

Figure 2:
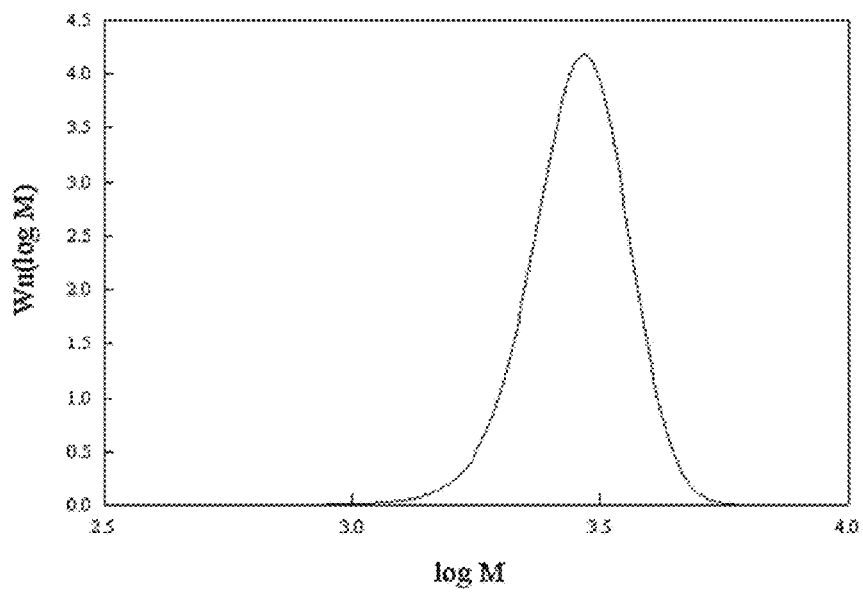
FIG. 2 shows SEC and GPEC chromatograms of methacrylated poly(propylene carbonate) compositions.
Figure 2:
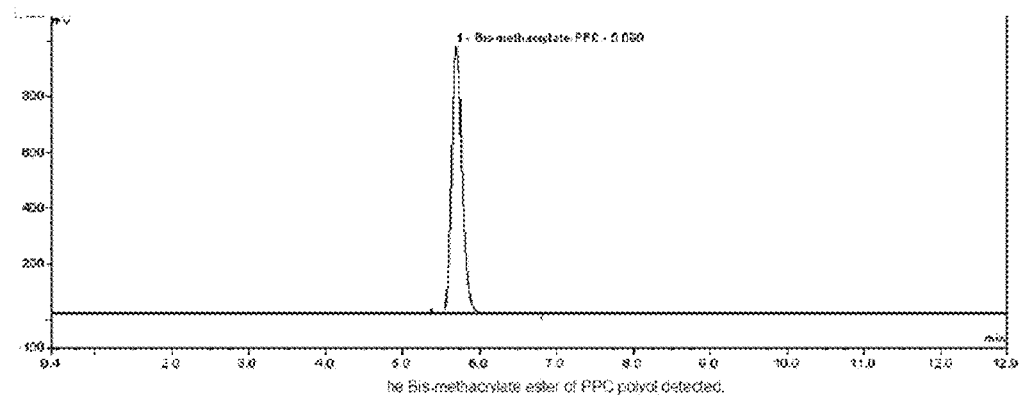
Figure 4:
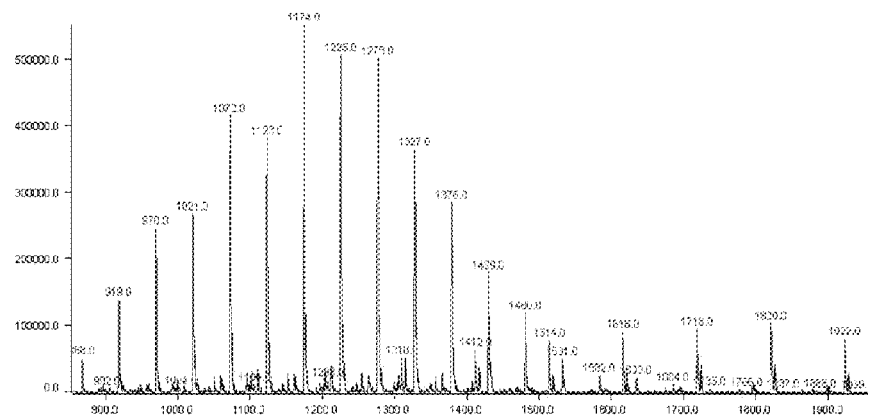
FIG. 4 shows the electrospray mass spectrum of a methacrylated poly(propylene carbonate) composition.
Figure 5:
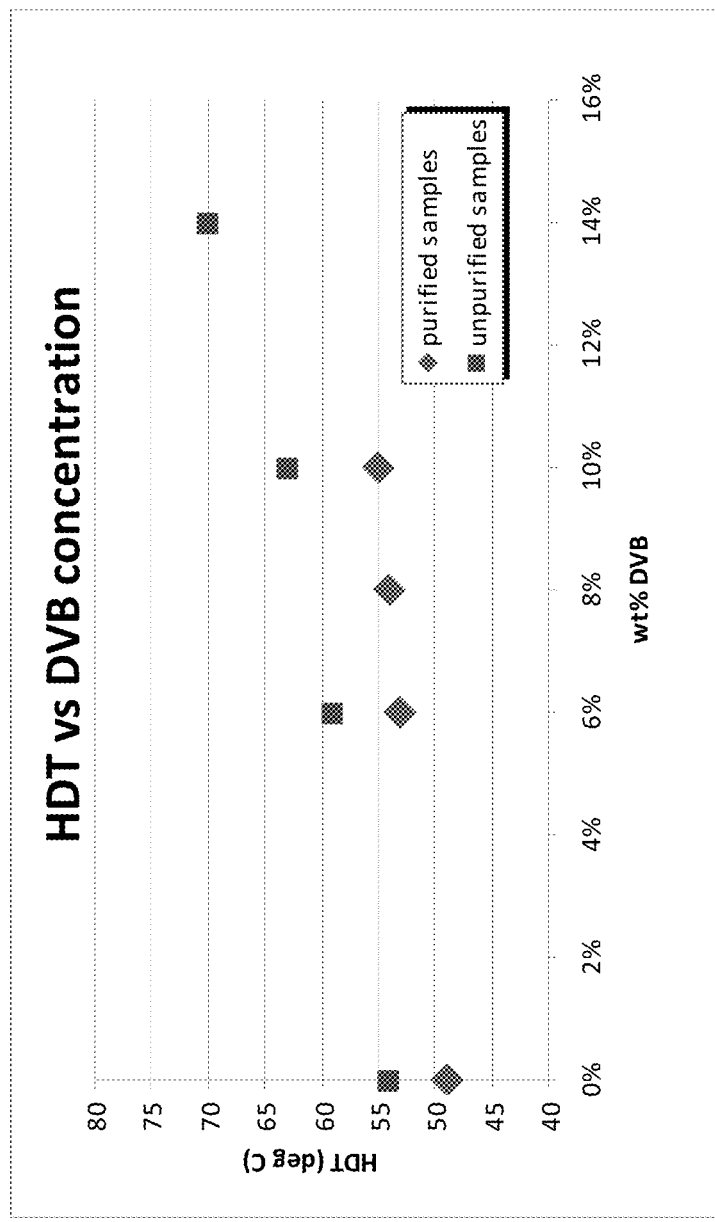
FIG. 5 show the relationship between heat distortion temperature (HDT) and divinyl benzene (DVB) concentration in purified and unpurified samples.

The product was assayed using proton NMR to ensure structural integrity and purity, particularly examining for residual DMAP, MAAn, or MAAc: no reaction related impurities were noted. FIG. 1 shows the proton NMR spectra of the starting polyol 1 and the methacrylated product 2. The degree of acylation was primarily assessed using gradient polymer elution chromatography (GPEC); complete acylation (>99%) was noted. The polymer characteristics were evaluated using poly(ethylene)-equivalent size exclusion chromatography (SEC: Mn=2750, PD=1.05) and electrospray mass spectroscopy (Mn=2275, PD=1.03) FIG. 2 shows the SEC and GPEC chromatograms obtained on samples of methacrylated product 2. FIG. 4 shows the electrospray mass spectrum obtained from a sample of methacrylated product 2.

Example 2

A sample of the methacrylated polyol 2 as described above (185.7 g) was mixed with styrene (61.9 g) at 35-40° C. until a homogeneous solution was obtained. Chromatographic analysis via previous calibrated HPLC indicated the solution contained 25.1% styrene. The viscosity of the sample, measured on a Brookfield viscometer (LV-2) was 2900 cps.

Figure 3:
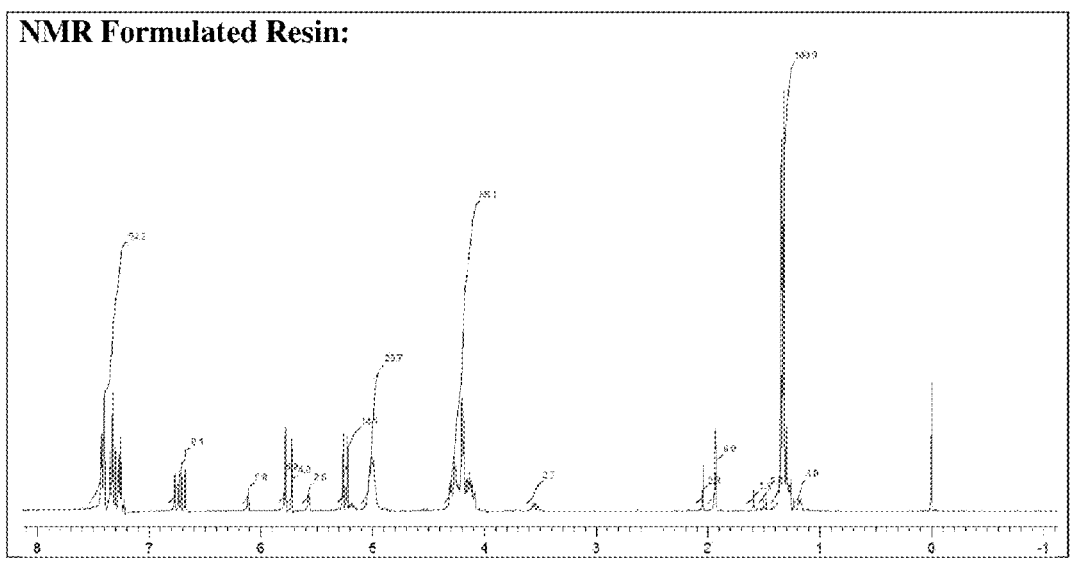
FIG. 3 shows the proton NMR spectrum of a formulated resin of the invention

The above resin (161.3 g) was treated with cobalt naphthenate (0.330 g; 6% solution in mineral spirits) and the mixture was agitated to ensure thorough incorporation. Subsequently, the mixture was treated with methyl ethyl ketone peroxide (MEKP; 3.205 g; 40% solution in 1-butanol). Again the mixture was agitated to ensure thorough reagent incorporation. FIG. 3 shows the proton NMR spectrum of the formulated resin.

The above initiated resin was immediately poured into preassembled test-bar mold cavities. The filled molds were allowed to cure at room temperature for at least 18 h, then heated in a laboratory convection oven thermostated at 90° C. for 2 h. The oven temperature was raised to 120° C. and the molds heated for an additional 4 h. The molds were removed from the oven and allowed to cool. The test bars were extracted from the forms and allowed to sit at ambient temperature for at least 18 h prior to any evaluations. See Sample I in FIG. 6.

Example 3

A sample of the methacrylated polyol 2 was formulated and cured as described in Example 2, except the amount of styrene was increased to provide a mixture containing 40% styrene. See Samples F, H, J, and K in FIG. 6.

Example 4

A sample of the methacrylated polyol 2 was formulated and cured as described in Example 2, except vinyl toluene was substituted for styrene.

Example 5

A sample of the methacrylated polyol 2 is formulated and cured as described in Example 2, methylmethacrylate is substituted for styrene.

Example 6

A sample of the methacrylated polyol 2 is formulated and cured as described in Example 2, except benzoyl peroxide is substituted for MEKP.

Example 7

A sample of polyol diol 1 having an Mn of approximately 1,000 g/mol (synthesized according to methods disclosed in WO 2010/028362 A1) was treated as described in Example 1 to provide a compound of formula P2b where n is approximately 4, and each —Y is

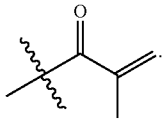 [SMILES: *C(=O)C(=C)C]

This material was then formulated and cured as described in Example 2. See Sample E in FIG. 6.

Example 8

A sample of polyol diol 1 having an Mn of approximately 2,000 g/mol (synthesized according to methods disclosed in WO 2010/028362 A1) was treated as described in Example 1 to provide a compound of formula P2b where n is approximately 9, and each —Y is

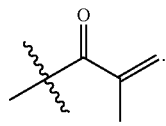

This material was then formulated and cured as described in Example 2. See Sample G in FIG. 6.

Example 9

Synthesis of a compound of formula P2c where

is

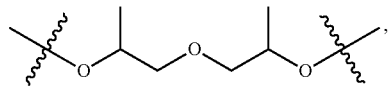 [SMILES: *OC(C)COCC(C)O*]

n is approximately 6, and each —Y is

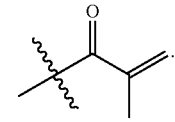

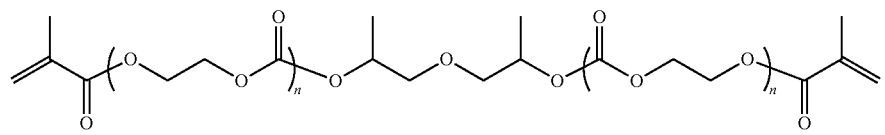

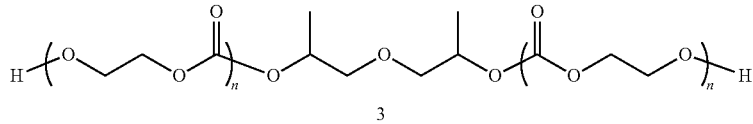

A sample of poly(ethylene carbonate) polyol of formula 3 (synthesized according to methods disclosed in WO 2010/028362 A1) having an Mn of approximately 1200 g/mol is treated as described in Example 1 to provide a methacrylated PEC of formula 4. The methacrylated polyol is then formulated and cured as described in Example 2.

Example 10

A solution of poly(propylene carbonate) 1 described in Example 1 (20.0 g, 16.9 mmol) in ethyl acetate (65.9 g) was sequentially treated with methacrylic anhydride (MAAn; 8.5 g, 55.2 mmol) and molybdenum chloride oxide ($MoCl_2O_2$; 85 mg, 0.042 mmol). The resultant solution was stirred at 55° C. for 3 h, then treated with 1 mL methanol. This solution was stirred at 55° C. for 30 min then heating curtailed. The warm solution was treated with powdered, anhydrous potassium carbonate (38 g, 0.28 mol) and stirred at ambient temperature for 30 min. The resulting slurry was filtered through a bed of diatomaceous earth; washing the solids with minimal ethyl acetate. The combined solutions were concentrated in vacuo to provide a viscous, colorless oil in near quantitative yield. NMR analysis confirmed the structural assignment. This material was then formulated and cured according to the methods in example 2.

Example 11

Polyol diol 1 (synthesized according to methods disclosed in WO 2010/028362 A1) was heated to 110° C. and, without addition of any solvent, treated with methacrylic anhydride and $MoCl_2O_2$ as described in Example 10. The reaction was complete within 15 minutes and the product was analyzed by proton NMR and found to contain the desired bis-methacrylated polycarbonate along with traces of methacrylic acid.

Example 12

A solution of poly(propylene carbonate) 1 is treated as described in Example 10 except trifluoromethanesulfonic acid (triflic acid), is substituted for the molybdenum chloride oxide.

Example 13

A solution of poly(propylene carbonate) 1 is treated as described in Example 10 except copper (II) triflate, is substituted for the molybdenum chloride oxide.

Example 14

A solution of poly(propylene carbonate) 1 is treated as described in Example 10 except diphenylammonium triflate, is substituted for the molybdenum chloride oxide.

Example 15

(Synthesis of a compound of formula P2b where n is approximately 10, and each —Y is

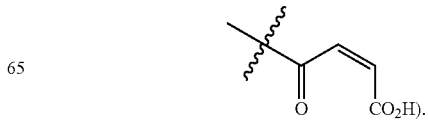

).

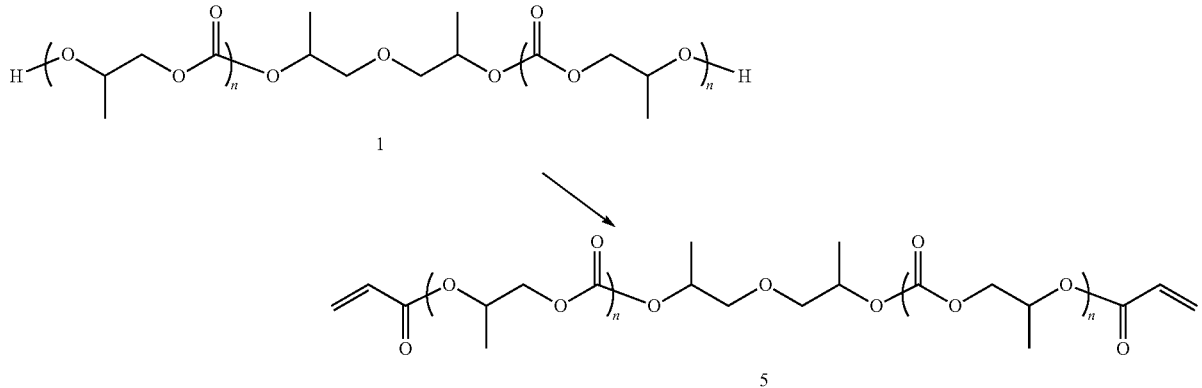

Poly(propylene carbonate) 1 is treated under the conditions of Example 10 except acrylic acid anhydride is substituted for methacrylic anhydride.

Example 16

(Synthesis of a compound of formula P2b where n is approximately 10, and each —Y is

).

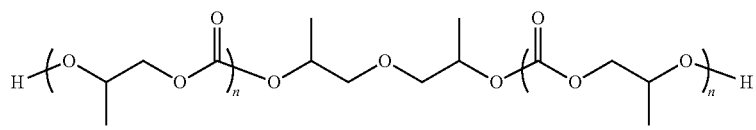

1

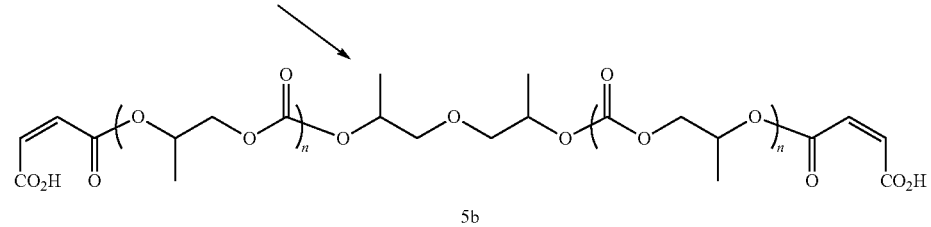

5b

Poly(propylene carbonate) 1 is treated under the conditions of Example 10 except maleic anhydride is substituted for methacrylic anhydride.

Example 17

Formulated resin samples described in Example 2 are cured as described, except 10 to 60 weight percent glass fiber is added to the mixture prior to the final cure.

Example 18

Formulated resin samples described in Example 2 are cured as described, except 5 to 50 weight percent carbon fiber is added to the mixture prior to the final cure.

Example 19

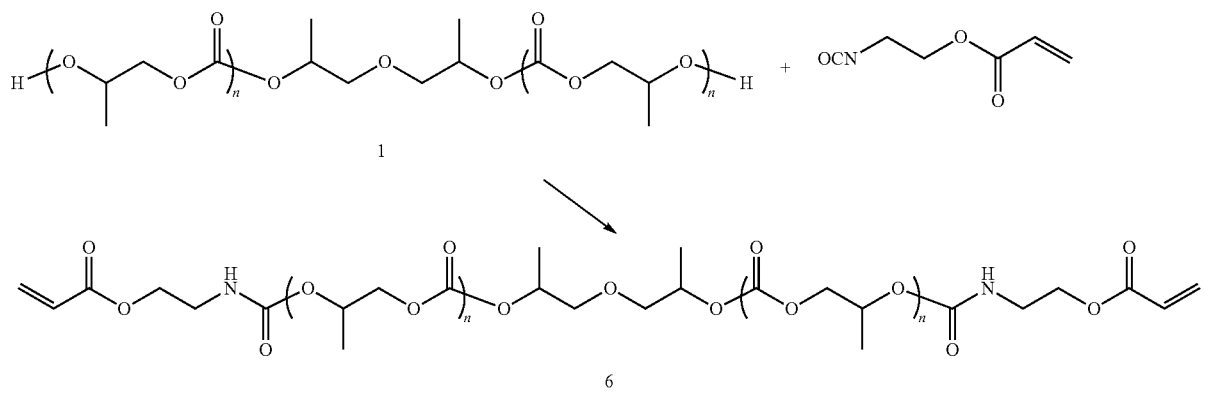

A solution of poly(propylene carbonate) diol 1 as described in Example 1 (56.1 g, 25.0 mmol) in 200 mL ethyl acetate is treated sequentially with 2-isocyanatoethyl methacrylate (8.13 g, 52.5 mmol) and a catalytic amount dibutyl tin dilaurate (5 drops, ca. 50 mg). The mixture is heated at 75° C. for 0.5 h. The mixture is then treated with 15 mL methanol. The reaction mixture is concentrated in vacuo to provide the desired derivatized poly(propylene carbonate) 6.

Example 20

The data for Sample A, a comparator sample, (see FIG. 6a) is taken from a technical data sheet for Vinyl Ester Resin, available from Fibre Glast Developments Corp., part #1110 (Brookville, Ohio) and can be found at http://cdn.fibreglast.com/downloads/00061-D.pdf, the entire contents of which are hereby incorporated by reference herein. Samples B-D (see FIG. 6a) were prepared using the method described in the technical data sheet: catalyzed with 1.25% MEKP, cured at room temperature for 24 hours and postcured for 2 hours at 138° C.

Example 21

Sample L was prepared using 1,000 g/mol diol resin, methacrylated as in Example 10 and cured with 40% styrene.

Example 22

Sample M and N were prepared using 1,000 g/mol diol resin, methacylated as in Example 10 and cured with 40% vinyl toluene.

Example 23

Sample O was prepared using 1,000 g/mol diol resin, methacylated as in Example 10 and cured with 40% methyl methacrylate.

Example 24

Sample P was prepared using 1,000 g/mol diol resin, methacrylated as in Example 11 and cured with 40% styrene.

Example 25

Sample Q was prepared using 3,000 g/mol diol resin, methacrylated as in Example 11 and cured with 40% styrene.

Example 26

The following Samples were prepared using 1,000 g/mol diol resin, methacrylated as in Example 10 and cured as indicated.
Sample R: 38% styrene, 2% divinylbenzene (DVB)
Sample S: 40% styrene
Sample T: 34% styrene, 6% DVB
Sample U: 32% styrene, 8% DVB
Sample V: 30% styrene, 10% DVB

Example 27

The following Samples were prepared using 1,000 g/mol diol resin, methacrylated as in Example 11 and cured as indicated.
Sample W: 34% styrene, 6% DVB
Sample X: 30% styrene, 10% DVB
Sample Y: 26% styrene, 14% DVB

Other Embodiments

The foregoing has been a description of certain non-limiting embodiments of the invention. Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:
1. An epoxide $CO_2$ copolymer composition comprising aliphatic polycarbonate chains having two or more sites of olefinic unsaturation, wherein
a) the aliphatic polycarbonate chains have a formula:

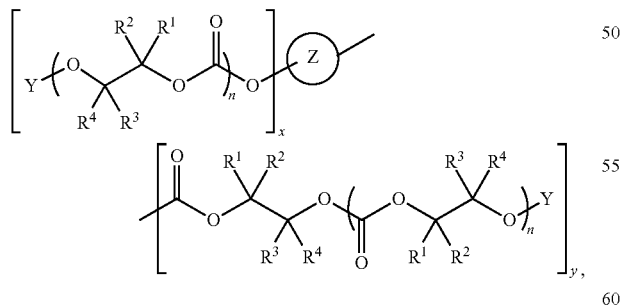

wherein
$R^1$, $R^2$, $R^3$, and $R^4$ are, at each occurrence in the polymer chain, independently selected from the group consisting of —H, fluorine, a $C_{1-30}$ aliphatic group, a $C_{1-20}$ heteroaliphatic group, and a $C_{6-10}$ aryl group, where any two or more of $R^1$, $R^2$, $R^3$, and $R^4$ may optionally be taken together with intervening atoms to form one or more rings optionally containing one or more heteroatoms;

each Y independently comprises an acrylate, acrolein, acrylamide, maleimide, vinyl, or styrene functional group containing olefinic unsaturation;

is a covalent bond, a heteroatom, or a multivalent moiety;

n is, on average in the polymer, an integer from about 5 to about 400; and x and y are each independently an integer from 0 to 6, where the sum of x and y is between 2 and 6;

b) at least two of the sites of olefinic unsaturation comprise carbon-carbon double bonds in a moiety selected from the group consisting of:

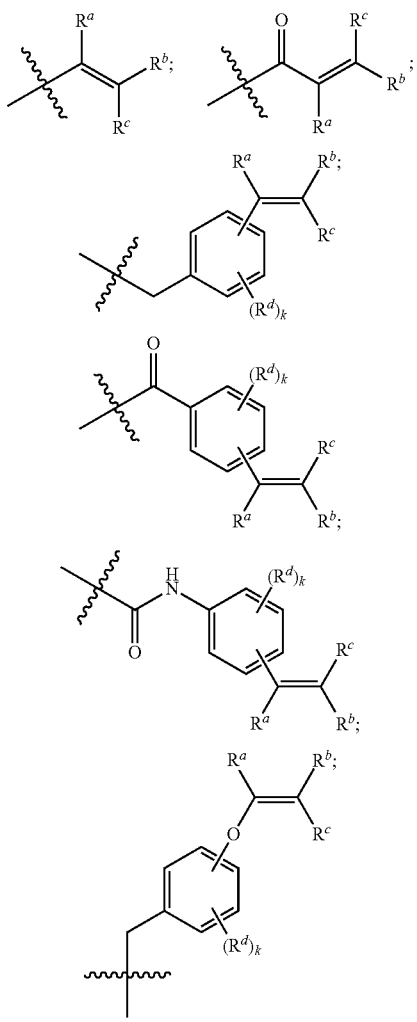

-continued

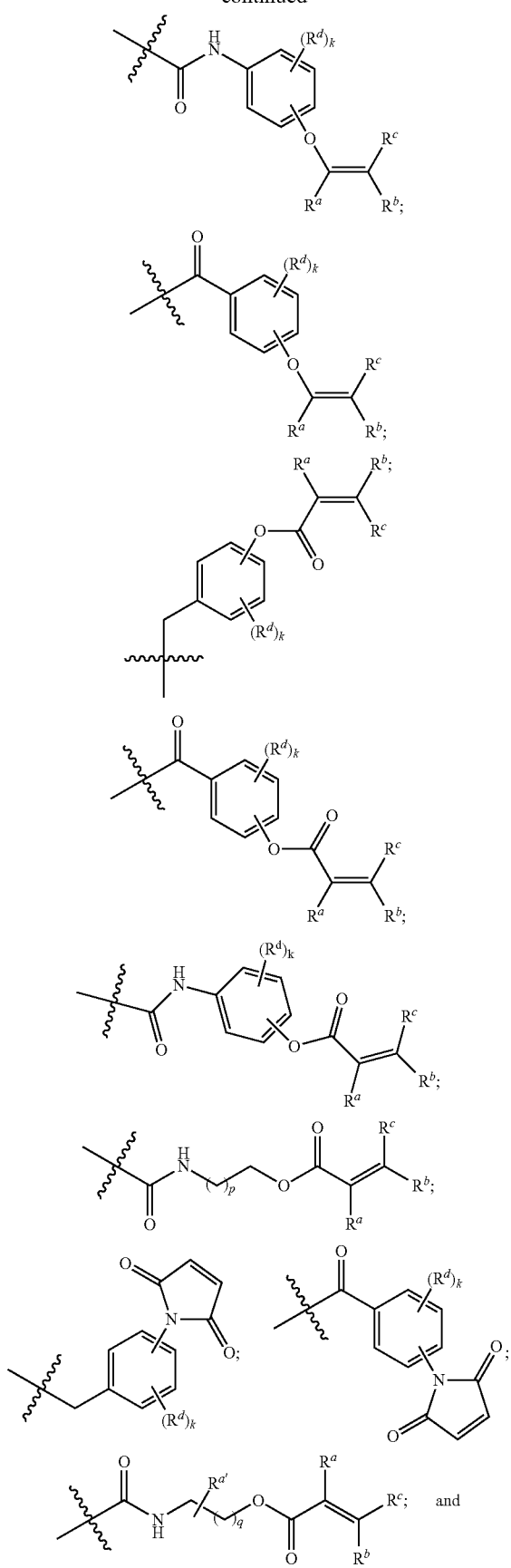

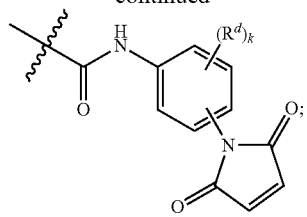

$R^a$, $R^b$, and $R^c$ are independently selected from the group consisting of —H or a $C_{1-20}$ aliphatic group;

$R^d$ is, at each occurrence, independently selected from the group consisting of: halogen or $C_{1-20}$ aliphatic;

k is from 0 to 4, inclusive;

q is from 1 to 6, inclusive;

$R^{a'}$ is at each occurrence independently selected from the group consisting of:

halogen and $C_{1-20}$ aliphatic;

each occurrence of R is independently —H, or a moiety selected from the group consisting of $C_{1-6}$ aliphatic, $C_{1-6}$ heteroaliphatic, 3- to 7-membered heterocyclic, 3- to 7-membered carbocyclic, 6- to 10-membered aryl, and 5- to 10-membered heteroaryl; and p is an integer from 1 to 6 inclusive; and c) the number average molecular weight of the aliphatic polycarbonate chains is on average in the range of about 500 g/mol to about 100,000 g/mol.

2. The polymer composition of claim 1, wherein the sites of olefinic unsaturation disposed at the ends of the aliphatic carbonate chains are independently selected from the group consisting of: acrylate ester, acrolein, acrylamide, maleimide, vinyl ether, and styrene.

3. The polymer composition of claim 1, wherein the sites of olefinic unsaturation in Y comprise carbon-carbon double bonds in a moiety selected from the group consisting of: acrylate, acrolein, acrylamide, maleimide, vinyl ether, and styrene.

4. The polymer composition of claim 1, wherein each Y is independently selected from the group consisting of:

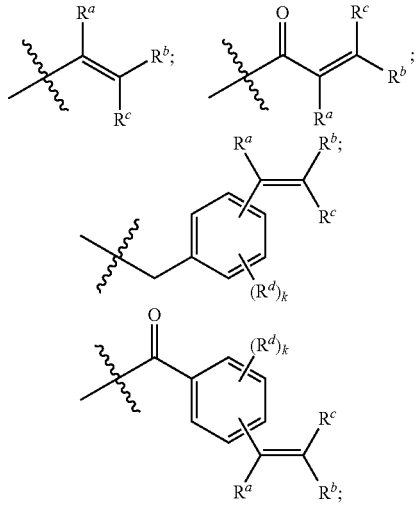

-continued
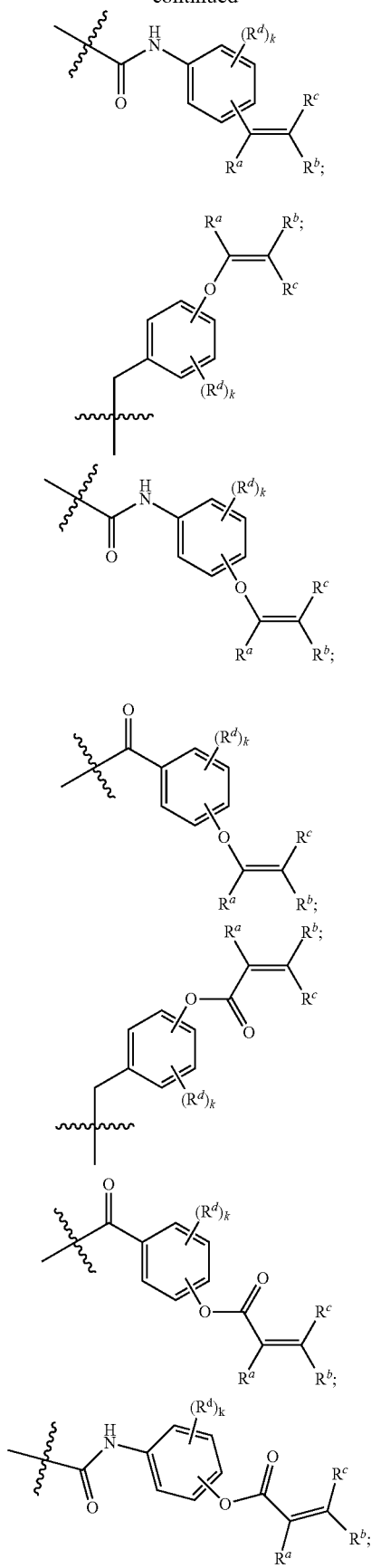
-continued
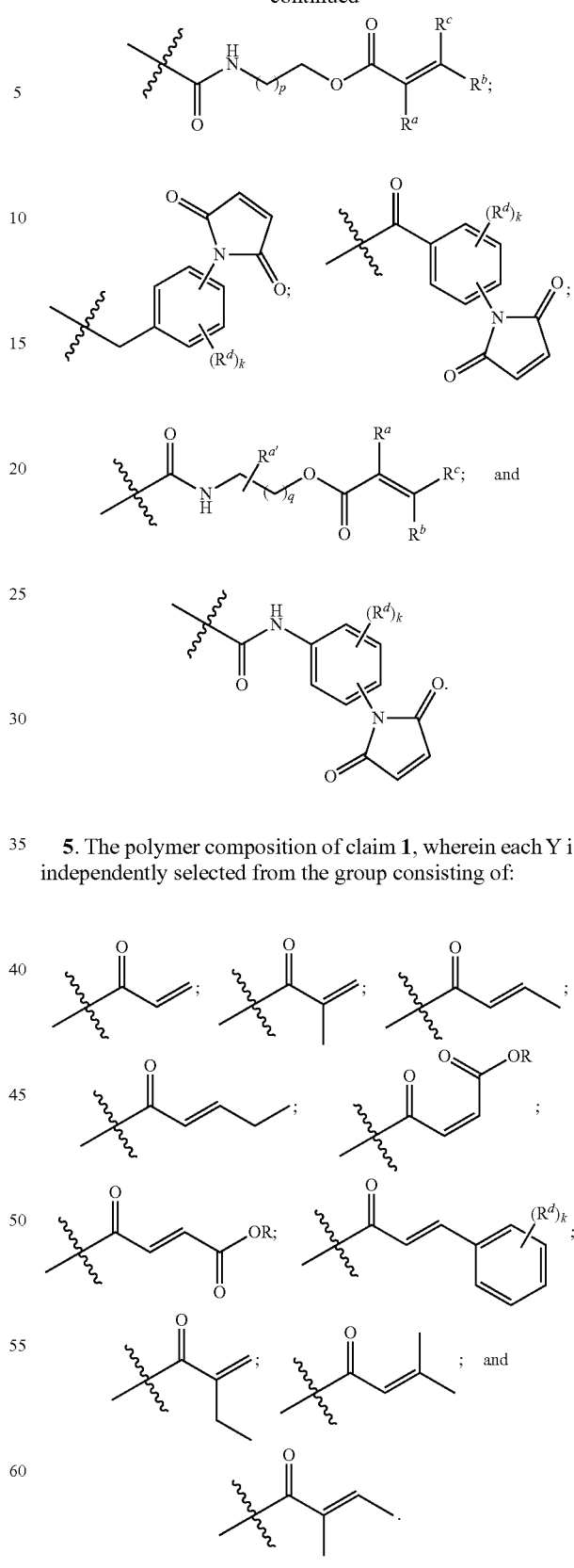
5. The polymer composition of claim 1, wherein each Y is independently selected from the group consisting of:
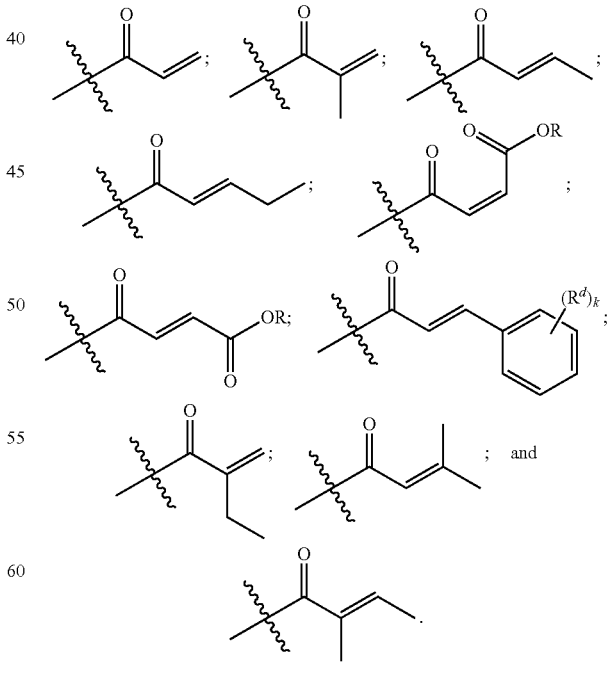
6. The polymer composition of claim 1, comprising aliphatic polycarbonate chains having a formula:

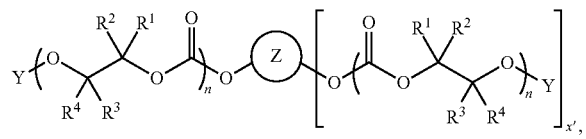

wherein x' is an integer between 1 and 5 inclusive and n is, on average in the polymer, an integer from about 5 to about 400.

7. The polymer composition of claim 6, wherein

is derived from a dihydric alcohol.

8. The polymer composition of claim 6, wherein

is derived from a polyhydric alcohol.

9. The polymer composition of claim 1, wherein

is derived from a polycarboxylic acid.

10. The polymer composition of claim 9, wherein

is derived from a dicarboxylic acid.

11. The polymer composition of claim 1, comprising poly (propylene carbonate) chains having a formula:

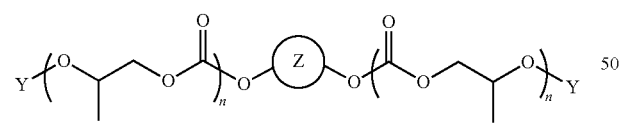

where

is selected from the group consisting of: a $C_{1-40}$ aliphatic group, a $C_{1-40}$ heteroaliphatic group, a aryl moiety, a heteroaryl moiety, a polyether, a polyester, a polyolefin, and a single covalent bond; and Y is, at each occurrence, independently selected from group consisting of:

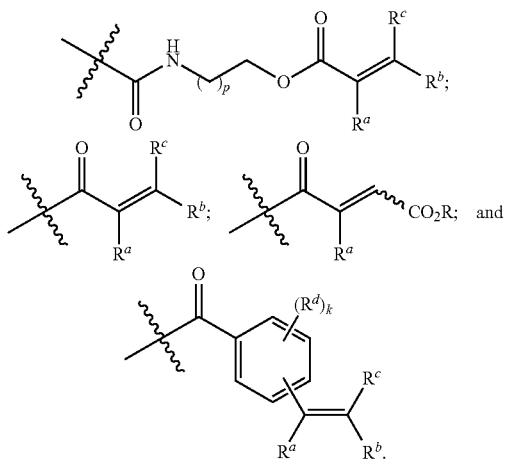

12. The polymer composition of claim 11, wherein

is derived from a polyfunctional chain transfer agent selected from the group consisting of: ethylene glycol; diethylene glycol, trimethylene glycol, 1,3 propane diol; 1,4 butane diol, propylene glycol, hexylene glycol, dipropylene glycol, tripropylene glycol, and alkoxylated derivatives thereof.

13. The polymer composition of claim 1, wherein sites of olefinic unsaturation are present on at least a portion of the

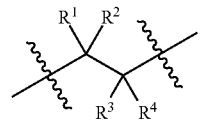

moieties within the aliphatic polycarbonate chains.

14. A polymer composition comprising aliphatic polycarbonate chains having two or more sites of olefinic unsaturation, wherein a) each aliphatic polycarbonate chain comprises a repeating unit having a structure:

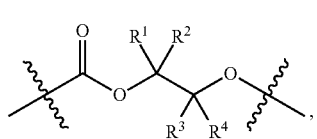

A where $R^1$, $R^2$, $R^3$, and $R^4$ are, at each occurrence in a polymer chain, independently selected from the group consisting of —H, fluorine, a $C_{1-20}$ heteroaliphatic group, a $C_{1-30}$ aliphatic group, and a $C_{6-10}$ aryl group, where any two or more of $R^1$, $R^2$, $R^3$, and $R^4$ may optionally be taken together with intervening atoms to form one or more rings optionally containing one or more heteroatoms;

b) each aliphatic polycarbonate chain further comprises a repeating unit having a structure:

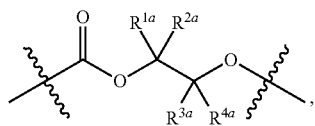

where $R^{1a}$, $R^{2a}$, $R^{3a}$, and $R^{4a}$ are, at each occurrence in a polymer chain, independently selected from the group consisting of —H, fluorine, a $C_{1-20}$ aliphatic group, and -T-V, wherein for each unit of B, one or more of $R^{1a}$, $R^{2a}$, —$R^{3a}$, and $R^{4a}$ is -T-V;

each T is independently a covalent bond or a bivalent $C_{1-8}$ saturated or unsaturated, straight or branched, hydrocarbon chain, wherein one or more methylene units are optionally and independently replaced by —NR—, —N(R)C(O)—, —C(O)N(R)—, —N(R)SO$_2$—, —SO$_2$N(R)—, —O—, —C(O)—, —OC(O)—, —OC(O)O—, —C(O)O—, —N(R)C(O)O—, —OC(O)N(R)—, —S—, —SO—, or —SO$_2$—;

each R is independently —H, or a radical selected from the group consisting of $C_{1-20}$ aliphatic, heterocyclic, carbocyclic, aryl, and heteroaryl;

each V is an acyl, $C_{1-12}$ aliphatic, $C_{1-12}$ heteroaliphatic, aryl, heteroaryl, carbocyclic, or heterocyclic group containing one or more units of olefinic unsaturation; and c) the number average molecular weight of the aliphatic polycarbonate chains is on average in the range of about 500 g/mol to about 100,000 g/mol.

15. The polymer composition of claim 8, wherein the polyhydric alcohol is selected from the group consisting of: glycerol, 1,2,4-butanetriol, 2-(hydroxymethyl)-1,3-propanediol; hexane triols, trimethylol propane, trimethylol ethane, trimethylolhexane, 1,4-cyclohexanetrimethanol, pentaerythritol mono esters, pentaerythritol mono ethers, and alkoxylated analogs thereof.

16. The polymer composition of claim 8, wherein the polyhydric alcohol comprises a $C_{2-40}$ polyhydric alcohol with more than three hydroxyl groups.

17. The polymer composition of claim 1, characterized in that the aliphatic polycarbonate chains have:
an Mn between about 500 g/mol and about 20,000 g/mol, greater than 90% carbonate linkages on average, and
at least 90% of the end groups are moieties containing aliphatic unsaturation.

18. A method of combining a polymer composition of claim 1 with a crosslinking initiator under suitable conditions to effect crosslinking between sites of olefinic unsaturation.

19. A composition prepared by the method of claim 18.

20. A composite comprising a polymer composition or crosslinked composition of claim 1 and further comprising one or more materials suitable for preparing a polymer composite.

21. A composite article comprising a substrate having thereon a coating prepared by at least partially curing a composition of claim 1.

22. An article of manufacture comprising a crosslinked polymer composition of claim 1.

\* \* \* \* \*